United States Patent
Makino et al.

(10) Patent No.: US 9,258,859 B2
(45) Date of Patent: *Feb. 9, 2016

(54) SEMICONDUCTOR DEVICE AND POWER SUPPLY DEVICE

(71) Applicant: RENESAS ELECTRONICS CORPORATION, Kawasaki-shi, Kanagawa (JP)

(72) Inventors: Ryosei Makino, Kanagawa (JP); Kenichi Yokota, Kanagawa (JP); Tomohiro Tazawa, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,517

(22) Filed: Apr. 24, 2015

(65) Prior Publication Data
US 2015/0230304 A1    Aug. 13, 2015

Related U.S. Application Data

(63) Continuation of application No. 14/272,701, filed on May 8, 2014, now Pat. No. 9,041,314, which is a continuation of application No. 13/109,423, filed on May 17, 2011, now Pat. No. 8,754,590.

(30) Foreign Application Priority Data

May 28, 2010    (JP) ................................. 2010-122971
Nov. 17, 2010    (JP) ................................. 2010-257090

(51) Int. Cl.
*H05B 33/08*        (2006.01)
*H02M 1/42*         (2007.01)

(52) U.S. Cl.
CPC ......... *H05B 33/0818* (2013.01); *H02M 1/4208* (2013.01); *H05B 33/0815* (2013.01); *H02M 2001/4291* (2013.01); *Y02B 20/19* (2013.01); *Y02B 20/383* (2013.01); *Y02B 70/126* (2013.01)

(58) Field of Classification Search
CPC .... H05B 37/02; H05B 33/08; H05B 33/0815; H05B 33/0818; H02M 1/4208; H02M 2001/4291
USPC ............. 315/186, 200 R, 224, 247, 291, 307, 315/308; 363/17, 56.02, 98, 126
See application file for complete search history.

(56) References Cited

U.S. PATENT DOCUMENTS 6,396,879 B1    5/2002   Yoshimura et al.
7,227,763 B1    6/2007   Noh et al.
(Continued)

FOREIGN PATENT DOCUMENTS

CN    1753290 A     3/2006
CN    101389168 A   3/2009
(Continued)

*Primary Examiner* — Thai Pham
(74) *Attorney, Agent, or Firm* — Mattingly & Malur, PC

(57) ABSTRACT

A power supply topology is used in which a transistor is provided on the side of an output node of a rectifying circuit. An inductor is provided on the side of a reference node, a resistor is inserted between the transistor and the inductor, and one end of the resistor is coupled to a ground power supply voltage of a PFC circuit. The PFC circuit includes a square circuit which squares a result of multiplication of an input voltage detection signal and feedback information (output voltage of an error amplifier circuit). The PFC circuit drives on the transistor when a detection voltage developed at the resistor reaches zero, and drives off the transistor when the detection signal reaches an output signal of the square circuit.

5 Claims, 38 Drawing Sheets

(56) References Cited

U.S. PATENT DOCUMENTS

| | | |
|---|---|---|
| 7,348,766 B2 | 3/2008 | Hachiya et al. |
| 7,511,437 B2 * | 3/2009 | Lys et al. ............. 315/307 |
| 7,538,525 B2 | 5/2009 | Kim et al. |
| 7,598,685 B1 | 10/2009 | Shteynberg et al. |
| 7,638,954 B2 | 12/2009 | Kunimatsu et al. |
| 7,834,828 B2 | 11/2010 | Arakawa et al. |
| 8,226,270 B2 | 7/2012 | Yamamoto et al. |
| 8,659,239 B2 * | 2/2014 | Liao et al. ............. 315/307 |
| 2008/0018267 A1 | 1/2008 | Arakawa et al. |
| 2010/0207536 A1 * | 8/2010 | Burdalski et al. ............. 315/224 |

FOREIGN PATENT DOCUMENTS

| | | |
|---|---|---|
| JP | 2002-300780 A | 10/2002 |
| JP | 2006-094697 A | 4/2006 |
| JP | 2006-196697 A | 7/2006 |
| JP | 2006-340538 A | 12/2006 |
| JP | 2009-004130 A | 1/2009 |

* cited by examiner

STEP-UP CONVERTER

FLYBACK CONVERTER

SEMICONDUCTOR DEVICE AND POWER SUPPLY DEVICE

CROSS-REFERENCE TO RELATED APPLICATIONS

This application is a continuation of U.S. patent application Ser. No. 14/272,701, filed May 8, 2014, which is a continuation of U.S. patent application Ser. No. 13/109,423, filed May 17, 2011, now U.S. Pat. No. 8,754,590, which claims priority to Japanese Patent Application No. 2010-122971, filed May 28, 2010, and Japanese Patent Application No. 2010-257090, filed Nov. 17, 2010, the disclosures of which, including the specifications, drawings and abstracts, are incorporated herein by reference in their entirety.

BACKGROUND

The present invention relates to a semiconductor device and a power supply device using the same, and in particular to a technology effective when applied to a switching power supply device equipped with a power factor correction circuit.

A technology which controls a pulse width of a switch using a square circuit and an adder to reduce a distortion rate of an input current in a switching power supply device based on an input electrolytic capacitor-less one converter system, has been described in, for example, a patent document 1.
[Patent document 1] Japanese Unexamined Patent Publication No. 2002-300780.

SUMMARY

Energy saving has recently been accelerated in various fields. As one of them, an LED bulb using light emitting diodes (LED) good in light emission efficiency is rapidly becoming pervasive in, for example, an illumination field instead of a filament lamp. The LED bulb is driven by applying power generated by, for example, an AC-DC converter or the like to each of light emitting diodes. FIG. 28 is a schematic diagram illustrating a configuration example of an AC-DC converter discussed as the premise of the present invention. FIG. 29 is a waveform diagram showing an example of operation of FIG. 28. The AC-DC converter shown in FIG. 28 serves as a step-up power converter (step-up converter) including a PFC (PFC: power factor correction) circuit. The AC-DC converter using a commercial power source is generally equipped with a PFC circuit to avoid the occurrence of obstacles (malfunction, generation of heat, burnout, etc.) due to harmonic current in other devices via an AC power line.

In FIG. 28, a commercial power source (AC) (e.g., 85 to 264 Vrms or the like) is first full-wave rectified by a rectifying circuit DB1. Input power from the rectifying circuit DB1 is stored or accumulated in an inductor LM1 of a transformer TR2 when a transistor Q1 is on, and the power stored in the inductor LM1 is discharged to an output capacitor Cout via a diode D1 when the transistor Q1 is off. At this time, the PFC circuit PIC10 is inputted with information (Vz) about an input current Iin flowing into the inductor LM1, detected via a supplementary winding LMs of the transformer TR2, information (Vin') about an input voltage Vin from the rectifying circuit DB1, information (Vout') about an output voltage Vout, and information (Vcs) about a current Iq1 flowing through the transistor Q1. The PFC circuit PIC10 drives on the transistor Q1 (i.e., operates in a current critical mode) when it has detected that the input current Iin has reached zero due to the information Vz. The PFC circuit PIC10 drives the transistor Q1 off when it has detected that the current Iq1 has reached the predetermined times (multiple number corresponding to Vout') the Vin' due to the information Vcs. Consequently, the input current Iin (ac current Iac flowing through AC power line) flowing through the inductor LM1 becomes a sinusoidal shape, thus enabling a reduction in harmonic current developed in the AC power line.

Such an AC-DC converter as shown in FIG. 28 is however subject to the limitation that the output voltage Vout should be set higher than the input voltage Vin (e.g., 85 to 264 Vrms) (e.g., Vout=390 V or the like in the case of worldwide adaptation). Therefore, circuit parts such as the output capacitor Cout having stored the information Vout therein, a control circuit coupled to a subsequent stage, etc. need to use parts having a high breakdown voltage (e.g., 400 V or higher). It is feared that an increase in part cost and a size increase in power supply device will occur. Further, when a device that needs not have a high voltage so far is driven as typified by an illumination field, for example, there is a need to provide a step-down power converter (step-down converter) DWC in a stage subsequent to such a step-up converter UPC as shown in FIG. 28 as shown in a power supply system of FIG. 30, for example. In this case, a further increase in part cost and a further size increase in the power supply system are feared.

Thus, in order to solve such a problem, for example, such a flyback type AC-DC converter as shown in FIG. 31 may be used in the illumination field or the like. FIG. 31 is a schematic diagram illustrating another configuration example of the AC-DC converter discussed as the premise of the present invention. In FIG. 31, in a manner similar to FIG. 28, input power from a rectifying circuit DB1 is first stored or accumulated in a transformer TR1 via a primary winding (inductor) LM1 of the transformer TR1 when a transistor Q12 is on. Unlike the case of FIG. 28, however, the power stored in the transformer TR1 is discharged from a secondary winding (inductor) LM2 of the transformer TR1 to an output capacitor Cout via a diode D1 when the transistor Q1 is off.

A PFC circuit PIC10 of FIG. 31 has a configuration similar to that of FIG. 28 and is inputted with information (Vz) about the power stored in the transformer TR1 detected via its supplementary winding LMs of the transformer TR1, information (Vin') about an input voltage Vin from the rectifying circuit DB1, information (Vout') about an output voltage Vout, and information (Vcs) about an input current Iin flowing through the transistor Q12. When the stored power of the transformer TR1 has reached zero (in other words, the output current Iout flowing through the inductor LM2 becomes zero), the PFC circuit PIC10 drives on the transistor Q1 (i.e., it operates in a current critical mode). When the input current Iin flowing through the transistor Q1 via the Vcs has reached the predetermined times (multiple number corresponding to Vout') the Vin', the PFC circuit PIC10 drives off the transistor Q1. When such a configuration example is used, for example, the number of turns n1 in the primary winding LM1 of the transformer TR1 is set greater than the number of turns n2 in the secondary winding LM2 when a device that needs not have a high voltage so far is driven, as typified by an illumination field, and the example of FIG. 31 may be operated as the step-down converter DWC. Consequently, as shown in a power supply system of FIG. 33, a reduction in the number of parts is enabled and a reduction in cost, a size reduction in the power supply system, etc. can be achieved as compared with the case of FIG. 30.

It is however feared that the following problems will occur where such a configuration example as shown in FIG. 31 is used. The first problem is that the waveform of an ac current Iac flowing through an AC power line becomes a shape distorted like a trapezoid as shown in FIG. 34(b). FIGS. 34(a)

and 34(b) respectively show one example of the waveform of ac current flowing through the AC power line, in which FIG. 34(a) is a waveform diagram where the step-up converter of FIG. 28 is used, and FIG. 34(b) is a waveform diagram where the flyback converter of FIG. 31 is used. Thus, the ac current waveform Iac becomes a sinusoidal wave when the configuration example of FIG. 28 is used, whereas when the configuration example of FIG. 31 is used, the ac current waveform Iac becomes a distorted waveform. This distortion reduces a power factor and causes harmonic current on the AC power line.

The difference between FIGS. 34(a) and 34(b) qualitatively results from the fact that when the configuration example of FIG. 28 is used, the input current Iin flows continuously during an on/off period of the transistor Q1 as shown in FIG. 29, whereas when the configuration example of FIG. 31 is used, the input current Iin flows only during the on period of the transistor Q1 as shown in FIG. 32. Described in more details, this is because when the configuration example of FIG. 28 is used, the input current Iin becomes a value proportional to the input voltage Vin indicative of the sinusoidal wave as expressed in the following equation (1A), whereas when the configuration example of FIG. 31 is used, a simple proportional relation is not established between the Iin and the Vin as expressed in the following equation (2A).

$$Iin = \frac{K}{2 \times Rcs} \cdot Vin \quad (1A)$$

(K: circuit design constant)

$$Iin = \frac{K}{2 \times Rcs} \cdot \frac{Vin \times (n1/n2) \cdot Vout}{Vin + (n1/n2) \cdot Vout} \quad (2A)$$

(K: circuit design constant)

As the second problem, there may be mentioned an increase in part cost and a size increase in power supply device. Although the use of the configuration example of FIG. 31 enables the reduction in part cost and the size reduction in the power supply device as compared with the configuration example of FIG. 28, there is a demand for further miniaturization, a further reduction in part cost and the like where the configuration example of FIG. 31 is applied to, for example, an LED bulb or the like. In the configuration example of FIG. 31, the size of the transformer TR1 equipped with the primary winding LM1, secondary winding LM2 and supplementary winding LMs is large in particular. When the inductance value of the primary winding LM1 is set to 1 mH or the like, for example, the transformer TR1 can take sizes like the height, width and breadth that can be rendered to be 15 mm or so respectively.

As the third problem, there is mentioned a reduction in power conversion efficiency. In such a flyback system as shown in FIG. 31, a relatively large loss occurs due to a current (flyback current) flowing into the primary winding LM1 side when the power is taken out from the secondary winding LM2 side of the transformer TR1 at the time of off of the transistor Q1. In general, for example, the power conversion efficiency of such a step-up converter as shown in FIG. 28 is 95% or the like, whereas the power conversion efficiency of such as flyback converter as shown in FIG. 31 is 85% or the like.

The present invention has been made in view of the foregoing. The above and other objects and novel features of the present invention will be apparent from the description of the specification and the accompanying drawings.

A summary of typical embodiments of the invention disclosed in this application will be briefly described as follows:

A power supply device according to the present embodiment includes a rectifying circuit, a switch element, an inductor, a current detection resistor, a control circuit, an input voltage detection circuit, a diode and an output capacitor. The power supply device is capable of improving a power factor of a current waveform flowing into the rectifying circuit by on/off-control of the switch element by the control circuit. The rectifying circuit rectifies ac power and supplies power to a first node on the basis of a second node. The switch element has one end coupled to the first node. The inductor has one end coupled to the second node. The inductor stores the power of the first node therein via the switch element when the switch element is driven on, and discharges the stored power when the switch element is driven off. The current detection resistor is inserted between the other end of the switch element and the other end of the inductor. The control circuit allows a third node used as one end of the current detection resistor to function as a ground power supply voltage and controls on/off of the switch element. The output capacitor and diode are inserted onto a path for discharging the power stored in the inductor. The input voltage detection circuit outputs a first voltage by resistance division between the first node and the third node. Here, the control circuit drives off the switch element using a second voltage developed at a fourth node used as the other end of the current detection resistor, and the first voltage to thereby perform an improvement in power factor.

Improving the power factor using such a power supply topology enables reductions in the size of a power supply device and the entire power supply system including the power supply device. Upon performing a current critical mode operation in particular, a control circuit detects a second voltage from a current detection resistor to thereby determine a timing provided to drive on a switch element and a timing provided to drive off the switch element, thus resulting in the usefulness in terms of a size reduction and the like.

A semiconductor device according to the present embodiment includes first through fourth terminals, a multiplication circuit, a square circuit, a first comparator circuit, and a second comparator circuit and assumes a function of improving a power factor. A first voltage proportional to a voltage obtained by rectifying ac power is inputted to the first terminal. The second terminal outputs an on level for driving on an external switch element and an off level for driving off the external switch element. When the second terminal outputs the on level, power is accumulated in an external inductor via the switch element. When the second terminal outputs the off level, the power of the inductor is discharged. A feedback signal outputted from an external load driven by the power of the inductor is inputted to a third terminal. A second voltage proportional to a current flowing through the inductor is inputted to a fourth terminal. A multiplication circuit multiplies the feedback signal and the first voltage by each other. A square circuit performs a square arithmetic operation on an output voltage of the multiplication circuit. A first comparator circuit detects that the second voltage has reached an output voltage of the square circuit. A second comparator circuit detects that the current flowing through the inductor has reached a zero level, based on the second voltage. Here, the second terminal outputs the on level in response to a detection signal from the second comparator circuit and outputs the off level in response to a detection signal from the first comparator.

Thus, the timing provided to drive off a switch element based on a signal via a square circuit is controlled, thereby making it possible to bring an input current waveform closer to a sinusoidal wave by combinations with several power supply topologies. Since the area is not so increased according to the provision of the square circuit, a size reduction in a power supply device is also achieved along with an improvement in power factor. The semiconductor device is more useful in the case of a combination with the above power supply topology of the present embodiment.

Advantageous effects obtained by the typical embodiments of the invention disclosed in the present application will be briefly explained. A power supply device equipped with a power factor correction circuit can be rendered small-sized. It is also possible to achieve a further improvement in power factor.

BRIEF DESCRIPTION OF THE DRAWINGS

FIGS. 25(a) and 25(b) show the details of an oscillator and a triangular wave generator in FIG. 23, in which FIG. 25(a) is a circuit diagram showing a configuration example thereof, and FIG. 25(b) is a waveform diagram showing an example of operation of FIG. 25(a);

FIGS. 34(a) and 34(b) respectively show one example illustrative of a waveform of an ac current flowing through an AC power line, in which FIG. 34(a) is a waveform diagram where a step-up converter shown in FIG. 28 is used, and FIG. 34(b) is a waveform diagram where a flyback converter shown in FIG. 31 is used;

FIGS. 36(a) and 36(b) are respectively typical diagrams each showing one example of the conditions that switching losses occur, in which FIG. 36(a) shows where the power supply device of FIG. 35 is used, and FIG. 36(b) shows, as its comparative example, where the power supply device of FIG. 1 is used;

DETAILED DESCRIPTION

Figure 1:
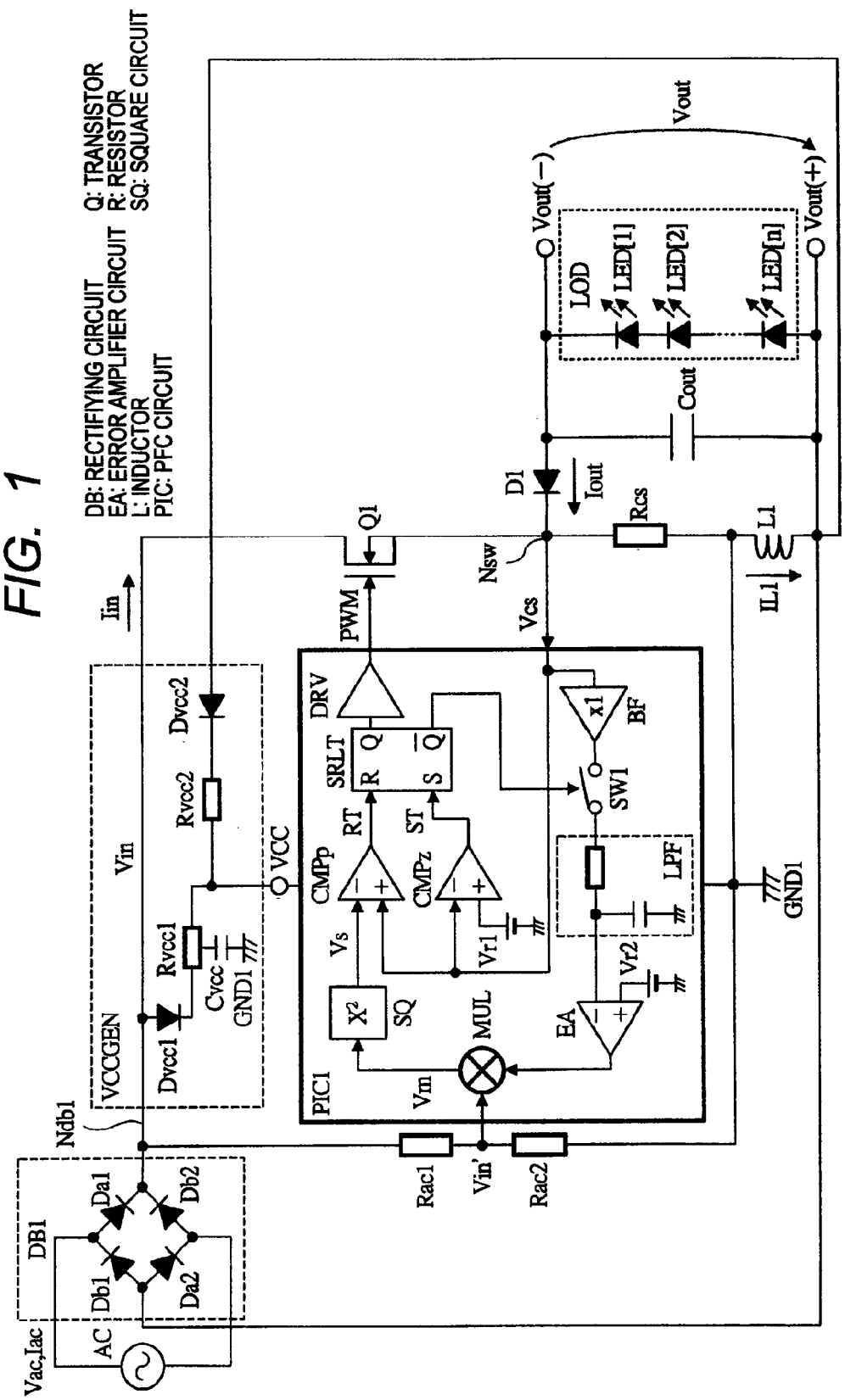
FIG. 1 is a schematic diagram showing one example of a circuit configuration of a power supply device according to a first embodiment of the present invention.

Whenever circumstances require it for convenience in the following embodiments, the subject matter will be described by being divided into a plurality of sections or embodiments. However, unless otherwise specified in particular, they are not irrelevant to one another. One thereof has to do with modifications, details, supplementary explanations and the like of some or all of the other. When reference is made to the number of elements or the like (including the number of pieces, numerical values, quantity, range, etc.) in the following embodiments, the number thereof is not limited to a specific number and may be greater than or less than or equal to the specific number unless otherwise specified in particular and definitely limited to the specific number in principle.

It is further needless to say that components (including element or factor steps, etc.) employed in the following embodiments are not always essential unless otherwise specified in particular and considered to be definitely essential in principle. Similarly, when reference is made to the shapes, positional relations and the like of the components or the like in the following embodiments, they will include ones substantially analogous or similar to their shapes or the like unless otherwise specified in particular and considered not to be definitely so in principle, etc. This is similarly applied even to the above-described numerical values and range.

Circuit elements that configure respective functional blocks of the embodiments are not limited in particular, but formed over a semiconductor substrate like monocrystalline silicon by an IC technology of known CMOS (complementary MOS transistors) or the like. Preferred embodiments of the present invention will hereinafter be described in detail based on the accompanying drawings. Incidentally, the same reference numerals are respectively attached to the same components or members in all the drawings for describing the embodiments in principle, and their repetitive description will be omitted.

First Embodiment

Overall Circuit Configuration of Power Supply Device [1]

FIG. 1 is a schematic diagram showing one example of a circuit configuration of a power supply device according to a first embodiment of the present invention. The power supply device shown in FIG. 1 includes a rectifying circuit DB1, a power factor correction (PFC) circuit (semiconductor device) PIC1, a transistor (switch element) Q1, resistors Rac1, Rac2 and Rcs, an inductor L1, a diode D1, an output capacitor Cout, and a power supply generator VCCGEN. The output capacitor Cout is coupled between a positive polarity output node Vout (+) and a negative polarity output node Vout (−) and supplies an output voltage Vout obtained between the positive polarity output node Vout (+) and the negative polarity output node Vout (−) as a power supply voltage of a load circuit LOD. Here, a plurality of light emitting diodes LED [1] through LED [n] are shown as one example of the load circuit LOD. The LEDs [1] through LED [n] are respectively coupled in series in order with the Vout (+) side as the anode and the Vout (−) side as the cathode.

The rectifying circuit DB1 full-wave rectifies a commercial power source (AC) (ac voltage Vac and ac current Iac) by four diodes Da1, Da2, Db1 and Db2, for example, and outputs an input voltage Vin and an input current Iin to a rectified output node Ndb1 with the positive polarity output node Vout (+) as the reference. The resistors Rac1 and Rac2 are coupled in series between the rectified output node Ndb1 and a ground power supply voltage GND1 and outputs, from a common coupling node thereof, an input voltage detection signal Vin' that assumes a value generated by resistance voltage division from Vin. The transistor (n channel-type power MOS transistor herein) Q1 has a drain coupled to the rectified output node Ndb1, a source coupled to a node Nsw, and a gate driven by a duty control signal PWM generated from the PFC circuit PIC1. The resistor Rcs is coupled between the node Nsw and the ground power supply voltage GND1, and the inductor L1 is coupled between the ground power supply voltage GND1 and the positive polarity output node Vout (+). The diode D1 has an anode coupled to the negative polarity output node Vout (−) and a cathode coupled to the node Nsw.

The PFC circuit (semiconductor device) PIC1 is operated by the ground power supply voltage GND1 and a power supply voltage VCC and outputs a duty control signal PWM in response to the input voltage detection signal Vin' and a detection voltage Vcs obtained at the node Nsw by the resistor Rcs. The power supply voltage VCC is generated by the power supply generator VCCGEN here. The power supply generator VCCGEN stores power of the rectified output node Ndb1 in a capacitor Cvcc via a diode Dvcc1 and a resistor Rvcc1 at power-on and thereby generates the power supply voltage VCC. On the other hand, when the power is stable, the power supply generator VCCGEN stores power of the positive polarity output node Vout (+) in the capacitor Cvcc via a diode Dvcc2 and a resistor Rvcc2 and thereby generates the power supply voltage VCC.

The PFC circuit PIC1 includes a square circuit SQ, comparator circuits CMPp and CMPz, a set/reset latch circuit SRLT, a driver circuit DRV, a buffer circuit BF, a switch circuit SW1, a low-pass filter circuit LPF, and an error amplifier circuit EA. When a reset signal RT is outputted from the comparator circuit CMPp, the set/reset latch circuit SRLT drives the duty control signal PWM to an 'L' level (off level) through the driver circuit DRV. When a set signal ST is outputted from the comparator circuit CMPz, the set/reset latch circuit SRLT drives the duty control signal PWM to an 'H' level (on level) through the driver circuit DRV. The comparator circuit CMPz outputs the set signal ST when the detection voltage Vcs at the switch node Nsw becomes lower than a desired comparison voltage Vr1.

The buffer circuit BF buffers the detection voltage Vcs at a gain 1 and outputs the same to the low-pass filter circuit LPF through the switch circuit SW1. The switch circuit SW1 is turned on during a period in which the set/reset latch circuit SRLT drives the duty control signal PWM to the 'L' level (off level). The error amplifier circuit EA amplifies a difference between the output voltage of the low-pass filter circuit LPF and a predetermined comparison voltage Vr2. The multiplication circuit MUL multiplies the output voltage of the error amplifier circuit EA and the input voltage detection signal Vin' by each other and generates an output signal Vm that assumes the result of its multiplication. The square circuit SQ squares the output signal Vm and generates an output signal Vs that assumes the result of its square. The comparator circuit CMPp outputs the reset signal RT when the detection voltage Vcs exceeds the output signal Vs.

The power supply device shown in FIG. 1 mainly has two features. The first feature resides in that control by the PFC circuit PIC1 is performed using the power supply topology of the high-side inverse converter in which the transistor Q1 is provided on the side of the high potential output node (Ndb1) of the rectifying circuit DB1, the inductor L1 is provided on the side of the low potential output node (Vout (+)) of the rectifying circuit DB1, and the output capacitor Cout is provided between the node lying between the transistor Q1 and the inductor L1, and the node Vout (+). In particular at this time, the power supply device is characterized in that the resistor Rcs is provided between the transistor Q1 and the inductor L1, and one end of the resistor Rcs is coupled to the ground power supply voltage GND1 of the PFC circuit PIC1 and that the input voltage detection signal Vin' is obtained by resistance voltage division between the node (Ndb1) and the ground power supply voltage GND1, The second feature resides in that the square circuit SQ is provided in a stage subsequent to the multiplication circuit MUL, and the on-level period of the duty control signal PWM is determined by the output signal Vs of the square circuit SQ. The details of these features will be explained as appropriate subsequently.

<<Overall Circuit Operation of Power Supply Device [1]>>

Figure 2:
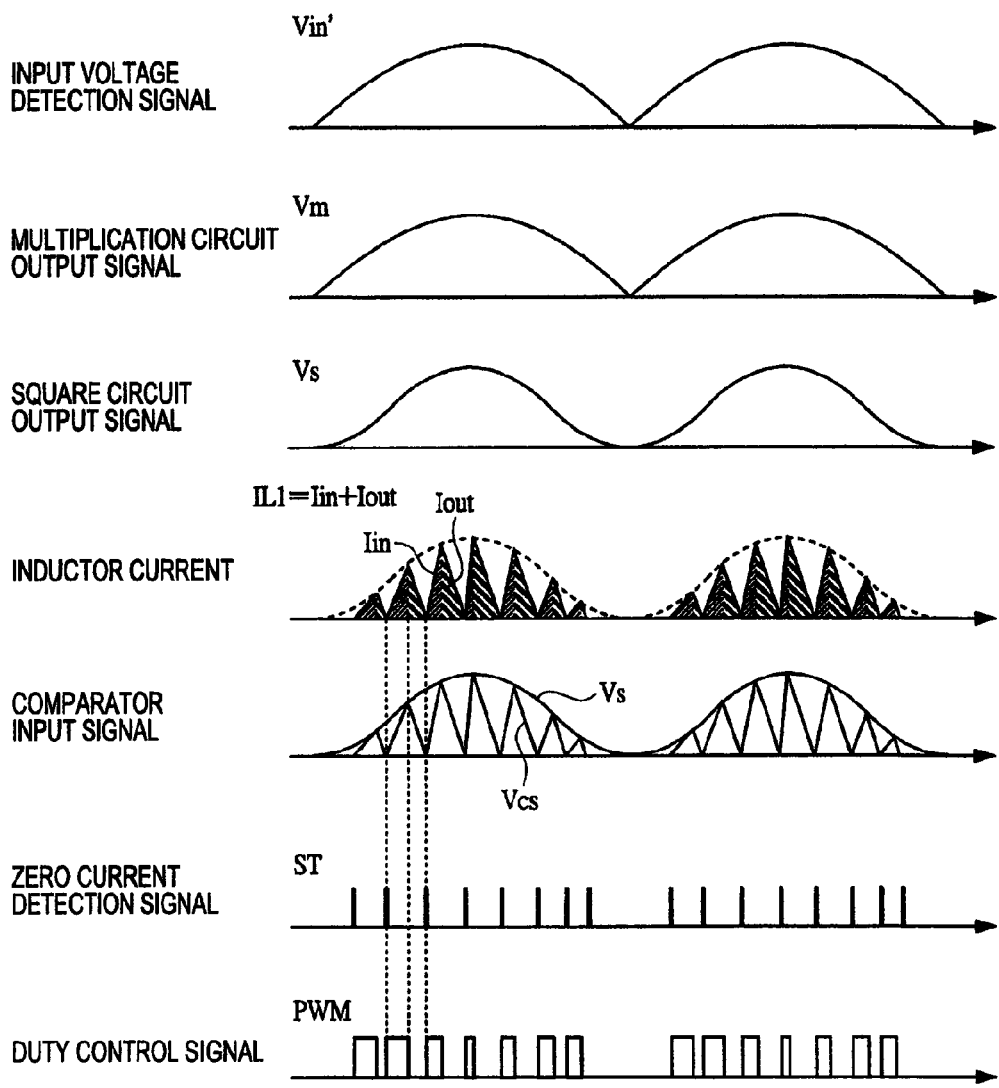
FIG. 2 is a waveform diagram illustrating a schematic example of operation of FIG. 1.
Figure 3:
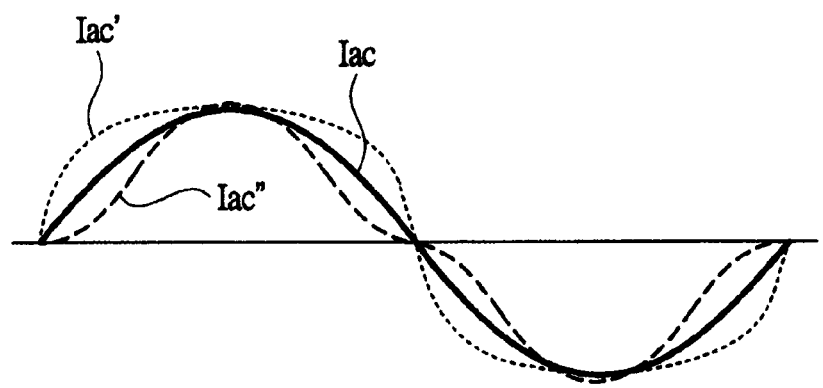
FIG. 3 is an explanatory diagram showing the concept of operation of a square circuit in FIG. 2.

FIG. 2 is a waveform diagram showing a schematic example of operation of FIG. 1. FIG. 3 is an explanatory diagram showing the concept of operation of the square circuit SQ in FIG. 1. Firstly, when a duty control signal PWM is at an 'H' level (on level) as shown in FIG. 2, the transistor Q1 is driven on, so that a growing input current Iin flows into the inductor L1 through the resistor Rcs, thus resulting in the accumulation of power in the inductor L1. With an increase in the input current Iin, a detection voltage Vcs developed at one end (node Nsw) of the resistor Rcs also increases in growing form.

On the other hand, when the detection voltage Vcs reaches the voltage value of the output signal Vs of the square circuit SQ, a reset signal RT is generated from the comparator circuit CMPp to transition the duty control signal PWM to an 'L' level (off level), so that the transistor Q1 is driven off. In doing so, an output current Iout flows through a path of the positive polarity output node Vout (+), negative polarity output node Vout (−), diode D1 and resistor Rcs with the power accumulated in the inductor L1 as an electromotive force. The load circuit LOD (LED [1] to LED [n]) is driven by the output current Iout. During a period in which the transistor Q1 is off, the current (output current Iout) flowing through the inductor L1 is reduced in decreasing form, and the detection voltage Vcs developed at one end (Nsw) of the resistor Rcs also decreases in like manner. When the detection voltage Vcs falls below a comparison voltage Vr1 of the comparator circuit CMPz, a set signal ST is generated so that the transistor Q1 is driven on again.

The comparison voltage Vr1 is set to a value close to zero like a few mV to a few hundred of mV, for example. With its setting, a set signal (zero current detection signal) ST is generated when the value of the output current Iout becomes substantially zero, so that the transistor Q1 is driven on. That is, the power supply device shown in FIG. 1 operates in a current critical mode. In FIG. 1, the detection voltage Vcs (i.e., the result of detection of the output current Iout) in the period of off of the transistor Q1 is inputted to the low-pass filter circuit LPF through the switch circuit SW1. The error amplifier circuit EA detects a difference between the detected value of Iout and a set value (Vr2) of Iout determined in advance. The multiplication circuit MUL reflects the result of detection by the error amplifier circuit EA on the input voltage detection signal Vin' to generate an output signal Vm. Since the input voltage detection signal Vin' becomes a waveform proportional to an input voltage Vin that assumes a sine wave (strictly the absolute value waveform of sinusoidal wave), the output signal Vm assumes the sine wave (strictly the absolute value waveform of sinusoidal wave), and the voltage amplitude thereof becomes a waveform that varies according to the result of detection by the error amplifier circuit EA.

Figure 34A:
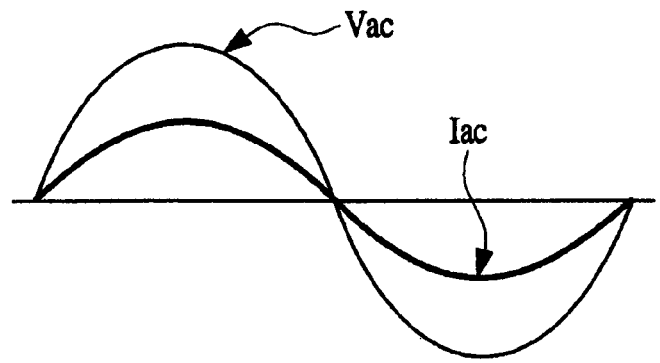
Figure 34B:
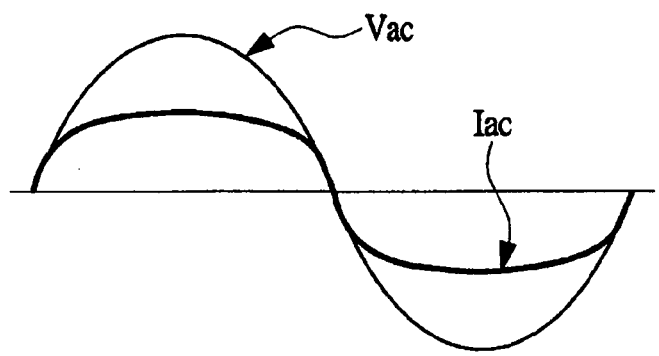

Since the output signal Vs of the square circuit SQ is a value obtained by squaring the output signal Vm, it becomes such a wave shape that the sinusoidal wave is pointed as shown in FIG. 2. Determining the period of the 'H' level (On of transistor Q1) of the duty control signal PWM, based on the output signal Vs having such a wave shape as described above makes it possible to bring the ac current Iac developed in the commercial power line (AC) close to the sinusoidal wave qualitatively in such a manner as shown in FIG. 3. If the square circuit SQ is not provided in FIG. 3, the power supply device of FIG. 1 is of such a circuit system that the input current Iin (ac current Iac of commercial power source (AC)) flows only during the period in which the transistor Q1 is on, in a manner similar to the flyback converter of FIG. 31 referred to above. For this reason, in FIG. 3, the wave shape assumes a trapezoidal current waveform (Iac') to which convex components are added with the sinusoidal wave as the reference in a manner similar to FIG. 34(b).

Thus, in order to cancel out the convex components of the trapezoidal wave (Iac'), the square circuit SQ generates an output signal Vs having cancave components with the sinusoidal wave as the reference, and the power supply device of FIG. 1 generates a virtual current waveform (Iac") (current waveform generated assuming that Iin (Iac) flows during an on/off period of the transistor Q1) based on the output signal Vs. Then, actually, Iin (Iac) flows only during the on period of the transistor Q1. For this reason, the convex components are added to the concave components, thus resulting in the acquisition of a current waveform (Iac) close to the sinusoidal wave. Incidentally, the square circuit SQ is not necessarily required to take the square from this concept, but may take a multiplier factor having convex components taken only to cancel out the concave components.

Although not limited in particular here, the numerical values of the respective circuits in the power supply device of FIG. 1 will be explained by citing their concrete examples in the following manner. The input voltage Vin is a value obtained by full-wave rectifying a commercial power source (AC) (ac voltage Vac) like 85 to 264 Vrms or the like. The resistance values of the resistors Rac1 and Rac2 are 3 MΩ and 27 kΩ or the like respectively. In this case, the input voltage detection signal Vin' becomes a voltage value equal to about 1/100 of the input voltage Vin. The power supply voltage VCC of the PFC circuit PIC1 is 20 V or the like. The inductance value of the inductor L1 is 1 mH or the like, and the capacitance value of the output capacitor Cout is 2 μF or the like. The output voltage Vout developed at the positive polarity output node Vout (+) on the basis of the Vout (−) is 60 V or the like assuming that twenty LEDs each having a forward voltage 3 V are coupled. The resistance value of the resistor Rcs is 1Ω or the like. Assuming that the power consumption of the load circuit (LED) is 10 W or the like, the current value of the output current Iout becomes 0.17 A (=10/60). In this case, power consumed at the resistor Rcs becomes 29 mW (=0.17× 0.17×1), so the effect of a loss by this power consumption on power conversion efficiency of the entire power supply device is small.

Figure 4:
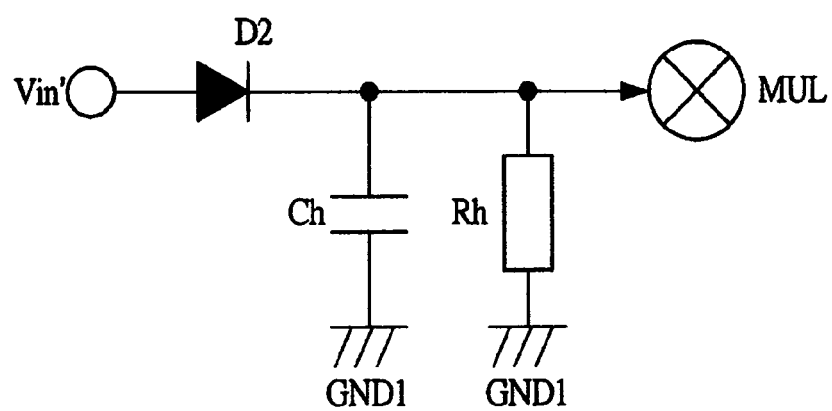
FIG. 4 is a supplementary diagram of FIG. 1.

The sinusoidal input voltage detection signal Vin' such as shown in FIG. 2 is strictly generated when the transistor Q1 is off. When the transistor Q1 is on, the input voltage detection signal Vin' is fixed to approximately the level of the ground power supply voltage GND1. Thus, actually, since a sinusoidal wave corresponding to the input voltage detection signal Vin' at the time of turning off of the transistor Q1 is outputted to the multiplication circuit MUL, such a holding circuit as shown in FIG. 4, for example, is inserted into an input part of the multiplication circuit MUL. The holding circuit shown in FIG. 4 is provided with a diode D2 in which the input voltage detection signal Vin' is used as an anode input, and a capacitor Ch and a resistor Rh (low-pass filter circuit comprised of Ch and Rh) coupled in parallel between the cathode of the diode D2 and the ground power supply voltage GND1. Respective device constants are determined from a low-pass cut-off frequency, AC-voltage detection resistors (Rac1, Rac2), the response of the capacitor Ch to AC-voltage detection resistors (Rac1, Rac2), and noise resistance, etc. For example, the low-pass filter circuit has such a frequency characteristic as to allow an AC frequency (e.g., 50 Hz or 60 Hz) to pass therethrough and to sufficiently cut off a switching frequency (e.g., greater than or equal to 25 kHz). Using such a holding circuit makes it possible to average the input voltage detection signal Vin' at the time of turning-off of the transistor Q1 on a time sequence basis and shape the voltage on the cathode of the diode D2 into the sinusoidal wave corresponding to the input voltage detection signal Vin'.

<<Detailed Circuit Operation of Power Supply Device [1]>>

Figure 5:
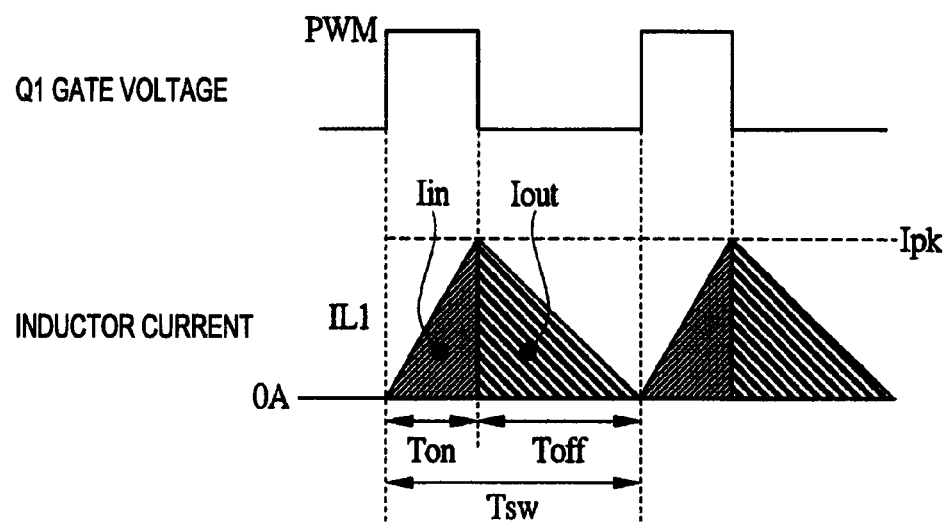
FIG. 5 is a waveform diagram showing a part of FIG. 2 in enlarged form.

A detailed example of operation of a principle part in the power supply device shown in FIG. 1 will next be explained with reference to FIG. 5. FIG. 5 is a waveform diagram showing a part of FIG. 2 in enlarged form and shows a duty control signal (gate voltage of transistor Q1) PWM and a current IL1 flowing through the inductor L1, both of which are extracted in FIG. 2. In FIG. 2, for convenience of explanation, one cycle of the duty control signal PWM becomes long and the peak value of the current IL1 flowing through the inductor L1 for every cycle differs greatly. In practice, however, one cycle of the duty control signal PWM is short and the peak value Ipk of the current IL1 is assumed to be approximately constant within a given short period of time as shown in FIG. 5. Assuming that the inductance value of the inductor L1 is L1, the on period of the transistor Q1 is Ton, the off period thereof is Toff, (the voltage across the resistor Rcs) <<Vout, and (voltage drop in the transistor Q1)<<Vout, the peak value Ipk of the current LI1 is expressed in the following equation (1B):

$$Ipk=(Vin/L1)\times Ton=(Vin/Li)\times Toff \quad (1B)$$

From the above equation (1B), one cycle Tsw of the duty control signal PWM is expressed in the following equation (2B):

$$Tsw=Ton+Toff=((Vin+Vout)/Vout)\times Ton \quad (2B)$$

Using these equations, an average value Iin_ave of the input current Iin in one cycle of the duty control signal PWM is defined by the following equation (3B):

$$\mathrm{Iin\_ave} = \frac{(1/2)\times Ipk \times Ton}{Tsw} = 1/(2\cdot L1)\times \frac{Vin\times Vout}{Vin+Vout1}\times Ton \quad (3B)$$

Since the ground power supply voltage GND1 of the PFC circuit PIC1 is coupled between the transistor Q1 and the inductor L1, the input voltage detection signal Vin' is expressed in the following equation (4B) and assumes a value proportional to (the voltages Vin+Vout).

$$Vin'=(Rac2/(Rac1+Rac2))\times(Vin+Vout) \quad (4B)$$

When (Rac2/(Rac1+Rac2)) in the equation (4B) is assumed to be K2, and the output signal of the error amplifier circuit EA is assumed to be K1, the output signal Vm of the multiplication circuit MUL becomes Vm=K1·K2·(Vin+Vout). Accordingly, the output signal Vs of the square circuit SQ is expressed in the following equation (5B). In the equation (5B), K=(K1·K2)².

$$Vs=K\cdot(Vin+Vout)^2 \quad (5B)$$

The comparator circuit CMPp sets Rcs×Ipk=equation (5B) using Ipk of the equation (1B) to control the transistor Q1 to off when the detection voltage Vcs based on the resistor Rcs reaches the output signal Vs. As a result, the on period Ton is expressed in the following equation (6B):

$$Ton=((K\cdot L1)/Rcs)\times(Vin+Vout)^2/Vin \quad (6B)$$

Substituting the equation (6B) into the equation (3B) yields the following equation (7B). The average value Iin_ave (input current Iin) becomes a value proportional to (Vin+Vout), thus resulting in a waveform close to the sinusoidal wave.

$$Iin\_ave=(K/(2\cdot Rcs))\times Vout\cdot(Vin+Vout) \quad (7B)$$

Thus, the power supply device (PFC circuit PIC1) shown in FIG. 1 acquires the input voltage detection signal Vin' in the form of a function of (Vin+Vout) under the concept of the numerical expression, squares the same to generate the term of (Vin+Vout)²/Vin in the Ton as expressed in the equation (6B) and cancels out the value (Vin+Vout) of the denominator in the equation (3B) by the Ton. Thus, the average value Iin_ave of the equation (3B) is brought close to the function of the input voltage Vin corresponding to the sinusoidal wave.

Figure 6:
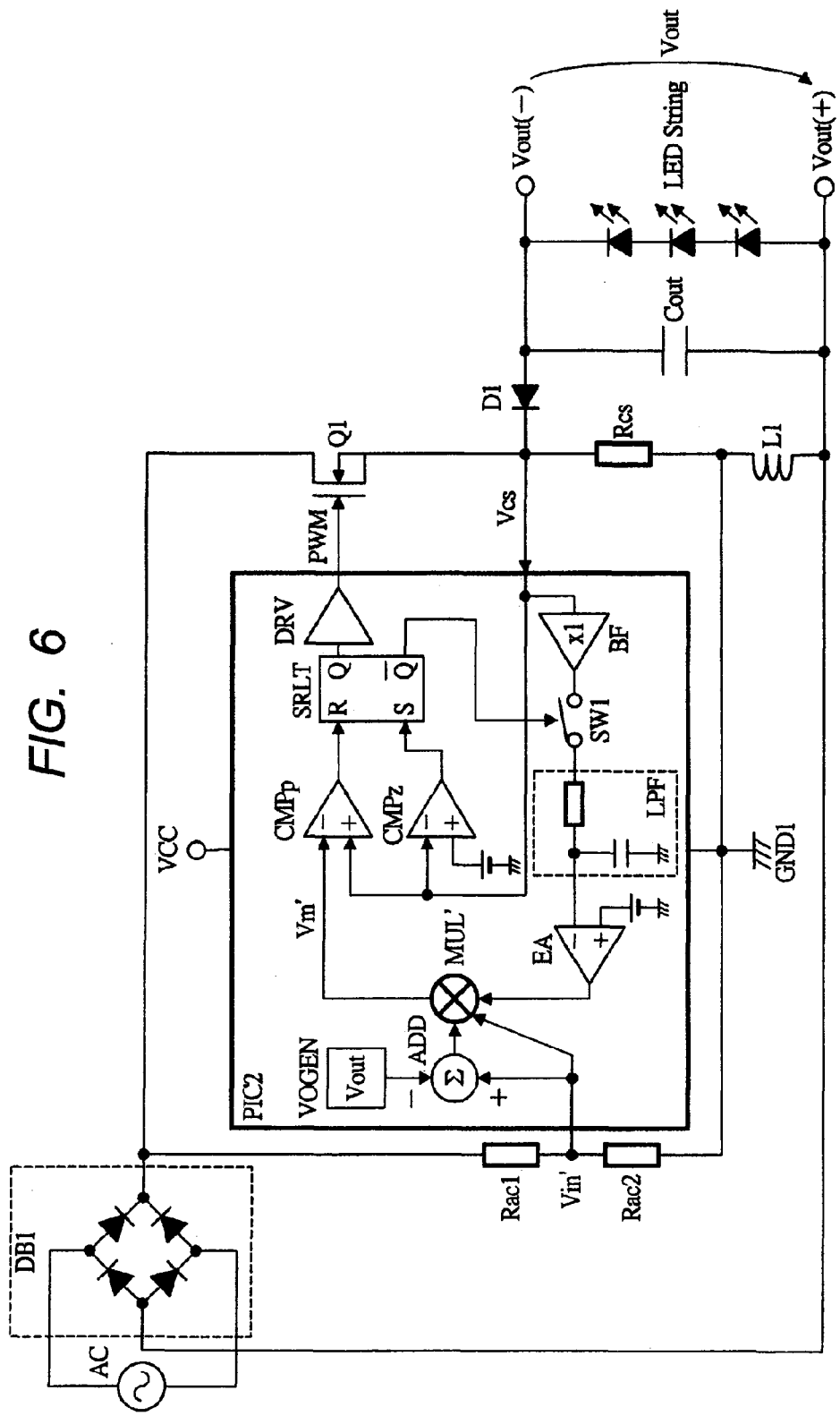
FIG. 6 is a schematic diagram showing a circuit configuration of a comparative example of FIG. 1.

On the other hand, in order to bring the average value Iin_ave to the perfect function of Vin, such a configuration example as shown in FIG. 6, for example, is considered to be used. FIG. 6 is a schematic diagram showing a circuit configuration illustrative of a comparative example shown in FIG. 1. The PFC circuit PIC2 shown in FIG. 6 is provided with a constant generator VOGEN for generating a function of a constant (Vout), a two-input adder ADD, and a three-input multiplication circuit MUL'. The two-input adder ADD subtracts the output (K2·Vout) of the constant generator VOGEN from the input voltage detection signal Vin' shown in the equation (4B) and thereby outputs K2·Vin. The three-input multiplication circuit MUL' multiplies the output of the two-input adder ADD, the input voltage detection signal Vin' and the output signal K1 of the error amplifier circuit EA by one another and thereby generates an output signal Vm' (=K1·(K2)²)·(Vin+Vout)). The term of (Vin+Vout) is generated in the Ton where the output signal Vm' is used instead of the output signal Vs of FIG. 1, so that the value (Vin+Vout) of the denominator in the equation (3B) is canceled out to make it possible to bring the average value Iin_ave to the perfect function of Vin.

When, however, such a configuration example as shown in FIG. 6 is used, the following points are feared, for example. Firstly, it is feared that there is a need to provide adjustment external terminals in order to generate the optimum constant (K2·Vout) from the constant generator VOGEN. That is, the PFC circuit PIC1 is achieved by a small semiconductor package having a small number of external pins (e.g., 6 pins or 8 pins), for example, but additional external terminals are required to cope with Vout and K2 variable depending on the product to be applied, and hence miniaturization of the power supply device becomes difficult. Since the two-input adder ADD and the three-input multiplication circuit MUL' also become necessary, a size increase in the PFC circuit (power supply device) and an increase in cost are also feared with its need. Thus, when such a power supply device as shown in FIG. 1 is used, a substantially sinusoidal-shaped input current waveform which is not a perfect sinusoidal wave but has sufficient quantity in practical use (is capable of reducing higher harmonic components as required and sufficiently), can be generated owing to its small-sized and low-cost configuration.

Figure 7A:
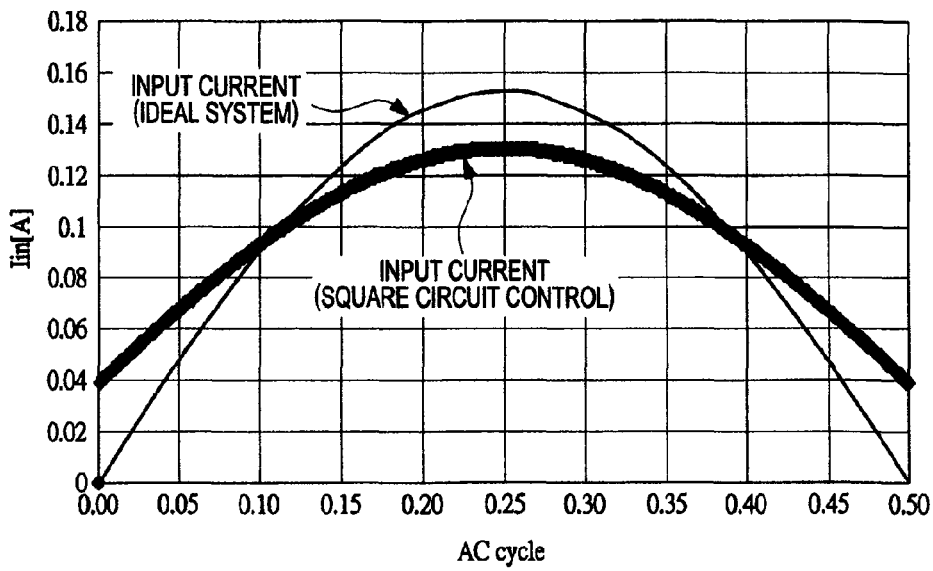
FIGS. 7(a) and 7(b) are respectively waveform diagrams showing results of simulation of input current waveforms where the power supply device shown in FIG. 1 is used.
Figure 7B:
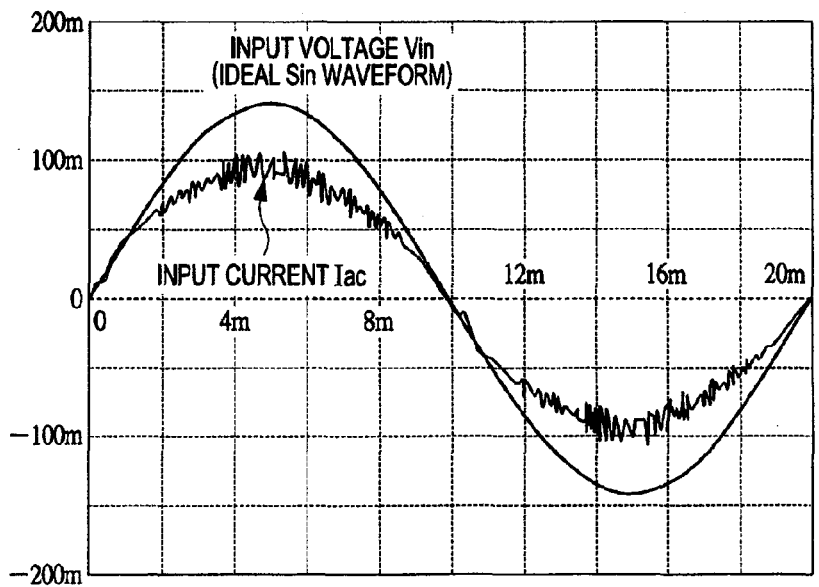

FIGS. 7(a) and 7(b) are waveform diagrams showing results of simulation of an input current waveform where the power supply device of FIG. 1 is used. One example illustrative of an ideal input current waveform (ideal system) indicative of being a sinusoidal wave and a theoretical input current waveform (square circuit control) calculated by the equation (7B) where the power supply device of FIG. 1 is used, is shown in FIG. 7(a). One example indicative of a result of verification by a power supply circuit simulator as targeted for the power supply device of FIG. 1 is shown in FIG. 7(b). The theoretical input current waveform (square circuit control), as shown in FIG. 7(a), its wave shape itself becomes a sinusoidal wave as is understood from the equation (7B), but offset distortion calculated by $(K/(2 \cdot Rcs)) \cdot Vout^2$ exists in a zero crossing point. However, in the circuit operation of the entire power supply device as shown in FIG. 7(b), the effect of distortion at the zero cross is of a level free of a problem in particular, and sufficient waveform quality can be ensured in terms of a practical use.

<<Application Example of Power Supply Device [1]>>

Figure 8:
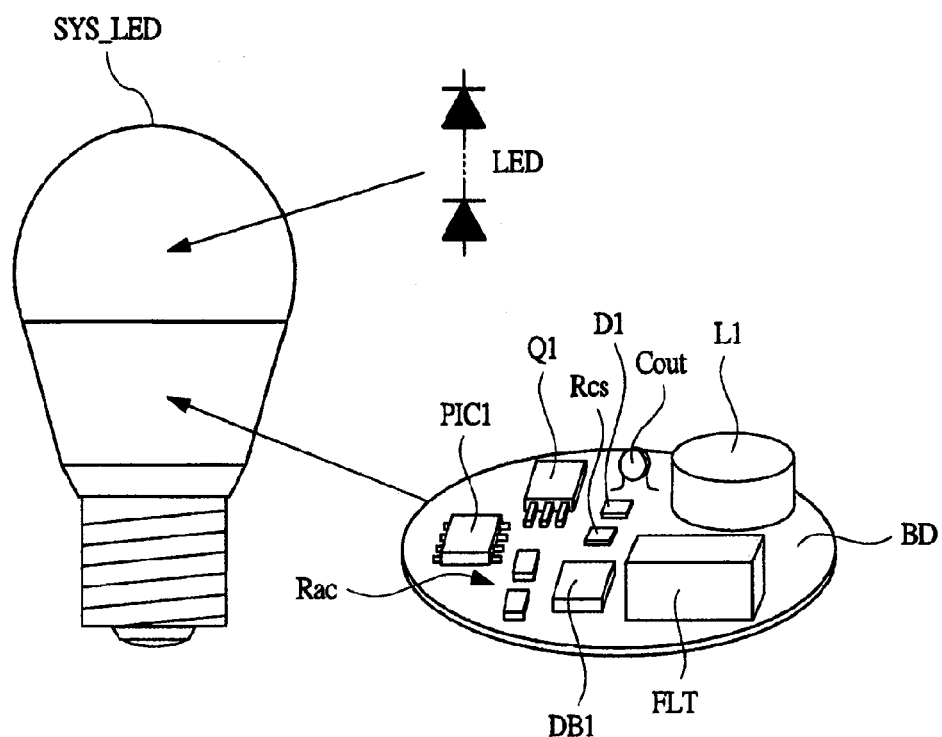
FIG. 8 is an outline diagram illustrating a schematic configuration example of an LED illuminating device equipped with the power supply device of FIG. 1.

FIG. 8 is an outline diagram showing a schematic configuration example of an LED illuminating device equipped with the power supply device of FIG. 1. The LED illuminating device SYS_LED shown in FIG. 8 serves as light-bulb type LED illumination and is equipped thereinside with a plurality of light emitting diodes LEDs, and a wiring board BD which supplies power to the LEDs and corresponds to the power supply device of FIG. 1. For example, a PFC circuit (semiconductor device) PIC1, resistors Rac and Rcs, a rectifying circuit DB1, an AC line filter circuit FLT, a transistor Q1, a diode D1, an output capacitor Cout, an inductor L1, etc. that serve as independent parts (package parts) respectively are mounted over the wiring board BD. The diameter of the wiring board BD is about 4 cm or the like, for example. Since the LED illuminating device or the like needs to achieve the power supply device using such a small wiring board BD in particular, there is a demand for miniaturization of each individual part (package parts).

Figure 31:
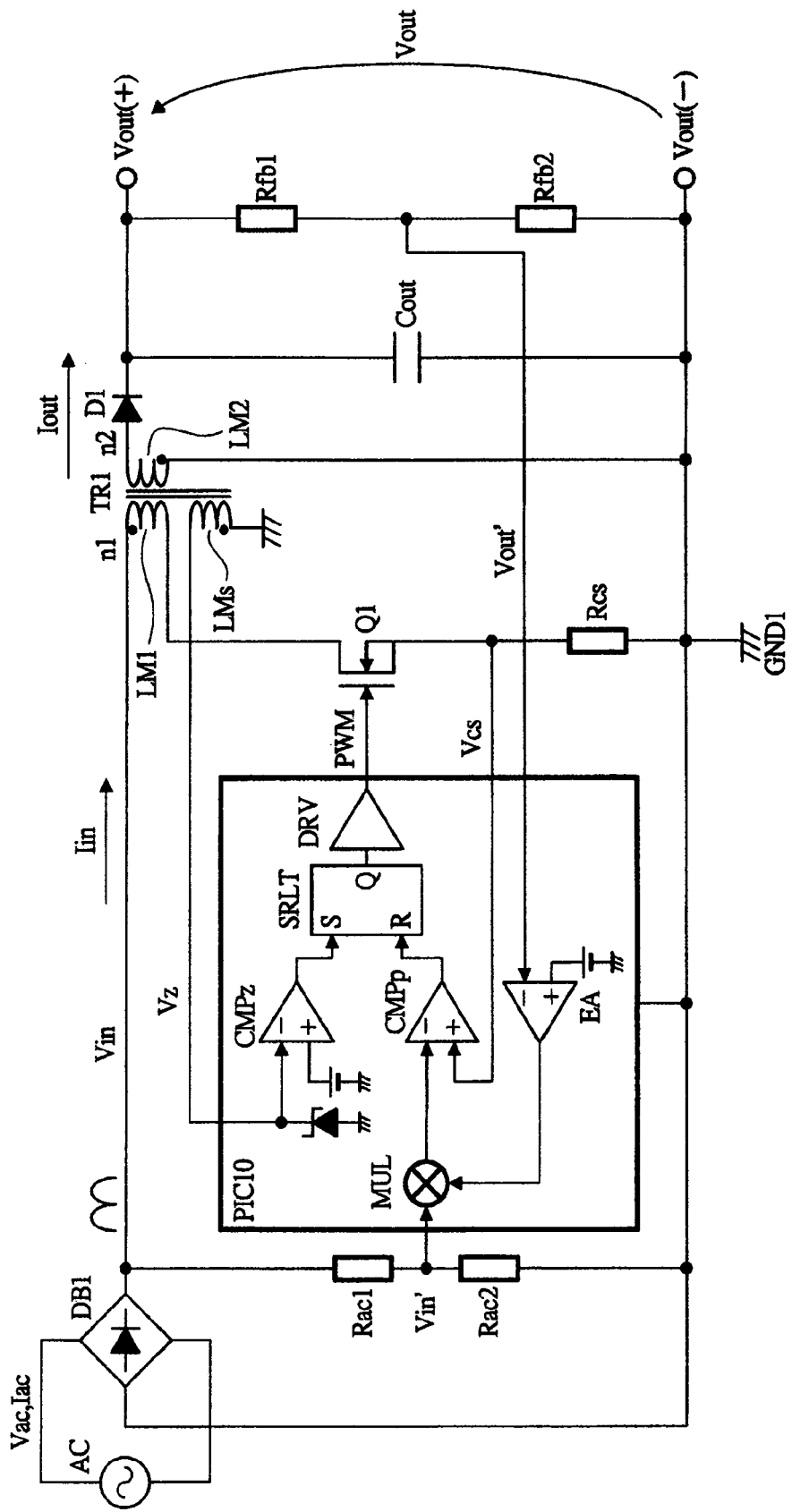
FIG. 31 is a schematic diagram illustrating another configuration example of the AC-DC converter discussed as the premise of the present invention.
Figure 32:
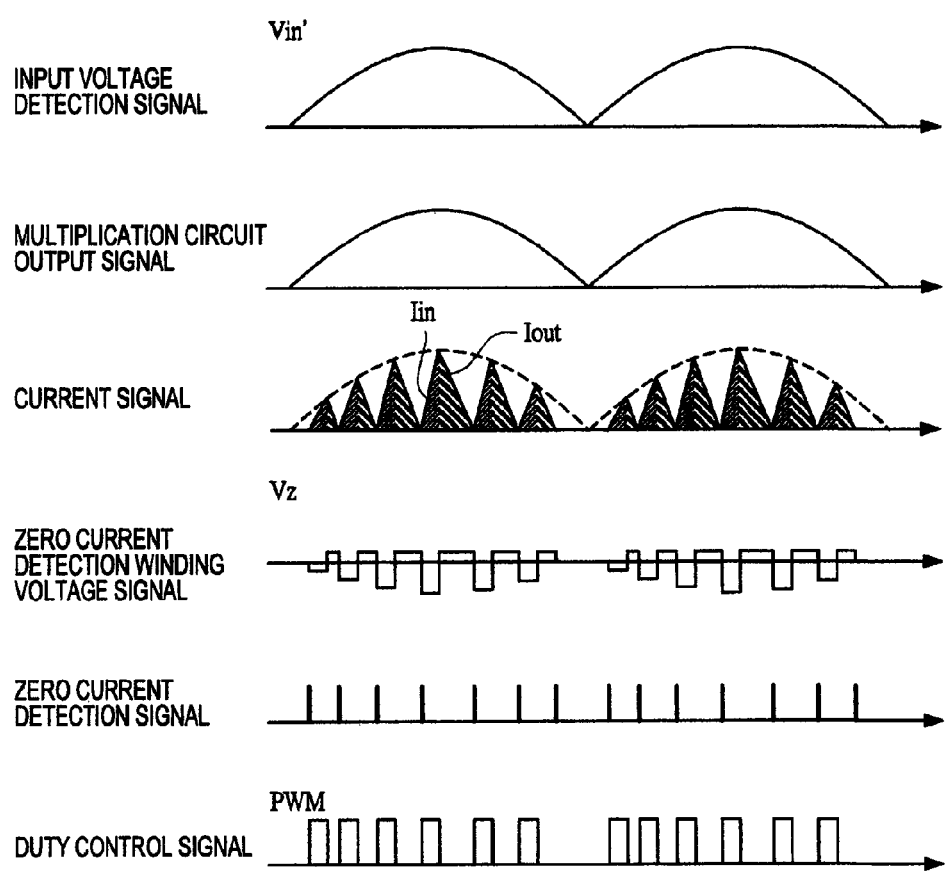
FIG. 32 is a waveform diagram showing an example of operation of FIG. 31.
Figure 33:
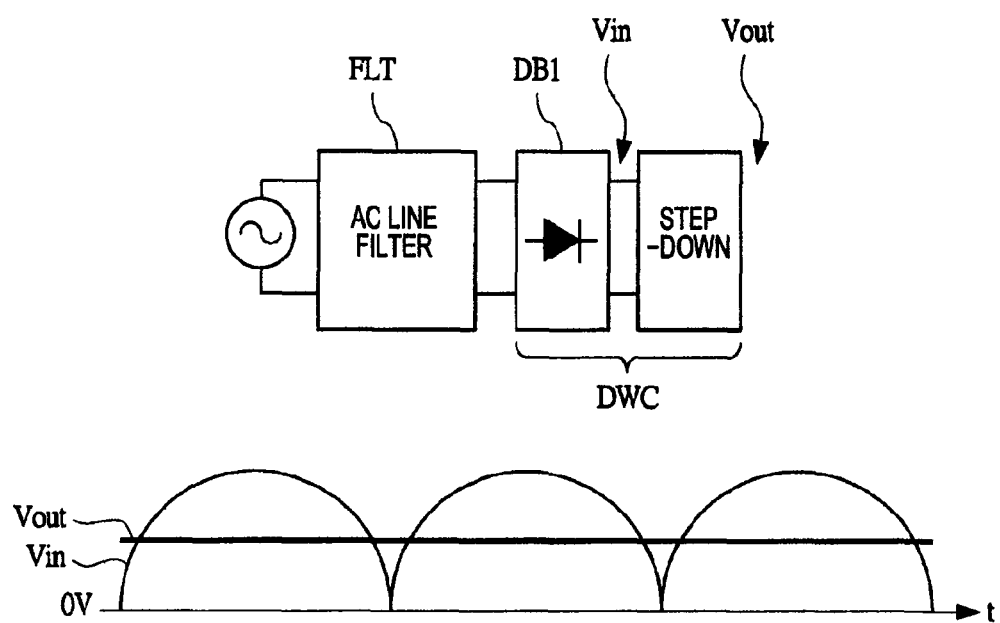
FIG. 33 is a block diagram illustrating a configuration example of an overall power supply system to which the AC-DC converter shown in FIG. 31 is applied.

When such a flyback converter as shown in FIG. 31 is used for example, there is a fear that since the size of the transistor TR1 is large in particular (when the inductance value on the primary winding side is 1 mH or so, for example, its height, width and breadth are 15 mm or so respectively), miniaturization thereof is not sufficiently achieved. Thus, the use of the power supply device of FIG. 1 makes it unnecessary to provide a transformer equipped with a primary winding and a secondary winding, and makes it possible to determine timing provided to perform switching between both on and off levels of the duty control signal PWM according to information from the current detecting resistor Rcs. For this reason, a transformer equipped with supplementary windings also becomes unnecessary. Accordingly, the inductor L1 may be provided instead of the transformer, so that a size reduction in the power supply device is enabled and a reduction in part cost can also be achieved. The inductor L1 whose inductance value is 1 mH or so can be achieved in volume equal to about one-half that of the transformer TR1 in FIG. 31, for example. Incidentally, the AC line filter circuit FLT in FIG. 8 is of a filter circuit for eliminating higher harmonic components inputted from the commercial power source (AC) and is placed between the commercial power source (AC) and the rectifying circuit DB1 in FIG. 1.

<<Details of Multiplication Circuit and Square Circuit>>

Figure 9:
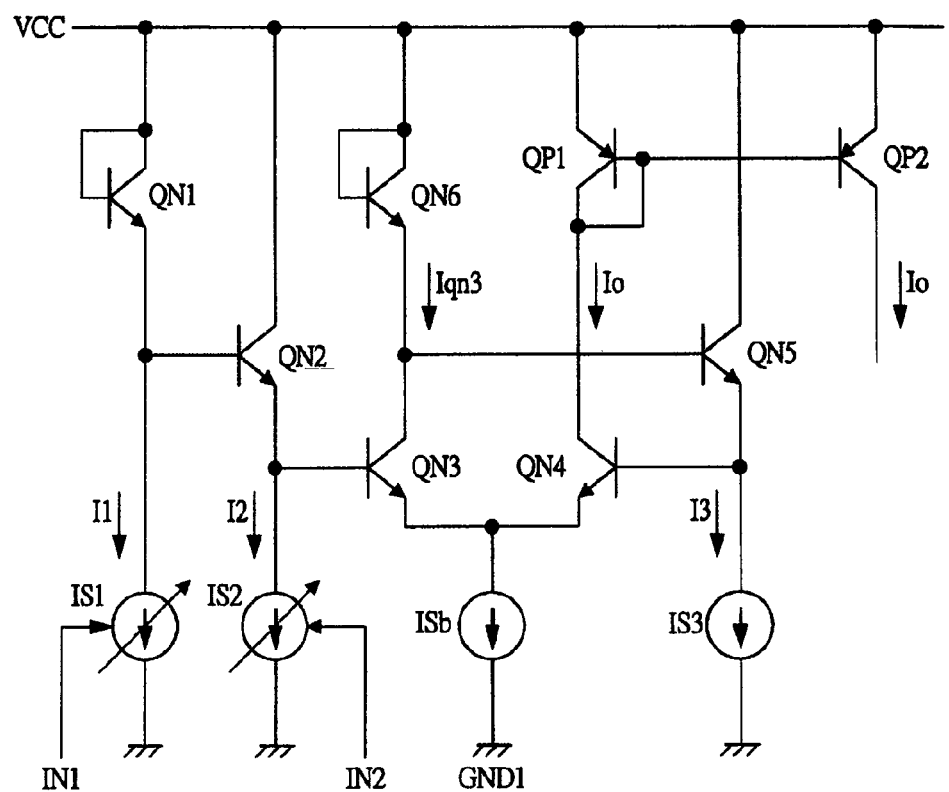
FIG. 9 is a circuit diagram showing a detailed configuration example of a multiplication circuit of the power supply device of FIG. 1.

FIG. 9 is a circuit diagram showing a detailed configuration example of the multiplication circuit MUL in the power supply device of FIG. 1. The multiplication circuit MUL shown in FIG. 9 is equipped with npn type bipolar transistors QN1 through QN6, pnp type bipolar transistors QP1 and QP2, and current sources IS1, IS2, ISb and IS3. The current source IS1 is a variable current source by which a current value I1 varies in proportion to an input voltage IN1 (Vin' of FIG. 1). The current source IS2 is of a variable current source by which a current value I2 varies in proportion to an input voltage IN2 (output voltage of error amplifier circuit EA in FIG. 1). A current value I3 of the current source IS3 is proportional to an internal constant, and a current value of the current source ISb is determined by a design constant. The multiplication circuit shown in FIG. 9 is generally called a translinear circuit. Attention is paid to a closed loop circuit comprised of the npn type bipolar transistors QN1 through QN6 in FIG. 9. Thus, the relationship of "VBE1+VBE2+VBE3=VBE4+VBE5+VBE6" is established with emitter-base voltages of the npn type bipolar transistors QN1 through QN6 as VBE1 through VBE6.

On the other hand, corrector currents (emitter currents) that flow through the npn type bipolar transistors QN1, QN2, QN3, QN4, QN5 and QN6 are I1, I2, Iqn3, Io, I3 and Iqn3 respectively. Here, the emitter-base voltage VBE of each bipolar transistor is expressed in $VBE \approx V_T \cdot \ln(I/Is)$ using the corrector current (emitter current) I, constant $V_T$ and constant Is assuming that its base current is negligible. Accordingly, the relationship of "I1·I2·Iqn3=Io·I3·Iqn3" is established and "Io=((I1·I2)/I3)". By converting the current Io to a voltage value, the output signal Vm of FIG. 1 indicative of the result of multiplication of the input voltages IN1 (Vin' of FIG. 1) and IN2 (output voltage of error amplifier circuit EA of FIG. 1) is obtained.

Figure 10:
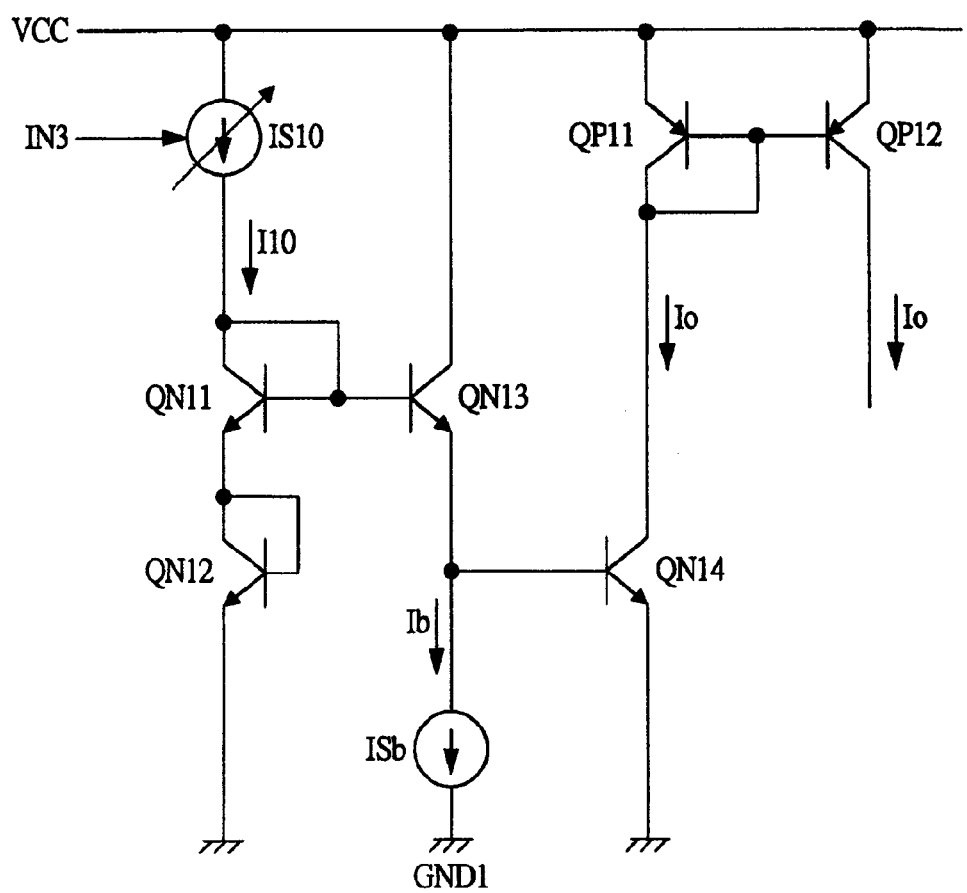
FIG. 10 is a circuit diagram depicting a detailed configuration example of the square circuit of the power supply device of FIG. 1.

FIG. 10 is a circuit diagram showing a detailed configuration example of a square circuit SQ in the power supply device of FIG. 1. The square circuit SQ shown in FIG. 10 is equipped with npn type bipolar transistors QN11 through QN14, pnp type bipolar transistors QP11 and QP12, and current sources IS10 and ISb and serves as a translinear circuit in a manner similar to FIG. 9. The current source IS10 is of a variable current source by which a current value I10 varies in proportion to an input voltage IN3 (Vm of FIG. 1). A current value Ib of the current source ISb is determined by a design constant. Attention is paid to a closed loop circuit comprised of the npn type bipolar transistors QN11 through QN14 in FIG. 10. Thus, the relationship of "VBE11+VBE12=VBE13+VBE14" is established with emitter-base voltages of the npn type bipolar transistors QN11 through QN14 as VBE11 through VBE14. On the other hand, collector currents (emitter currents) that flow through the npn type bipolar transistors QN11, QN12, QN13 and QN14 are I10, I10, Ib, and Io respectively. Accordingly, the relationship of "I10·I10=Ib·Io" is established and "Io=((I10)$^2$/Ib)". By converting the current Io to a voltage, the output signal Vm of FIG. 1 in which the input voltage IN3 (Vm of FIG. 1) is squared is obtained.

In generally, the multiplication circuit MUL and the square circuit SQ can be achieved by various circuit systems as typified by an arithmetic circuit using an operational amplifier, for example. The arithmetic circuit using the operational amplifier is however high in accuracy but large in its circuit area and also becomes large in power consumption. To this end, such translinear circuits as shown in FIGS. 9 and 10 are used, so that the circuit area can be reduced and power consumption can also be made relatively small. Incidentally, the translinear circuit can be achieved using the bipolar transistors herein, but may also be achieved using a subthreshold region (region in which a source-drain current exponentially rises with respect to a gate-source voltage) of each MOS transistor, for example. In this case, a further reduction in circuit area and a reduction in power consumption can be achieved.

<<Advantages of Power Supply Device [1]>>

Thus, principal advantages obtained by using the power supply device according to the first embodiment are summarized as follows: As the first advantage, a size reduction in the power supply device or a reduction in its cost can be achieved. This advantage is obtained by, as described above, firstly using the power supply topology of the high-side inverse converter (might also be called polarity inverse chopper system), optimizing the position of insertion of the current detecting resistor Rcs and the point of coupling of the PFC circuit PIC1 to the ground power supply voltage GND1, and making the transformer unnecessary. This advantage is also obtained by using the square circuit SQ in the PFC circuit PIC1 instead of the use of the complicated circuits such as the adder ADD, three-input multiplication circuit MUL' and the like such as shown in FIG. 6.

As the second advantage, higher harmonic components likely to occur in the input current can be reduced. This advantage is obtained by enabling the input voltage detection signal Vin' to be acquired as the function of (Vin+Vout) by the use of the square circuit SQ and the combination thereof with the power supply topology of the high-side inverse converter in addition to it as described above. As the third advantage, power conversion efficiency can be improved. This advantage is obtained from the use of the power supply topology of the high-side inverse converter without using the power supply topology using the transformer like such a flyback converter.

Incidentally, in the power supply device of FIG. 1, the input voltage detection signal Vin' is multiplied by the multiplication circuit MUL and thereafter squared by the square circuit SQ, but the input voltage detection signal Vin' may be multiplied by the multiplication circuit MUL after having been squared by the square circuit SQ. In this case, however, it is feared that since the input voltage detection signal Vin' is squared and inputted to the multiplication circuit MUL, the difference in level between the signals inputted to the multiplication circuit MUL where the input voltage detection signal Vin' is large and small, becomes very large, thus causing a difficulty in ensuring a signal operation range inside the PFC circuit. From this point of view, such a coupling order as shown in FIG. 1 may preferably be used. When such a configuration as described in the patent document 1 is used, for example, the above coupling order is required to be set to the latter for the reasons of the need for gain control of the square circuit. In the present embodiment, however, the former coupling order can be used because the gain control is unnecessary.

As described above, the power supply device of FIG. 1 mainly has the two features (square circuit and power supply topology), but is not necessarily required to have both features. However, even in the case of the provision of only either one of the two features, a sufficient useful advantage is obtained. The power supply device may preferably have both features to obtain a more beneficial advantage.

Second Embodiment

A second embodiment will explain a modification of the power supply device shown in FIG. 1.

<<Overall Circuit Configuration of Power Supply Device [2]>>

Figure 11:
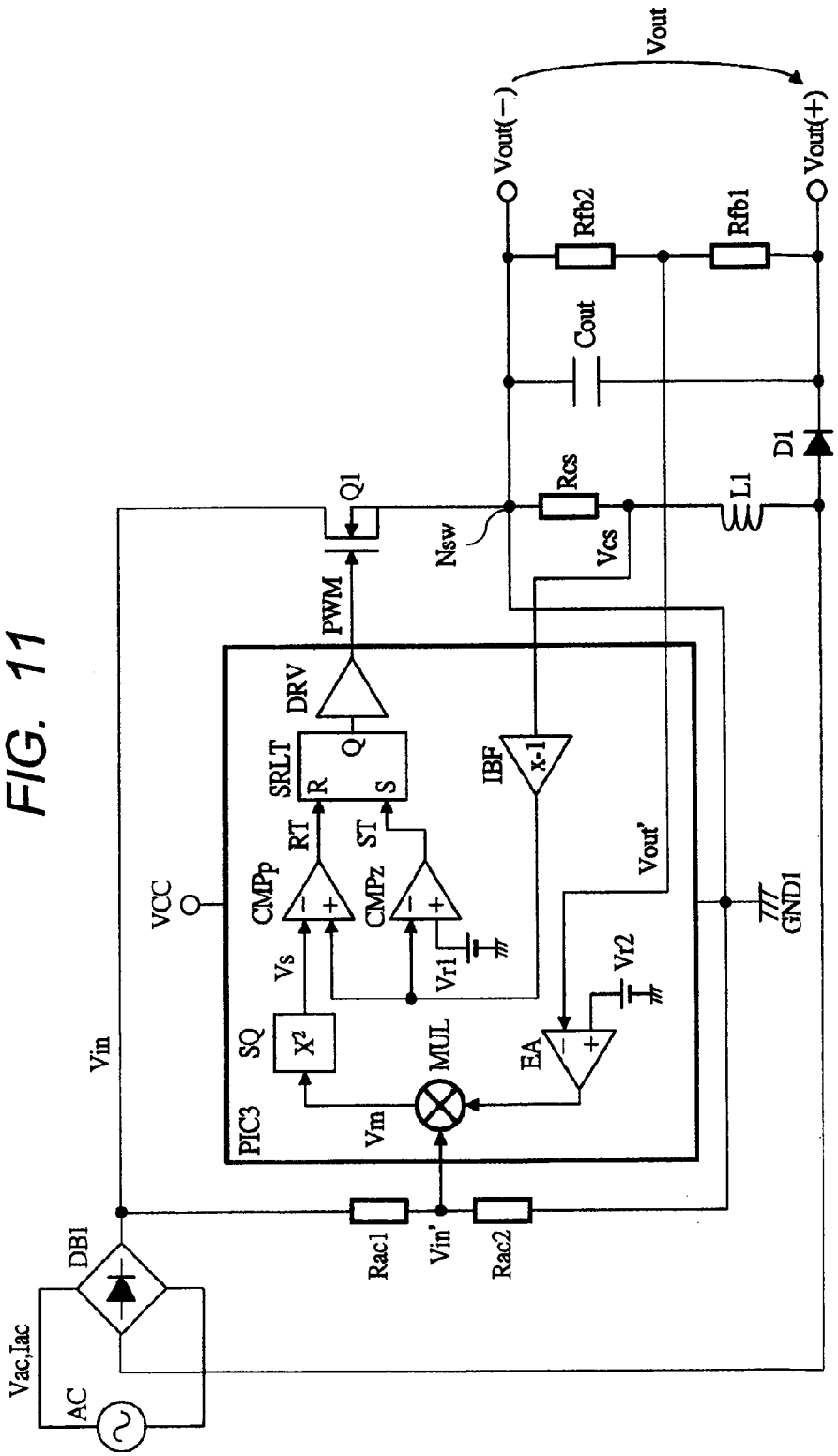
FIG. 11 is a schematic diagram showing one example of a circuit configuration of a power supply device according to a second embodiment of the present invention.

FIG. 11 is a schematic diagram showing one example of a circuit configuration of a power supply device according to a second embodiment of the present invention. A description will now be made while paying attention to points of difference between the present power supply device and the power supply device shown in FIG. 1. The power supply device shown in FIG. 11 is different from the power supply device of FIG. 1 in that the point of coupling of a ground power supply voltage GND1 of a PFC circuit and the point of acquisition of a detection voltage Vcs with it, and the position of a diode D1 differ, and that an output voltage Vout is fed back to the PFC circuit. That is, in the power supply device of FIG. 11, the ground power supply voltage GND1 of the PFC circuit PIC3 is coupled to a node Nsw on the transistor Q1 side of a resistor Rcs, and the PFC circuit PIC3 acquires a detection voltage Vcs from a node on the inductor L1 side of the resistor Rcs. The diode D1 is inserted between one end of the inductor L1 and a positive polarity output node Vout (+) with the L1 side as its anode and the Vout (+) side as the cathode. With its insertion, a negative polarity output node Vout (−) is coupled to the node Nsw and the ground power supply voltage GND1.

Further, the power supply device shown in FIG. 11 includes resistors Rfb1 and Rfb2 coupled in series between the positive polarity output node Vout (+) and the negative polarity output node Vout (−) and outputs an output voltage detection signal Vout' from a node for resistance division of the output voltage Vout by the resistors. The output voltage detection signal Vout' is inputted to an error amplifier circuit EA of the PFC circuit PIC3. The error amplifier circuit EA detects a difference between the output voltage detection signal Vout' and a set value (comparison voltage Vr2) of the output voltage Vout determined in advance and outputs the same to a multiplication circuit MUL. A signal Vm outputted from the multiplication circuit MUL is inputted to a comparator circuit CMPp via a square circuit SQ in a manner similar to the PFC circuit PIC1 of FIG. 1. The PFC circuit PIC3 has an inverse buffer circuit IBF which receives a detection voltage Vcs developed by the resistor Rcs therein as an input and outputs the same at a −1-time gain. The output voltage of the inverse buffer circuit IBF is compared with the output signal Vs of the square circuit SQ by the comparator circuit CMPp and compared with a comparison voltage Vr1 by a comparator circuit CMPz.

Assuming now where the voltage feedback system is applied to the power supply device of FIG. 1 (i.e., where such resistors Rfb1 and Rfb2 as shown in FIG. 11 are added), the PFC circuit detects a voltage obtained by adding a voltage developed by the resistor Rcs and the diode D1 to the output voltage detected by resistance division by the resistors Rfb1 and Rfb2. In this case, there is a fear that an error occurs in the detected value of the output voltage. On the other hand, when the power supply device shown in FIG. 11 is used, the PFC circuit PIC3 detects an output voltage with Vout (−) as GND1, thereby making it possible to detect the output voltage with a high degree of accuracy.

Third Embodiment

A third embodiment will explain a case in which the square circuit SQ described in the first embodiment is applied to a flyback converter.

<<Overall Circuit Configuration of Power Supply Device [3]>>

Figure 12:
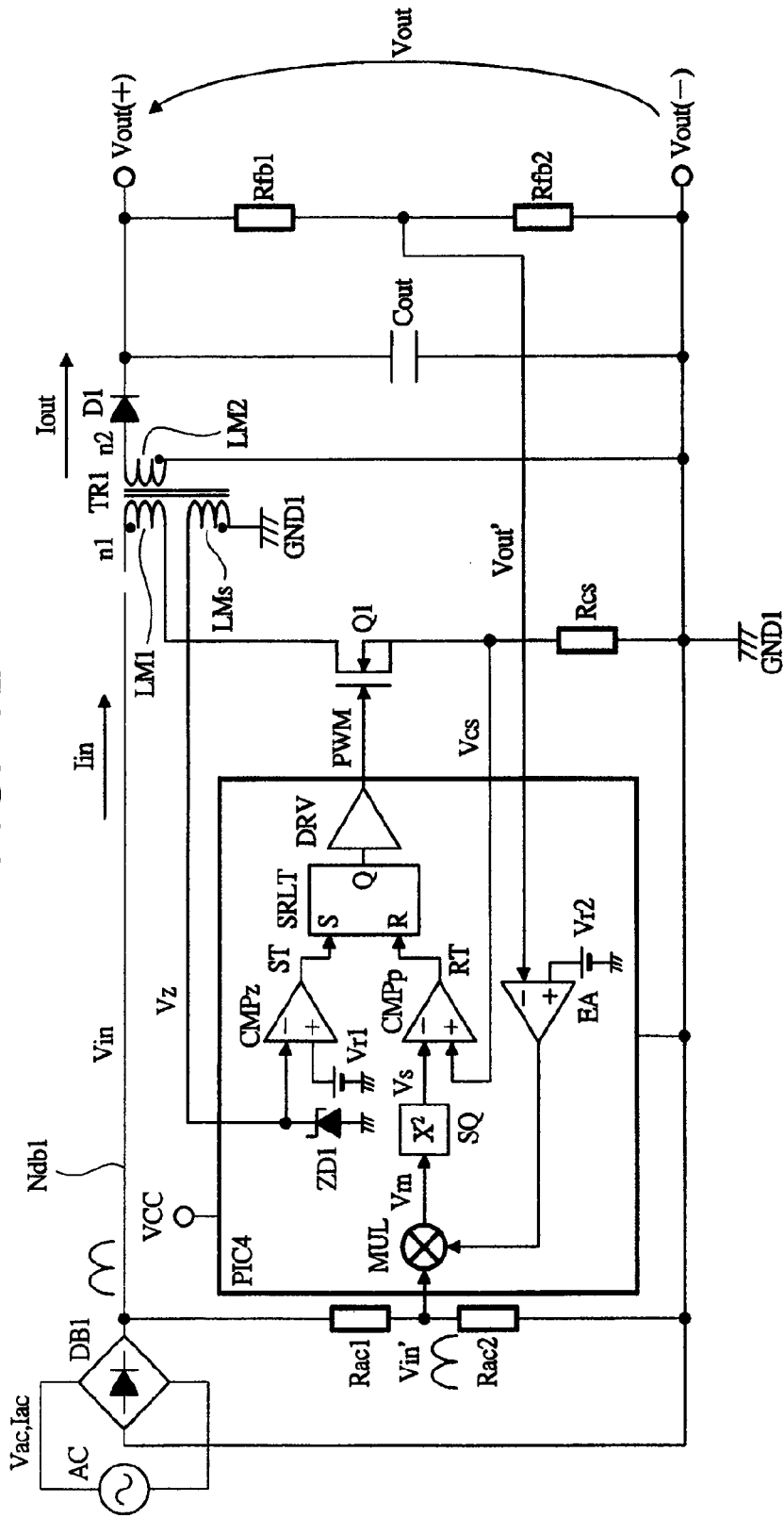
FIG. 12 is a schematic diagram illustrating one example of a circuit configuration of a power supply device according to a third embodiment of the present invention.

FIG. 12 is a schematic diagram showing one example of a circuit configuration of a power supply device according to a third embodiment of the present invention. The power supply device shown in FIG. 12 includes a rectifying circuit DB1, a power factor correction (PFC) circuit (semiconductor device) PIC4, a transistor (switch element) Q1, resistors Rac1, Rac2, Rcs, Rfb1 and Rfb2, a transformer TR1, a diode D1, and an output capacitor Cout. The output capacitor Cout is coupled between a positive polarity output node Vout (+) and a negative polarity output node Vout (−) and supplies an output voltage Vout generated at the positive polarity output node Vout (+) with the negative polarity output node Vout (−) as a reference to a load circuit (not shown). The negative polarity output node Vout (−) is coupled to a ground power supply voltage GND1.

The rectifying circuit DB1 full-wave rectifies a commercial power source (AC) (ac voltage Vac and ac current Iac) and outputs an input voltage Vin and an input current Iin to a rectified output node Ndb1 with the ground power supply voltage GND1 as the reference. The resistors Rac1 and Rac2 are coupled in series between the rectified output node Ndb1 and the ground power supply voltage GND1 and outputs, from a common coupling node thereof, an input voltage detection signal Vin' that assumes a value generated by resistance voltage division from the input voltage Vin. The transformer TR1 has a primary winding (inductor) LM1, a secondary winding (inductor) LM2 and a supplementary winding (inductor) LMs. The transistor (n channel-type power MOS transistor herein) Q1 has a drain coupled to the rectified output node Ndb1 via the primary winding LM1, a source coupled to one end of the resistor Rcs, and a gate driven by a duty control signal PWM generated from the PFC circuit PIC4. The other end of the resistor Rcs is coupled to the ground power supply voltage GND1. The diode D1 has an anode coupled to the ground power supply voltage GND1 via the secondary winding LM2, and a cathode coupled to the positive polarity output node Vout (+). The resistors Rfb1 and Rfb2 are coupled in series between the positive polarity output node Vout (+) and the negative polarity output node Vout (−) (GND1) and outputs, from a common coupling node thereof, an output voltage detection signal Vout' that assumes a value generated by resistance voltage division from the output voltage Vout.

The PFC circuit (semiconductor device) PIC4 is operated by the ground power supply voltage GND1 and a power supply voltage VCC and outputs a duty control signal PWM in response to the input voltage detection signal Vin', a detection voltage Vcs by the resistor Rcs and the output voltage detection signal Vout'. The PFC circuit PIC4 includes a multiplication circuit MUL, a square circuit SQ, comparator circuits CMPp and CMPz, a set/reset latch circuit SRLT, a driver circuit DRV, an error amplifier circuit EA and a protection zener diode ZD1.

When a reset signal RT is outputted from the comparator circuit CMPp, the set/reset latch circuit SRLT drives the duty control signal PWM to an 'L' level (off level) through the driver circuit DRV. When a set signal ST is outputted from the comparator circuit CMPz, the set/reset latch circuit SRLT drives the duty control signal PWM to an 'H' level (on level) through the driver circuit DRV. The comparator circuit CMPz outputs the set signal ST when a detection voltage Vz obtained by the supplementary winding LMs of the transformer TR1 becomes lower than a predetermined comparison voltage Vr1. Incidentally, when a high voltage occurs in the detection voltage Vz, the comparator circuit CMPz is protected by a clamp operation of the zener diode ZD1. The error amplifier circuit EA amplifies a difference between the output voltage detection signal Vout' and a predetermined comparison voltage Vr2. The multiplication circuit MUL multiplies the output voltage of the error amplifier circuit EA and the input voltage detection signal Vin' by each other and thereby generates an output signal Vm indicative of the result of its multiplication. The square circuit SQ squares the output signal Vm and generates an output signal Vs indicative of the result of its square. The comparator circuit CMPp outputs a reset signal RT when the detection voltage Vcs based on the resistor Rcs exceeds the output signal Vs.

<<Overall Circuit Operation of Power Supply Device [3]>>

Figure 13:
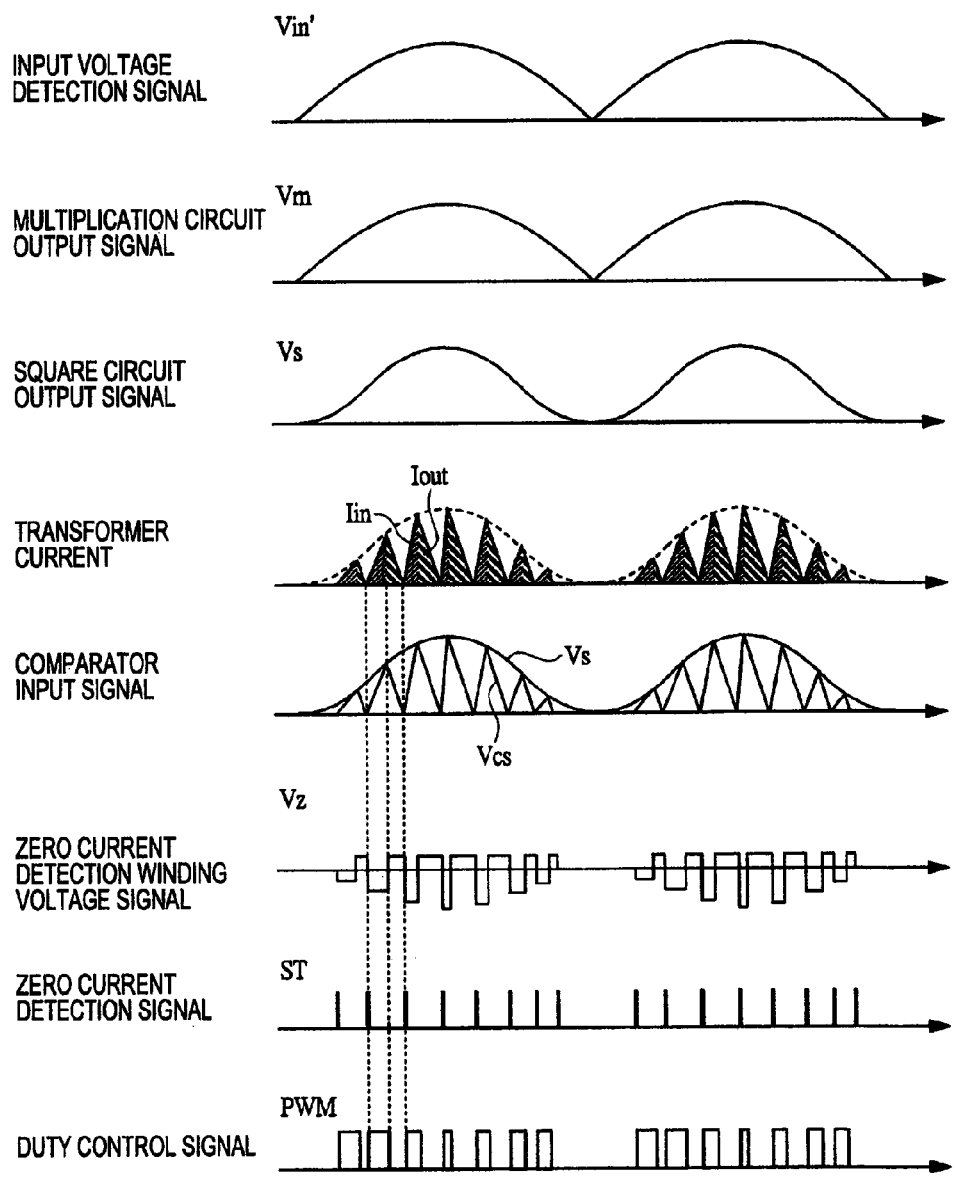
FIG. 13 is a waveform diagram showing a schematic example of operation of FIG. 12.

FIG. 13 is a waveform diagram showing a schematic example of operation of FIG. 12. Firstly, when a duty control signal PWM is at an 'H' level (on level) as shown in FIG. 13, the transistor Q1 is driven on, so that an increasing input current Iin flows through the primary winding LM1 of the transformer TR1 and power is accumulated in the transformer TR1. With an increase in the input current Iin, the corresponding detection voltage Vcs also increases in growing form. On the other hand, when the detection voltage Vs reaches a voltage value of an output signal Vs of the square circuit SQ, a reset signal RT is generated from the comparator circuit CMPp and hence the duty control signal PWM is transitioned to an 'L' level (off level), so that the transistor Q1 is driven off. Since the voltage polarities of the primary and secondary windings LM1 and LM2 of the transformer TR1 are respectively inverted in doing so, the power accumulated in the transformer TR1 is discharged via the secondary winding LM2. That is, the diode D1 is biased in the forward direction so that an output current Iout is supplied to the corresponding load circuit and thereby the charging of the output capacitor Cout is performed. During a period in which the transistor Q1 is off, the current (output current Iout) flowing through the secondary winding LM2 is reduced in decreasing form. Then, when the power accumulated in the transformer TR1 reaches zero (Iout reaches zero), a voltage Vz detected at the supplementary winding LMs suddenly drops to zero. When the voltage Vz falls below the comparison voltage Vr1 of the comparator circuit CMPz, a set signal ST is generated so that the transistor Q1 is driven on again. That is, the power supply device of FIG. 12 operates in a current critical mode.

In FIG. 12, the error amplifier circuit EA detects a difference between an output voltage detection signal Vout' and a set value (Vr2) of a predetermined Vout'. The multiplication circuit MUL reflects the result of detection by the error amplifier circuit EA on the input voltage detection signal Vin' to generate an output signal Vm. Since the input voltage detection signal Vin' takes a waveform proportional to an input voltage Vin that becomes a sinusoidal wave (strictly the absolute value waveform of sinusoidal wave), the output signal Vm assumes the sine wave (strictly the absolute value waveform of sinusoidal wave), and the voltage amplitude thereof becomes a waveform that varies according to the result of detection by the error amplifier circuit EA. Since the output signal Vs of the square circuit SQ is of a value obtained by squaring the output signal Vm, the output signal assumes such a wave shape that the sinusoidal wave is pointed as shown in FIG. 13.

Here, in a manner similar to the power supply device of FIG. 1, the power supply device shown in FIG. 12 takes a circuit system in which the input current Iin flows during the on period of the transistor Q1 and the output current Iout flows during its off period. If the square circuit SQ is not provided in this case, then the waveform of the ac current Iac (input current Iin) can take the trapezoidal shape as described in FIG. 34. Thus, the period of the 'H' level (on of transistor Q1) of the duty control signal PWM is determined based on the output signal Vs having such a wave shape that the sinusoidal wave is pointed, thereby making it possible to bring the ac current Iac developed in the commercial power line (AC) close to the sinusoidal wave.

<<Detailed Circuit Operation of Power Supply Device [3]>>

Figure 14:
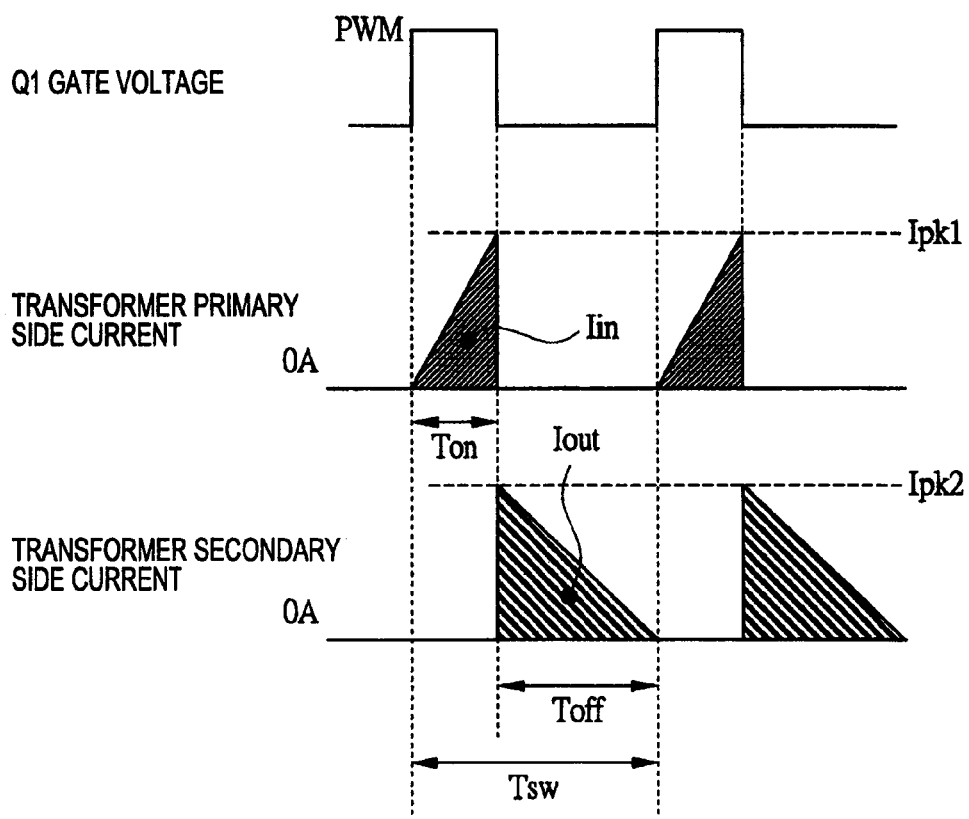
FIG. 14 is a waveform diagram illustrating a part of FIG. 13 in enlarged form.

A detailed example of operation of the principal part in the power supply device of FIG. 12 will next be explained with reference to FIG. 14. FIG. 14 is a waveform diagram showing a part of FIG. 13 in developed form and shows a duty control signal (gate voltage of transistor Q1) PWM, and an input current Iin flowing through the primary side of the transformer TR1 and an output current Iout flowing through the secondary side thereof, all of which are extracted in FIG. 13. First assume that the inductance value of the primary winding LM1 is LM1, the inductance value of the secondary winding LM2 is LM2, the number of turns in the primary winding LM1 is n1, and the number of turns in the secondary winding LM2 is n2, the relationship of the following equation (1C) is established in terms of the characteristics of the transformer:

$$n1 \times Iin = n2 \times Iout$$

$$LM2 = LM1 \times (n2/n1)^2 \quad (1C)$$

Referring to FIG. 14, the peak value Ipk1 of the input current Iin is expressed in the following equation (2C) using an on period Ton of the transistor Q1, and the peak value Ipk2 of the output current Iout is expressed in the following equation (3C) using an off period Toff of the transistor Q1 and an output voltage Vout.

$$Ipk1 = (Vin/LM1) \cdot Ton \quad (2C)$$

$$Ipk2 = (Vout/LM2) \cdot Toff \quad (3C)$$

Substituting the equations (1C) and (2C) into the equation (3C) yields the following equation (4C), and one cycle Tsw of the duty control signal PWM is expressed in the following equation (5C).

$$Toff = (Vin/((n1/n2) \cdot Vout)) \times Ton \quad (4C)$$

$$Tsw = Ton + Toff = \frac{Vin + (n1/n2) \cdot Vout}{(n1/n2) \cdot Vout} \times Ton \quad (5C)$$

Using these equations, the average value Iin_ave of the input current Iin in one cycle of the duty control signal PWM is defined by the following equation (6C):

$$Iin\_ave = \frac{(1/2) \times Ipk1 \times Ton}{Tsw}$$
$$= 1/(2 \cdot LM1) \times \frac{Vin \times (n1/n2) \cdot Vout}{Vin + (n1/n2) \cdot Vout} \times Ton \quad (6C)$$

On the other hand, when a resistance division ratio of the resistors Rac1 and Rac2 to the input voltage Vin is assumed to be K2, the input voltage detection signal Vin' becomes Vin'=K2×Vin. When the output signal of the error amplifier circuit EA is assumed to be K1, the output signal Vm of the multiplication circuit MUL becomes Vm=K1·K2·Vin. Accordingly, the output signal Vs of the square circuit SQ is expressed in the following equation (7C) as K=(K1·K2)²:

$$Vs = K \cdot Vin^2 \quad (7C)$$

Since the comparator circuit CMPp controls the transistor Q1 to off when the detection voltage Vcs based on the resistor Rcs reaches the output signal Vs, Rcs×Ipk1 is set to Rcs×Ipk1=equation (7C) using Ipk1 in the equation (2C). As a result, Ton is expressed in the following equation (8C):

$$Ton = ((K \cdot LM1)/Rcs) \times Vin \quad (8C)$$

Substituting the equation (8C) into the equation (6C) yields the following equation (9C) as the average value Iin_ave:

$$Iin\_ave = \frac{K}{2 \times Rcs} \cdot \frac{Vin \times (n1/n2) \cdot Vout}{Vin + (n1/n2) \cdot Vout} \times Vin \quad (9C)$$

Thus, the power supply device (PFC circuit PIC4) shown in FIG. 12 acquires the input voltage detection signal Vin' in the form of a function of Vin under the concept of the numerical expression and squares the same to generate the term of Vin in the Ton as shown in the equation (8C), and cancels out the value (Vin+(n1/n2)·Vout) of the denominator in the equation (6C) by the Ton. Thus, the average value Iin_ave of the equation (6C) is brought close to the function of the input voltage Vin corresponding to the sinusoidal wave.

On the other hand, since the average value Iin_ave is set as the perfect function of Vin, there is also considered a further configuration example provided with an adder, a constant generator, etc. In doing so, there is a fear that since additional external terminals are required and the circuit area of the PFC circuit increases in a manner similar to the case of FIG. 6, a size reduction in the power supply device is not sufficiently achieved. Thus, when such a power supply device as shown in FIG. 12 is used, a substantially sinusoidal-shaped input current waveform which is not a perfect sinusoidal wave but has sufficient quantity in practical use (is capable of reducing higher harmonic components as required and sufficiently), can be generated owing to its small-sized and low-cost configuration.

Figure 15A:
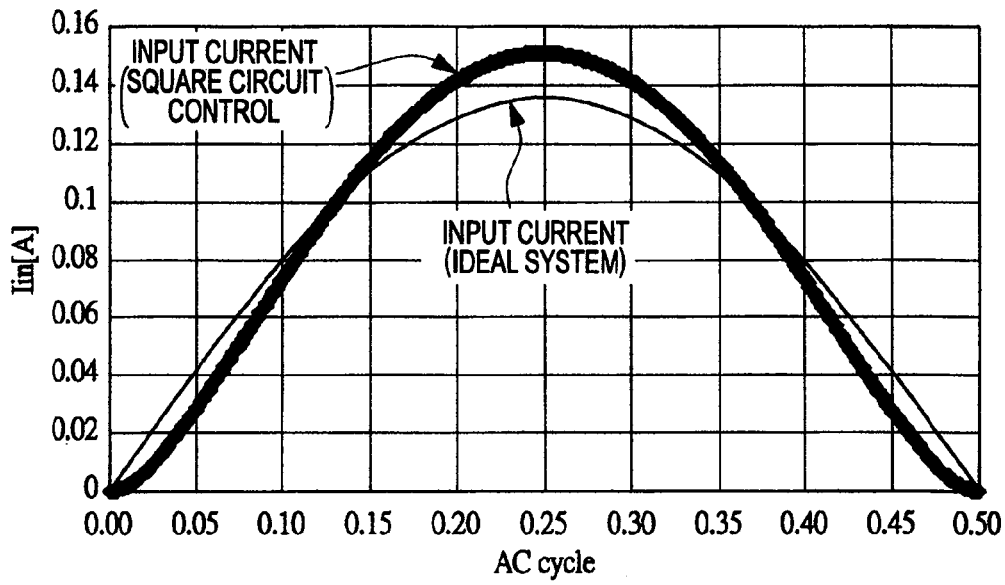
FIGS. 15(a) and 15(b) are respectively waveform diagrams showing results of simulation of input current waveforms where the power supply device shown in FIG. 12 is used.
Figure 15B:
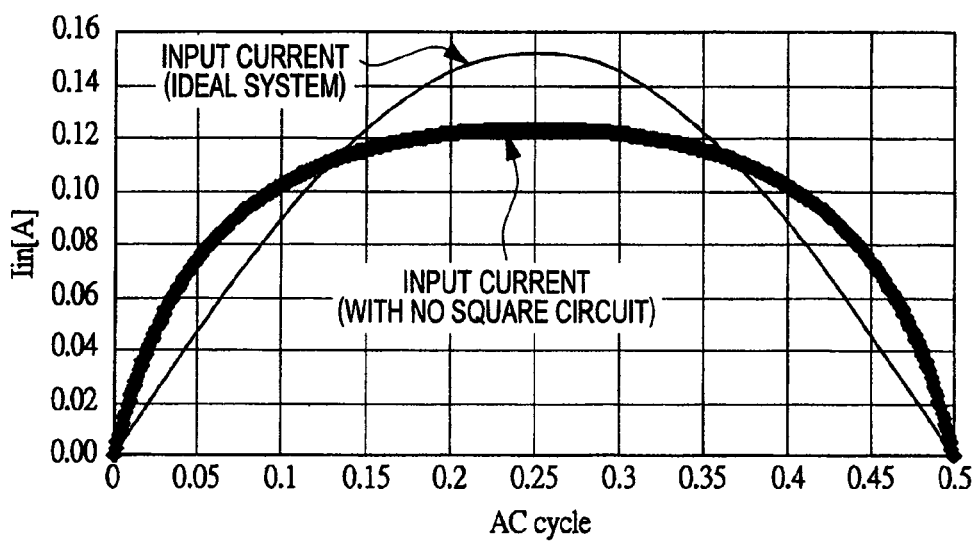

FIGS. 15(a) and 15(b) are respectively waveform diagrams showing results of simulation of input current waveforms where the power supply device shown in FIG. 12 is used. One example illustrative of an ideal input current waveform (ideal system) indicative of a sinusoidal wave and a theoretical input current waveform (square circuit control) calculated by the equation (9C) where the power supply device of FIG. 12 is used, is shown in FIG. 15(a). One example indicative of an ideal input current waveform (with no square circuit) calculated by the equation (2A) where the above power supply device of FIG. 31 is used, is shown in FIG. 15(b) as a target for comparison thereof. As is understood from the comparison between FIGS. 15(a) and 15(b), the use of the power supply device of FIG. 12 enables the input current waveform to be brought close to the sine wave, and higher harmonic components can be reduced sufficiently from a practical standpoint.

<<Various Modifications of Power Supply Device [3]>>

Figure 16:
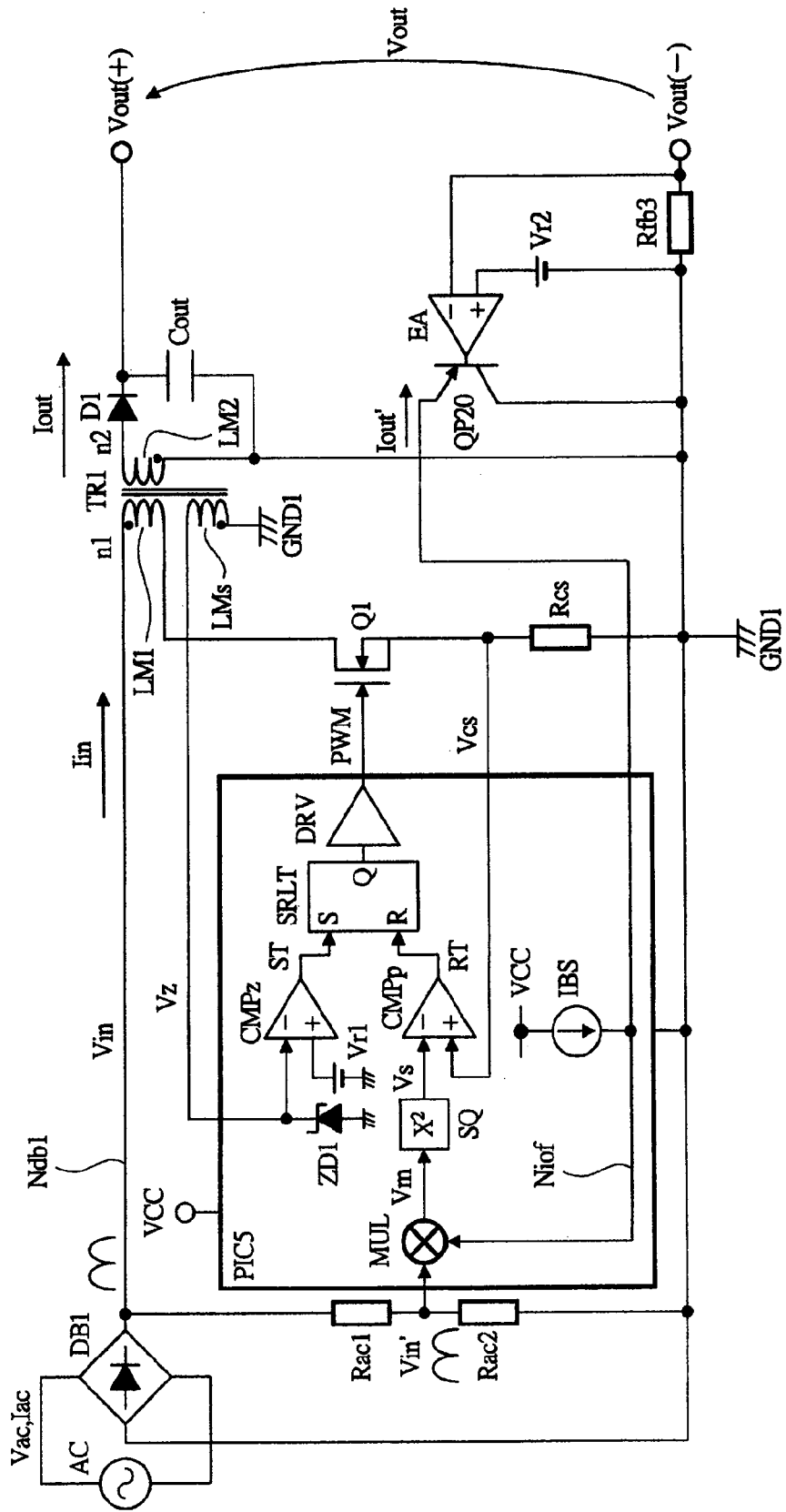
FIG. 16 is a schematic diagram showing one example of a modified circuit configuration of the power supply device of FIG. 12.
Figure 17:
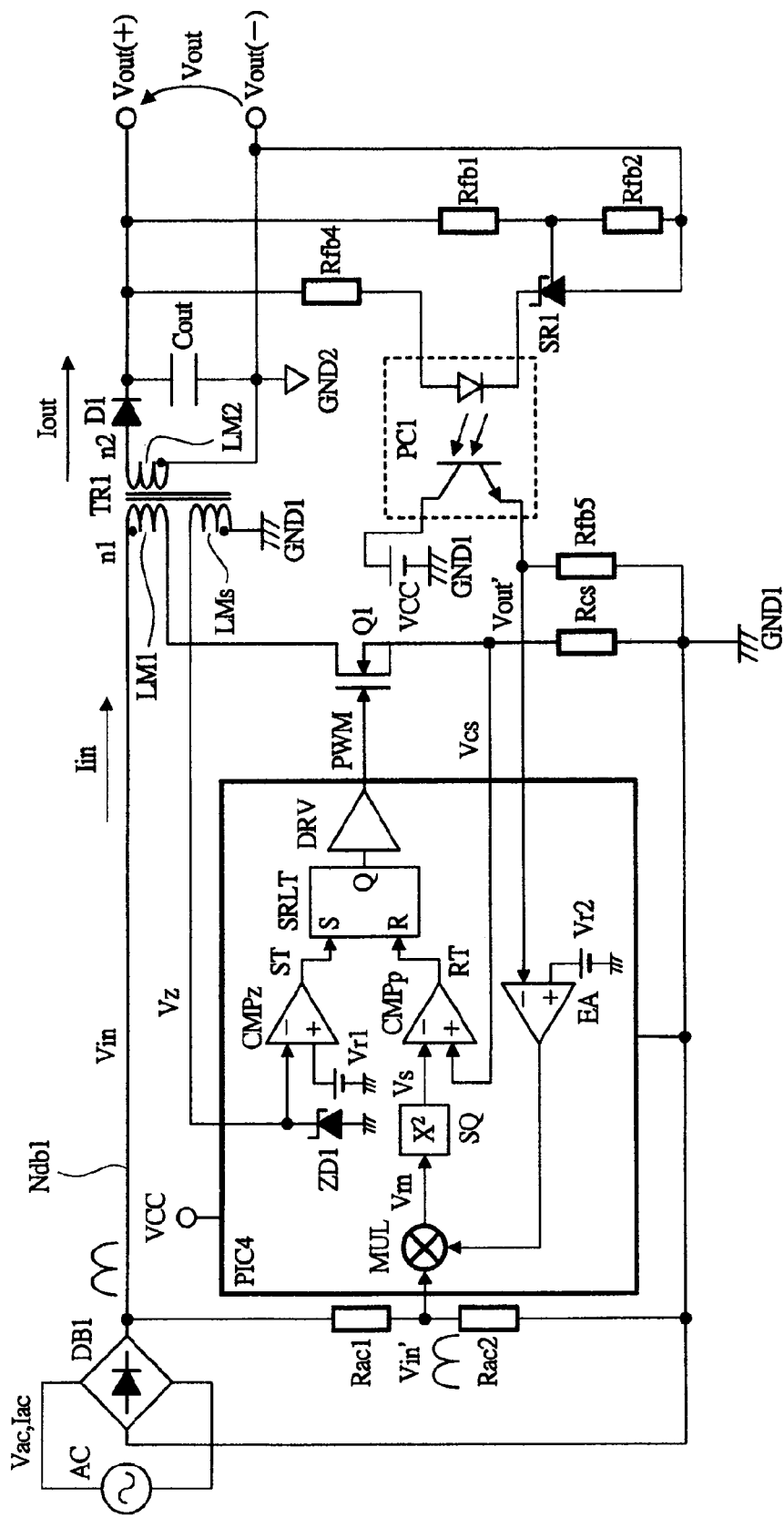
FIG. 17 is a schematic diagram illustrating one example of another modified circuit configuration of the power supply device of FIG. 12.
Figure 18:
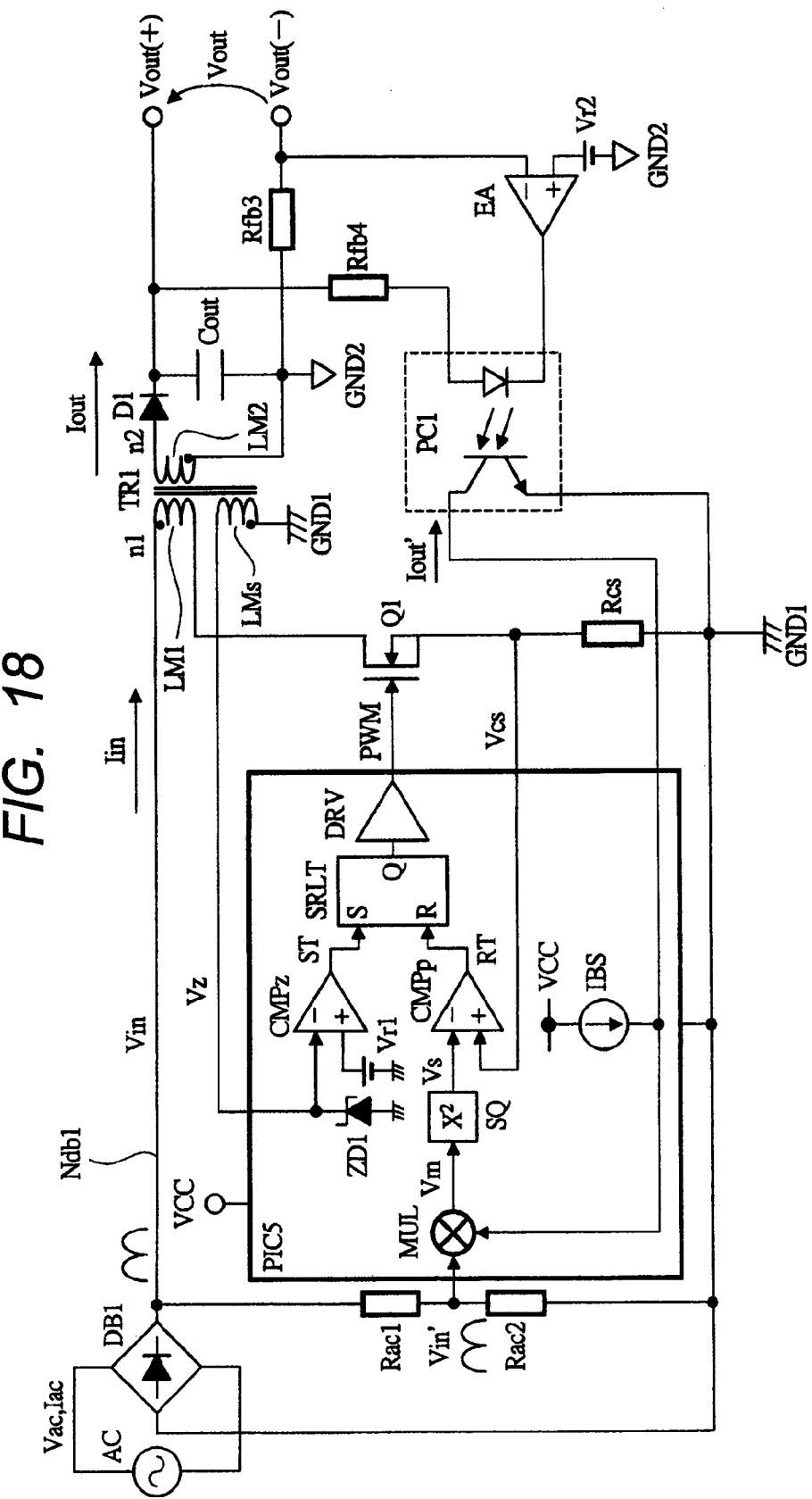
FIG. 18 is a schematic diagram showing one example of a further modified circuit configuration of the power supply device of FIG. 12.

FIGS. 16 through 18 are respectively schematic diagrams showing one example illustrative of different circuit configurations in which the power supply device of FIG. 12 is modified. A description will now be made while paying attention to the differences between the power supply device of FIG. 12 and these different power supply devices. The power supply device of FIG. 16 is different from the power supply device of FIG. 12 in terms of an output information feedback method. That is, the power supply device of FIG. 12 is set as the configuration example in which information (i.e., output voltage detection signal Vout') about the output voltage Vout is fed back to the PFC circuit PIC4, whereas the power supply device of FIG. 16 is set as a configuration example in which information about an output current Iout is fed back to a PFC circuit PIC5 as an output current detection signal Iout'. For example, the power supply device shown in FIG. 12 is of a configuration example applied when voltage-driven load circuits are combined. The power supply device shown in FIG.

16 is of a configuration example applied when current-driven load circuits such as light emitting diodes or the like are combined.

In FIG. 16, the output current Iout is converted to its corresponding voltage by a resistor Rfb3 inserted onto a current path (between Vout (−) and GND1) of a negative polarity output node Vout (−). An error amplifier circuit EA provided outside the PFC circuit PIC5 detects a difference between a voltage indicative of the magnitude of Iout developed at one end (Vout (−)) of the resistor Rfb3 and a set value (comparison voltage Vr2) of Iout determined in advance. Then, the base of a pnp type bipolar transistor QP20 provided outside the PFC circuit PIC5 is controlled by the result of detection so that an output current detection signal Iout' is generated from its emitter.

On the other hand, the PFC circuit PIC5 is provided with a wiring node Niof for coupling one of two inputs in a multiplication circuit MUL to the emitter of the pnp type bipolar transistor QP20, and a constant current source IBS which supplies current for determining an operating point of the pnp type bipolar transistor QP20, via the wiring node Niof, instead of the error amplifier circuit EA provided in the PFC circuit PIC4 of FIG. 12. The constant current source IBS and the pnp type bipolar transistor QP20 serve as a variable current source on which the magnitude of the output current Iout is reflected. This variable current source may also be used as the constant current source IS2 of the multiplication circuit MUL shown in FIG. 9.

The power supply device shown in FIG. 17 is of a configuration example in which the non-insulation type power supply device shown in FIG. 12 is changed to an insulation type. Likewise, the power supply device of FIG. 18 is of a configuration example in which the non-insulation type power supply device shown in FIG. 16 is changed to the insulation type. For example, there is a case in which a power supply device targeted for a load circuit large in output power needs to have a non-insulation type configuration from the viewpoint of safety or the like. In such a case, such a power supply device as shown in FIG. 17 or 18 may be used.

In FIG. 17, the primary winding LM1 side of a transformer TR1 is operated on the basis of a ground power supply voltage GND1, whereas the secondary winding LM2 side thereof is operated on the basis of a ground power supply voltage GND2. That is, a negative polarity output node Vout (−) is coupled to the GND2. An output voltage Vout generated at a positive polarity output node Vout (+) on the basis of the negative polarity output node Vout (−) is divided by resistors Rfb1 and Rfb2. A node for this resistance division is coupled to a control node of a shunt regulator SR1. A resistor Rfb4 and an input path of a photocoupler PC1 are coupled in series between the cathode of the shunt regulator SR1 and the positive polarity output node Vout (+) in order from the positive polarity output node Vout (+) side. The shunt regulator SR1 varies the voltage of the cathode thereof in such a manner that the voltage of its control node becomes a reference voltage Vref set inside the shunt regulator SR1 (i.e., Vout=Vref× (Rfb1+Rfb2)/Rfb2). A current flowing through the input path of the photocoupler PC1 varies correspondingly. Thus, a current on which such current is reflected, is extracted or taken out from an output path of the photocoupler PC1 and converted via a resistor Rfb5 to a voltage as an output voltage detection signal Vout'. The PFC circuit PIC4 is similar in configuration to FIG. 12 and operates in response to the output voltage detection signal Vout'.

Even in FIG. 18 as with the case of FIG. 17, the primary winding LM1 side of a transformer TR1 is operated on the basis of a ground power supply voltage GND1, whereas the secondary winding LM2 side of the transformer TR1 is operated on the basis of a ground power supply voltage GND2. An output current Iout flowing through the secondary winding LM2 side is converted into a voltage by a resistor Rfb3 inserted onto a current path of a negative polarity output node Vout (−) (between Vout (−) and GND2). An error amplifier circuit EA detects a difference between a voltage indicative of the magnitude of Iout developed at one end (Vout (−)) of the resistor Rfb3 and a set value (comparison voltage Vr2) of Iout determined in advance, and controls current flowing through an input path of a photocoupler PC1 according to the result of detection. Then, a current on which the current flowing through the input path of the photocoupler PC1 is reflected, is extracted or taken out from an output path of the photocoupler PC1. The PFC circuit PIC5 is similar in configuration to FIG. 16 and operates in response to the output current Iout'.

Thus, higher harmonic components likely to occur in the input current can be reduced by using the power supply device according to the third embodiment, typically, by the small-sized or low-cost configuration. This advantageous effect is obtained by using the square circuit SQ in the PFC circuit, instead of the use of a complex circuit in which an adder and the like are combined. Since the corresponding power supply device needs to have the transformer as compared with the power supply device according to the first embodiment, the power supply device according to the first embodiment is desired in terms of a size reduction or a reduction in cost. However, when the insulation type power supply device is required, for example, the use of the power supply device according to the third embodiment becomes useful.

Fourth Embodiment

The first embodiment has shown the configuration example in which the square circuit SQ is applied to the high-side inverse converter in which the transistor Q1 is disposed on the high-potential output side of the rectifying circuit DB1, and the inductor L1 is disposed on the low-potential output side. A fourth embodiment will explain a configuration example in which a square circuit SQ is applied to a low-side inverse converter in which an inductor is disposed on the high-potential output side of a rectifying circuit, and a transistor is disposed on the low-potential output side.

<<Overall Circuit Configuration of Power Supply Device [4]>>

Figure 19:
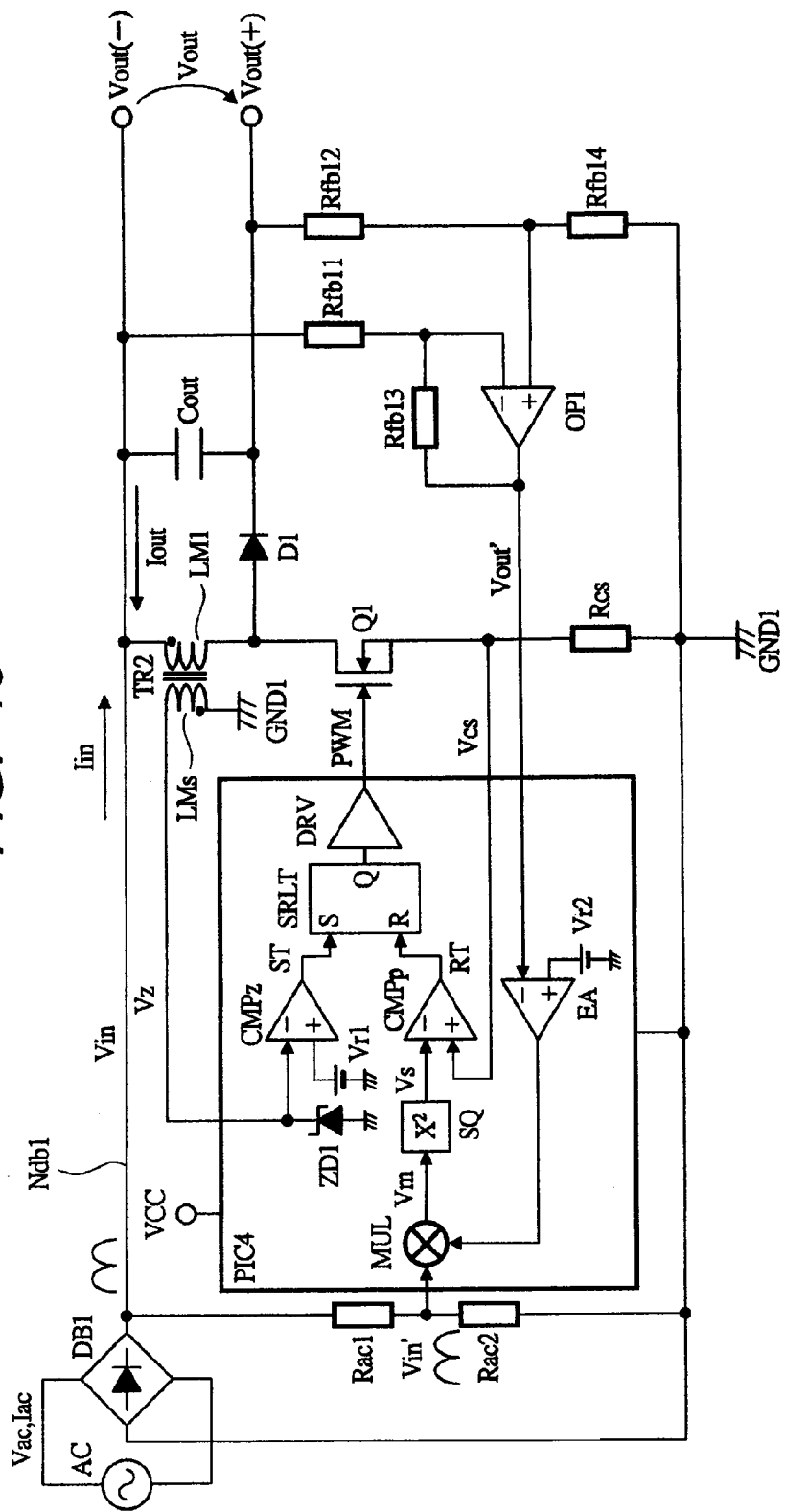
FIG. 19 is a schematic diagram depicting one example of a circuit configuration of a power supply device according to a fourth embodiment of the present invention.

FIG. 19 is a schematic diagram showing one example of a circuit configuration of a power supply device according to a fourth embodiment of the present invention. The power supply device shown in FIG. 19 has a rectifying circuit DB1, a power factor correction (PFC) circuit (semiconductor device) PIC4, a transformer TR2, a transistor Q1, a diode D1, an output capacitor Cout, resistors Rac1, Rac2, Rcs, Rfb11 through Rfb14, and an operational amplifier OP1. The output capacitor Cout is coupled between a positive polarity output node Vout (+) and a negative polarity output node Vout (−) and supplies an output voltage Vout generated at the positive polarity output node Vout (+) on the basis of the negative polarity output node Vout (−) to a load circuit (not shown).

The rectifying circuit DB1 full-wave rectifies a commercial power source (AC) (ac voltage Vac and ac current Iac) and outputs an input voltage Vin and an input current Iin to a rectified output node Ndb1 on the basis of the ground power supply voltage GND1. The resistors Rac1 and Rac2 are coupled in series between the rectified output node Ndb1 and the ground power supply voltage GND1 and outputs, from a common coupling node thereof, an input voltage detection signal Vin' that assumes a value generated by resistance voltage division from the input voltage Vin. The transformer TR2 has an inductor LM1 and a supplementary winding (inductor) LMs. The transistor (n channel-type power MOS transistor herein) Q1 has a drain coupled to the rectified output node Ndb1 via the inductor LM1, a source coupled to one end of the resistor Rcs, and a gate driven by a duty control signal PWM generated from the PFC circuit PIC4. The other end of the resistor Rcs is coupled to the ground power supply voltage GND1. The diode D1 has an anode coupled to the drain of the transistor Q1 and a cathode coupled to the positive polarity output node Vout (+).

The resistor Rfb11 is coupled between the negative polarity output node Vout (−) and a negative polarity input node of the operational amplifier OP1, and the resistor Rfb12 is coupled between the positive polarity output node Vout (+) and a positive polarity input node of the operational amplifier OP1. The resistor Rfb13 is coupled between the negative polarity input node of the operational amplifier OP1 and an output node of the operational amplifier OP1, and the resistor Rfb14 is coupled between the positive polarity input node of the operational amplifier OP1 and the ground power supply voltage GND1. Thus, the operational amplifier OP1 serves as a differential amplifier circuit and generates an output voltage detection signal Vout' from its output node. When the resistance values of the resistors Rfb11 and Rfb12 are both assumed to be R11, and the resistance values of the resistors Rfb13 and Rfb14 are both assumed to be R13, Vout'=(R13/R11)×(Vout (+)−Vout (−)). Incidentally, the PFC circuit PIC4 is similar in configuration to that in FIG. 12 and outputs a duty control signal PWM in response to a detection voltage Vcs outputted from a coupling node of the transistor Q1 and the resistor Rcs, and a detection voltage Vz generated by the supplementary winding LMs.

<<Overall Circuit Operation of Power Supply Device [4]>>

When the duty control signal PWM is at an 'H' level (on level) in such a configuration, the transistor Q1 is driven on, so that a growing input current Iin flows through the inductor LM1 of the transformer TR2 and power is accumulated in the inductor LM1. With an increase in the input current Iin, the corresponding detection voltage Vcs based on the resistor Rcs also increases in growing form. On the other hand, when the detection voltage Vs reaches a voltage value of an output signal Vs of the square circuit SQ, a reset signal RT is generated from the comparator circuit CMPp and hence the duty control signal PWM is transitioned to an 'L' level (off level), so that the transistor Q1 is driven off. In doing so, with the accumulated power of the LM1 as an electromotive force, an output current Iout flows through a path of the diode D1, Vout (+) and Vout (−), and the charging of the output capacitor Cout is performed thereby. During a period in which the transistor Q1 is off, the output current Iout is reduced in decreasing form. Then, when the output current Iout reaches zero, a voltage Vz detected at the supplementary winding LMs suddenly drops to zero. When the voltage Vz falls below the comparison voltage Vr1 of the comparator circuit CMPz, a set signal ST is generated so that the transistor Q1 is driven on again. That is, the power supply device of FIG. 19 operates in a current critical mode.

In FIG. 19, the output voltage Vout between the positive polarity output node Vout (+) and the negative polarity output node Vout (−) is fed back to the PFC circuit PIC4 as an output voltage detection signal Vout' by the differential amplifier circuit comprised of OP1 or the like. At this time, the differential amplifier circuit is provided to allow the PFC circuit PIC4 to detect the output voltage Vout between the negative polarity output node Vout (−) and the positive polarity output node Vout (+) on the basis of the ground power supply voltage GND1. By setting the ratio (R13/R11) between the resistance value R11 and the resistance value R13 to a few tenths, for example, an output voltage detection signal Vout' varied in a voltage range of a few V on the basis of the ground power supply voltage GND1 can be generated according to the level (e.g., a few tens of V or so) of the output voltage Vout. In the PFC circuit PIC4, its error amplifier circuit EA amplifies a difference between the output voltage detection signal Vout' and a comparison voltage Vr2 (e.g., a few V or so). A multiplication circuit MUL reflects the result of detection by the error amplifier circuit EA on the input voltage detection signal Vin' to generate an output signal Vm. The square circuit SQ generates an output signal Vs in which the output signal Vm is squared.

Here, in a manner similar to the power supply devices according to the first through third embodiments, the power supply device shown in FIG. 19 takes a circuit system in which the input current Iin flows during the on period of the transistor Q1 and the output current Iout flows during its off period. If the square circuit SQ is not provided in this case, then the waveform of the input current Iin can take the trapezoidal shape. Thus, in a manner similar to the case of FIG. 1 or the like, an output signal Vs having such a wave shape that a sinusoidal wave is pointed is generated by the square circuit SQ, and the period of the 'H' level (on of transistor Q1) of the duty control signal PWM is determined based on the output signal Vs, thereby making it possible to bring the ac current Iac developed in the commercial power line (AC) close to the sinusoidal wave.

<<Modification of Power Supply Device [4]>>

Figure 20:
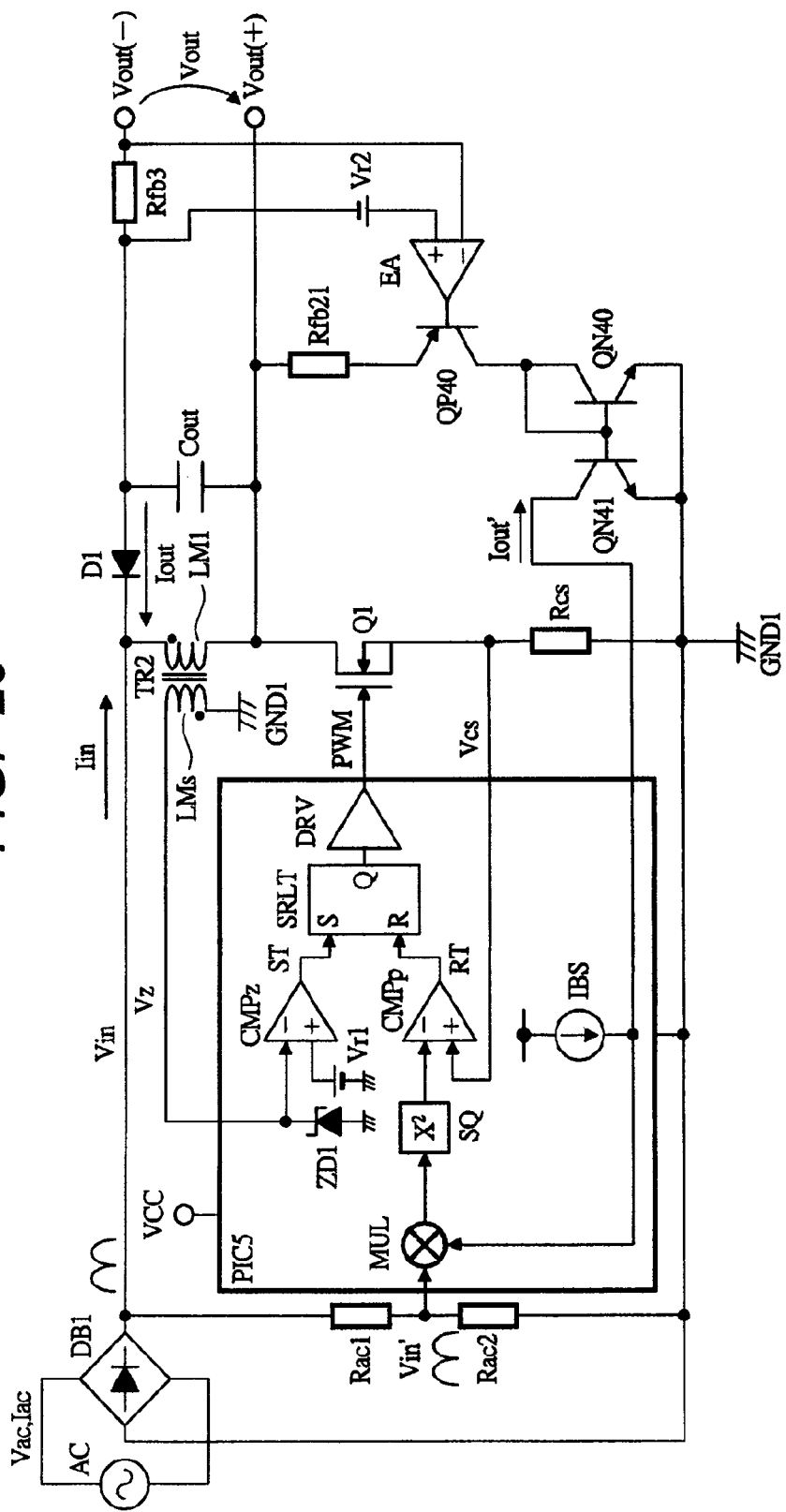
FIG. 20 is a schematic diagram showing one example of a modified circuit configuration of the power supply device of FIG. 19.

FIG. 20 is a schematic diagram showing one example of a modified circuit configuration of the power supply device of FIG. 19. A description will now be made while paying attention to the differences between the present modification and the power supply device of FIG. 19. The power supply device of FIG. 20 is different from the power supply device of FIG. 19 in terms of an output information feedback method. That is, the power supply device of FIG. 19 is illustrated as the configuration example in which the information (i.e., output voltage detection signal Vout') about the output voltage Vout is fed back to the PFC circuit PIC4, whereas the power supply device of FIG. 20 takes a configuration example in which information about an output current Iout is fed back to a PFC circuit PIC5 as an output current detection current Iout'.

In FIG. 20, the output current Iout is converted to its corresponding voltage by a resistor Rfb3 inserted onto a current path (between one end of an output capacitor Cout and a negative polarity output node Vout (−)) of the negative polarity output node Vout (−). An error amplifier circuit EA provided outside the PFC circuit PIC5 detects a difference between a voltage indicative of the magnitude of Iout developed at one end (Vout (−)) of the resistor Rfb3 and a set value (comparison voltage Vr2) of Iout determined in advance. Then, the base of a pnp type bipolar transistor QP40 provided outside the PFC circuit PIC5 is controlled by the result of detection. The pnp type bipolar transistor QP40 has an emitter coupled to a positive polarity output node Vout (+) via a resistor Rfb21. A collector current flowing therethrough is inputted to the collector (base) of an npn type bipolar transistor QN40. The npn type bipolar transistor QN40 configures a current mirror circuit between itself and an npn type bipolar transistor QN41. The current inputted to the npn type bipolar transistor QN40 is transferred to the npn type bipolar transistor QN41. The current transferred to the npn type bipolar transistor QN41 is fed back to the PFC circuit PIC5 as an output current detection signal Iout'.

When the error amplifier circuit EA is operated with the Vout (−) as a ground power supply voltage, for example, the output voltage of the error amplifier circuit EA does not correspond to a suitable voltage range as viewed from the ground power supply voltage GND1 of the PFC circuit PIC5. For this reason, it is difficult to feed back the current to the PFC circuit PIC5 via one bipolar transistor as in the case of FIG. 16. Thus, a current signal corresponding to the output current Iout is generated by the pnp type bipolar transistor QP40 and turned back by the current mirror circuit, followed by being fed back to the PFC circuit PIC5. The PFC circuit PIC5 is similar in configuration to that of FIG. 16 and outputs a duty control signal PWM in response to the input voltage detection signal Vin', detection voltage Vz developed by a supplementary winding LMs, detection voltage Vcs produced by a resistor Rcs, and output current detection signal Iout'.

Thus, higher harmonic components likely to occur in the input current can be reduced by using the power supply device according to the fourth embodiment, typically, by the small-sized or low-cost configuration. This advantageous effect is obtained by using the square circuit SQ in the PFC circuit, instead of the use of a complex circuit in which an adder and the like are combined. However, since the corresponding power supply device needs to have the transformer as compared with the power supply device according to the first embodiment, the power supply device according to the fourth embodiment is desired in terms of a size reduction or a reduction in cost.

Fifth Embodiment

While the above fourth embodiment has shown the configuration example in which the square circuit SQ is applied to the low-side inverse converter, and the control in the current critical mode is performed using the supplementary winding LMS, a fifth embodiment will explain a configuration example in which control in a current critical mode is performed using a resistor instead of the supplementary winding.

<<Overall Circuit Configuration of Power Supply Device [5]>>

Figure 21:
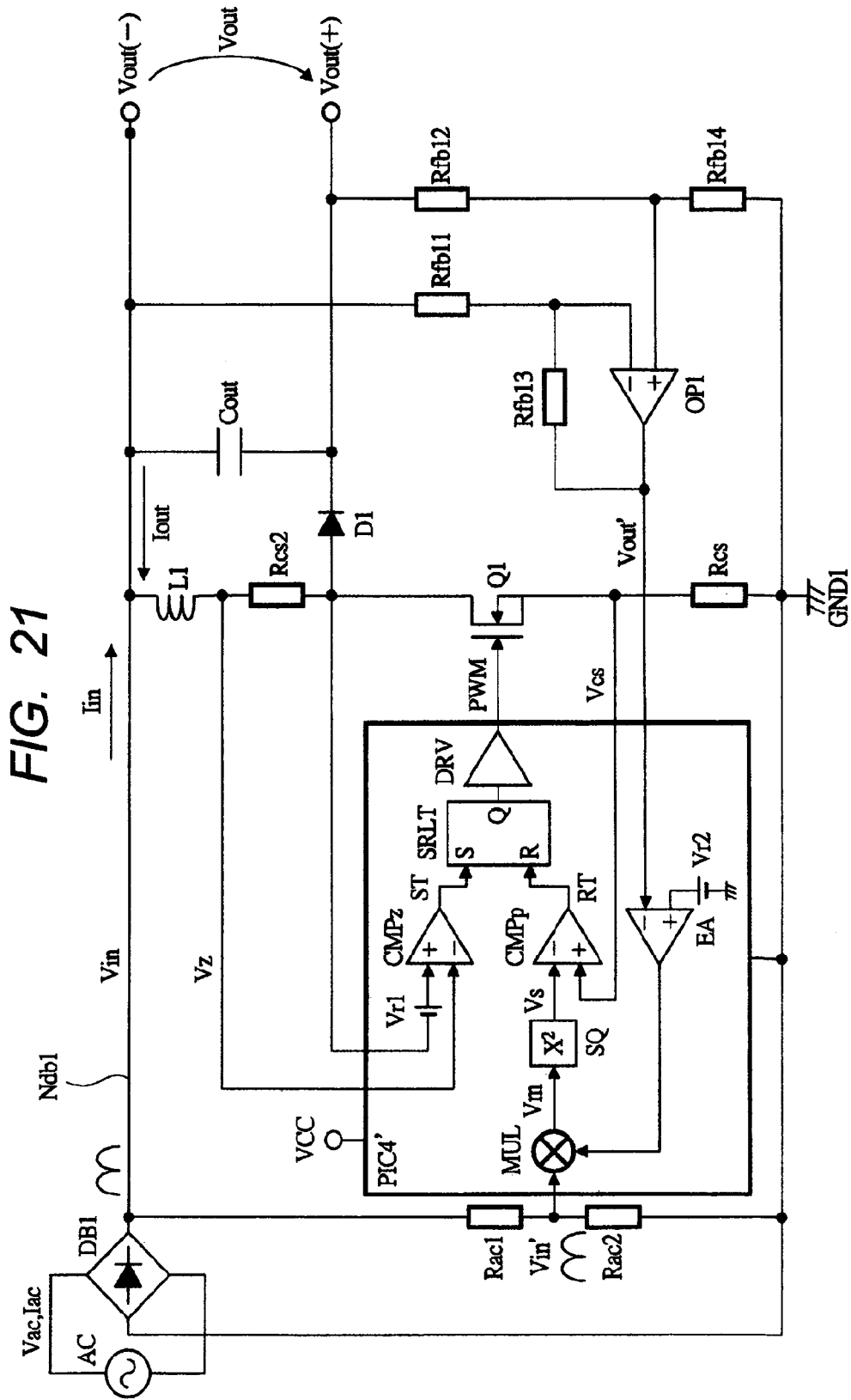
FIG. 21 is a schematic diagram depicting one example of a circuit configuration of a power supply device according to a fifth embodiment of the present invention.

FIG. 21 is a schematic diagram depicting one example of a circuit configuration of a power supply device according to the fifth embodiment of the present invention. A description will now be made while paying attention to the differences between the present power supply device and the power supply device of FIG. 19. The power supply device shown in FIG. 21 has a configuration in which the transformer TR2 shown in FIG. 19 is replaced with an inductor L1 and a resistor Rcs2 is provided between the inductor L1 and a positive polarity output node Vout (+), as compared with the power supply device of FIG. 19. When an output current Iout flowing through the inductor L1 reaches zero where a transistor Q1 is off, a detection voltage Vz developed across the resistor Rcs2 also reaches zero. Therefore, it is detected by a comparator circuit CMPz provided within a PFC circuit PIC4' to thereby enable the control in the current critical mode. Incidentally, the PFC circuit PIC4' is different from the PFC circuit PIC4 of FIG. 19 in terms of an input part of the comparator circuit CMPz. That is, the detection voltage Vz developed in the supplementary winding on the basis of the ground power supply voltage GND1, and the comparison voltage Vr1 set on the basis of the ground power supply voltage GND1 are inputted to the comparator circuit CMPz of the PFC circuit PCI4. In contrast, a detection voltage Vz developed in the resistor Rcs2 on the basis of the positive polarity output node Vout (+), and a comparison voltage Vr1 set on the basis of the positive polarity output node Vout (+) are inputted to the comparator circuit CMPz of the PFC circuit PIC4'.

<<Modification of Power Supply Device [5]>>

Figure 22:
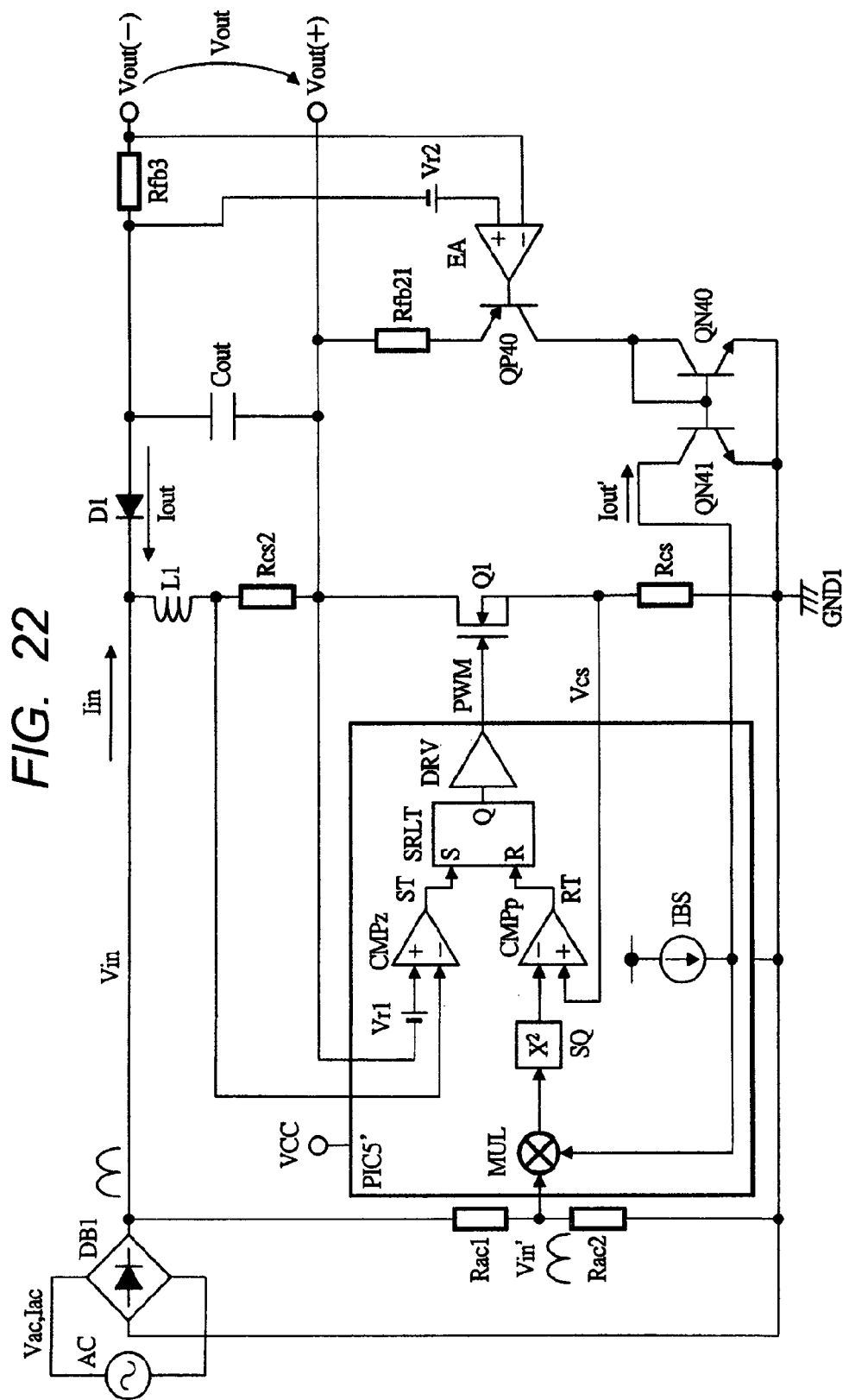
FIG. 22 is a schematic diagram showing one example of a modified circuit configuration of the power supply device of FIG. 21.

FIG. 22 is a schematic diagram showing one example of a modified circuit configuration of the power supply device of FIG. 21. The power supply device shown in FIG. 22 is illustrated as a configuration example in which output current information is fed back to a PFC circuit PIC5' while the power supply device shown in FIG. 21 is illustrated as the configuration example in which the output voltage information is fed back to the PFC circuit PIC4'. That is, the power supply device shown in FIG. 22 is provided with a resistor Rcs2 for operation in a current critical mode as a comparative target for the power supply device of FIG. 20 in a manner similar to the case of the power supply device of FIG. 21. Further, the power supply device of FIG. 22 is equivalent to one in which the input part of the comparator circuit CMPz in the PFC circuit PIC5 of FIG. 20 is changed as with the power supply device of FIG. 21.

Since the use of the power supply device according to the fifth embodiment makes it unnecessary to provide the supplementary winding (i.e., transformer) as compared with the power supply device according to the fourth embodiment, a further size reduction in the power supply device, and the like can be achieved. Since, however, a voltage level (may be 100 V or higher assuming that the ground power supply voltage GND1 is taken as the reference) developed at the positive polarity output node Vout (+) is inputted to each of the PFC circuits PIC4' and PIC5' operated with the GND1 as the reference, it is necessary to ensure the breakdown voltages of the PFC circuits PIC4' and PIC5'. Accordingly, the power supply device according to the first embodiment is preferably used from this point of view.

Sixth Embodiment

A sixth embodiment will explain a power supply device which performs an operation in a current continuous mode other than the current critical mode using the power supply topology of the high-side inverse converter in a manner similar to the first and second embodiments.

<<Overall Circuit Configuration of Power Supply Device [6]>>

Figure 23:
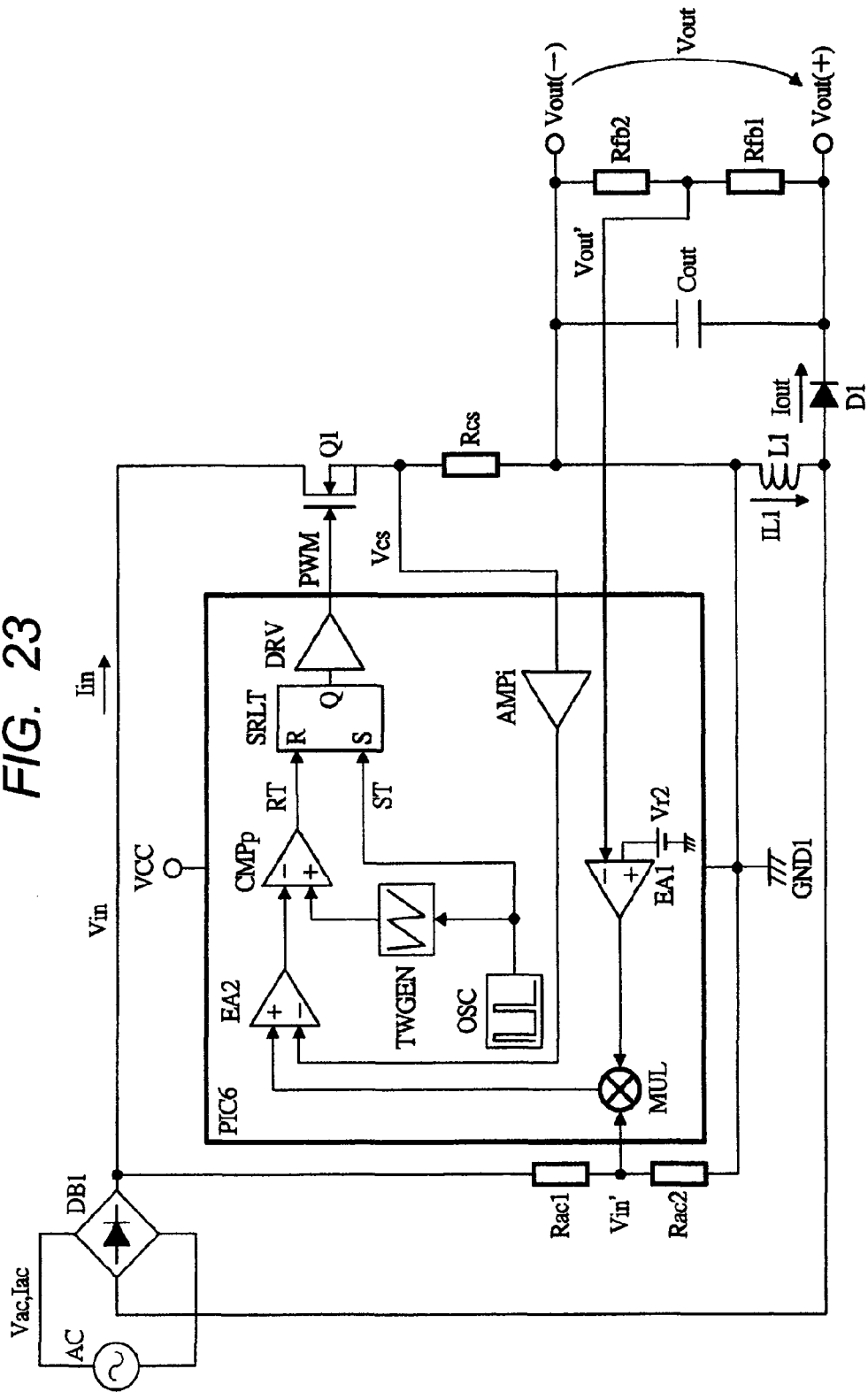
FIG. 23 is a schematic diagram illustrating one example of a circuit configuration of a power supply device according to a sixth embodiment of the present invention.

FIG. 23 is a schematic diagram illustrating one example of a circuit configuration of a power supply device according to a sixth embodiment of the present invention. A description will now be made while paying attention to the differences between the present power supply device and the power supply device of FIG. 11 described in the second embodiment. The power supply device shown in FIG. 23 is different from the power supply device of FIG. 11 in terms of the position of a resistor Rcs and an internal circuit configuration of a PFC circuit PIC6. One end of the resistor Rcs is coupled to a ground power supply voltage GND1 of the PFC circuit PIC6 in a manner similar to FIG. 11, but the other end of the resistor Rcs is coupled to a transistor Q1 unlike FIG. 11. A detection voltage Vcs is outputted from a node on the transistor Q1 side, of the resistor Rcs. With it, one end of an inductor L1 is coupled to the ground power supply voltage GND1 and negative polarity output node Vout (−).

The PFC circuit (semiconductor device) PIC6 is operated by the ground power supply voltage GND1 and power supply voltage VCC, and outputs a duty control signal PWM in response to an input voltage detection signal Vin', a detection voltage Vcs obtained by the resistor Rcs and an output voltage detection signal Vout'. The PFC circuit PIC6 includes a multiplication circuit MUL, two error amplifier circuits EA1 and EA2, a comparator circuit CMPp, a set/reset latch circuit SRLT, a driver circuit DRV, an amplifier circuit AMPi, an oscillator OSC, and a triangular wave generator TWGEN.

The set/reset latch circuit SRLT drives the duty control signal PWM to an 'L' level (off level) via the driver circuit DRV when a reset signal RT is outputted from the comparator circuit CMPp, and drives the duty control signal PWM to an 'H' level (on level) via the driver circuit DRV when a set signal ST is outputted from the oscillator OSC. The amplifier circuit AMPi amplifies the detection voltage Vcs and outputs the same to one of two inputs of the error amplifier circuit EA2. The error amplifier circuit EA1 amplifies the output voltage detection signal Vout' detected by the resistors Rfb1 and Rfb2 on the basis of a comparison voltage Vr2. The multiplication circuit MUL multiplies the input voltage detection signal Vin' and the output voltage of the error amplifier circuit EA1 by each other and outputs the result of multiplication to the other of the two inputs of the error amplifier circuit EA2. The error amplifier circuit EA2 amplifies a difference between the output voltage of the amplifier circuit AMPi and the output voltage of the multiplication circuit MUL and outputs the same to one of two inputs of the comparator circuit CMPp. The triangular wave generator TWGEN generates a triangular wave signal using a signal outputted from the oscillator OSC and outputs the same to the other of the two inputs of the comparator circuit CMPp.

<<Overall Circuit Operation of Power Supply Device [6]>>

Figure 24:
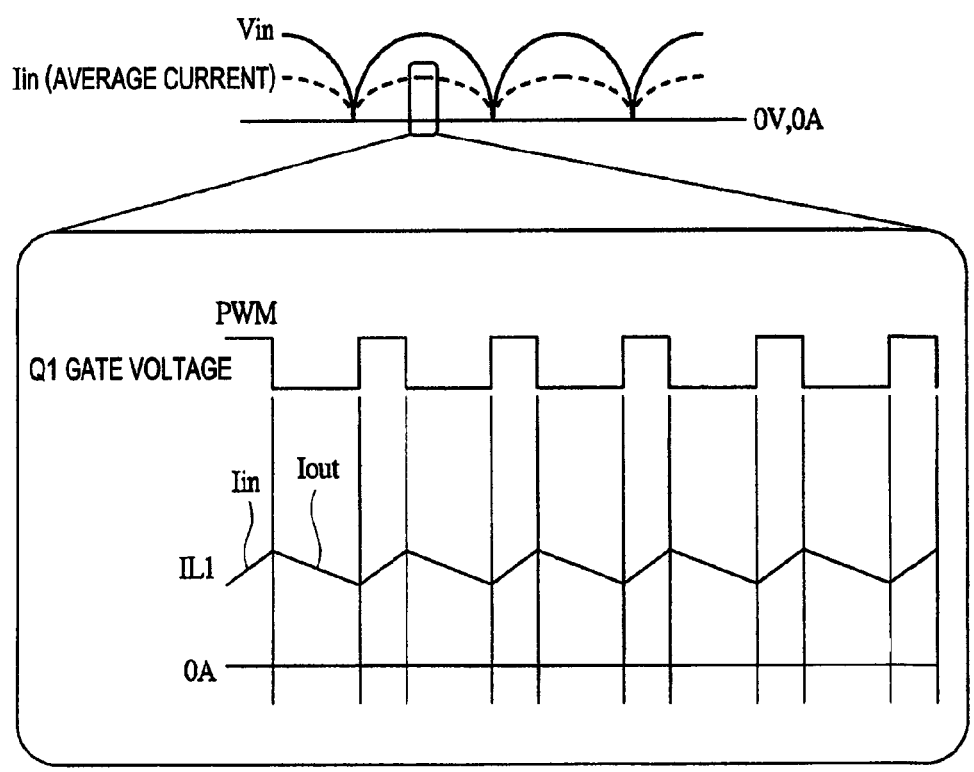
FIG. 24 is a waveform diagram showing a schematic example of operation of FIG. 23.

FIG. 24 is a waveform diagram showing a schematic example of operation of FIG. 23. Firstly, when the oscillator OSC outputs a set signal ST, a duty control signal PWM is brought to an 'H' level (on level), so that the transistor Q1 is driven on. Thus, a growing input current Iin flows through the inductor L1 via the transistor Q1 and the resistor Rcs, so that power is accumulated in the inductor L1. With an increase in the input current Iin, the corresponding detection voltage Vcs developed at one end of the resistor Rcs also increases in growing form. Thereafter, when a reset signal ST is outputted from the comparator circuit CMPp, the duty control signal PWM is brought to an 'L' level (on level), so that the transistor Q1 is driven off. In doing so, with the power accumulated in the L1 as an electromotive force, an output current Iout flows through a path of a positive polarity output node Vout (+), a diode D1, and the negative polarity output node Vout (-). Thus, a load circuit (not shown) is driven by the output current Iout and an output capacitor Cout is charged thereby.

When the transistor Q1 is on, the error amplifier circuit EA1 outputs an error component of the output voltage Vout relative to the set voltage (Vr2), and the multiplication circuit MUL generates an output voltage in which the error component is reflected on the input voltage detection signal Vin'. The error amplifier circuit EA2 amplifies a difference between the output voltage of the multiplication circuit MUL and the output voltage of the amplifier circuit AMPi. On the basis of the output voltage of the multiplication circuit MUL, the level of the output voltage of the error amplifier circuit EA2 increases when the output voltage of the amplifier circuit AMPi is low, so that a period (i.e., on duty of transistor Q1) from the output of the set signal ST to the output of the reset signal RT from the comparator circuit CMPp increases. When the output voltage of the amplifier circuit AMPi is large in reverse, the level of the output voltage of the error amplifier circuit EA2 is lowered, so that the on duty of the transistor Q1 is reduced. Then, when the period corresponding to one cycle of the oscillator OSC has elapsed, the set signal ST is outputted again so that the transistor Q1 is driven on. With such a control operation, the input current Iin (ac current Iac that flows through the AC power line) that flows through the transistor Q1 follows the input voltage Vin and assumes a sinusoidal shape.

<<Details of Oscillator and Triangular Wave Generator>>

Figure 25A:
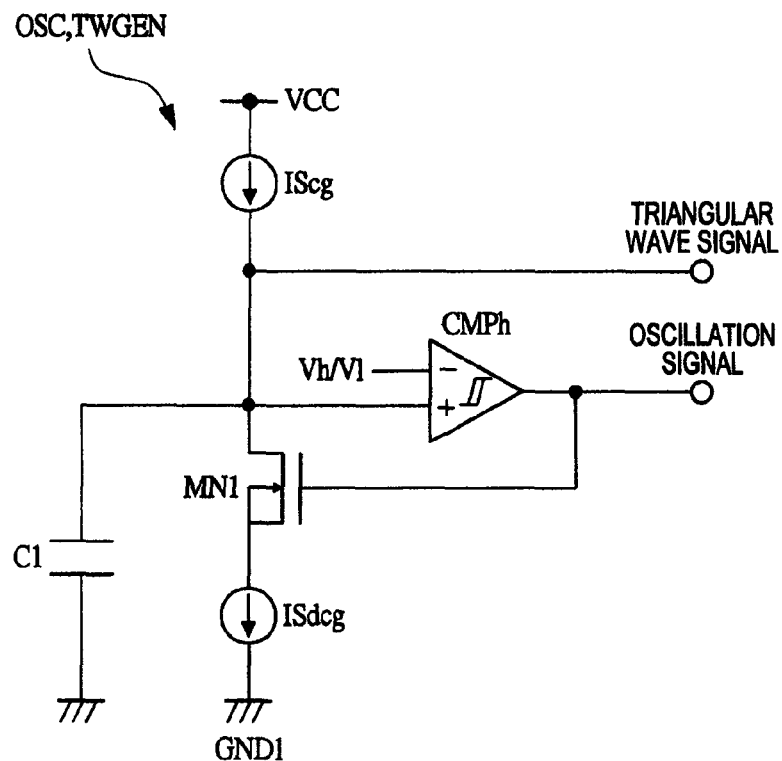
Figure 25B:
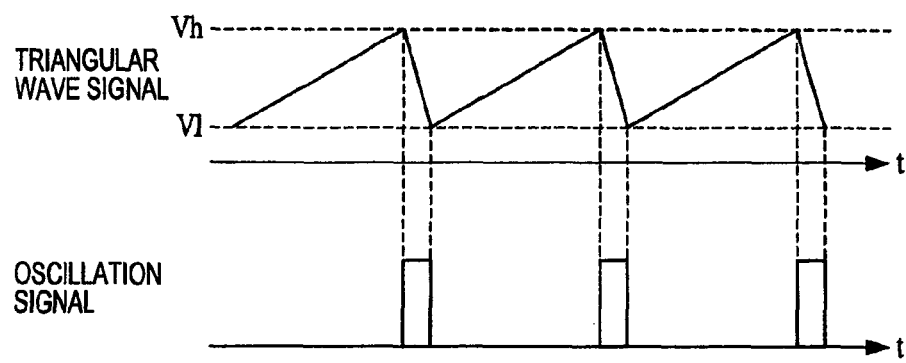

FIGS. 25(a) and 25(b) show the details of the oscillator OSC and triangular wave generator TWGEN in FIG. 23, in which FIG. 25(a) is a circuit diagram showing its configuration example, and FIG. 25(b) is a waveform diagram showing an example of operation of FIG. 25(a). A hysteresis comparator circuit CMPh, an NMOS transistor MN1 on/off-controlled according to the output of the hysteresis comparator circuit CMPh, a capacitor C1 coupled to a (+) input node of the hysteresis comparator circuit CMPh, a constant current source IScg which charges the capacitor C1, and a constant current source ISdcg which performs charging from the capacitor C1 via the NMOS transistor MN1. Here, the drive capacity of the constant current source ISdcg is set sufficiently higher than that of the constant current source IScg. One of a high-potential side threshold value Vh and a low-potential side threshold value V1 is set to a (-) input node of the hysteresis comparator circuit CMPh. The high-potential side threshold value Vh is set when the hysteresis comparator circuit CMPh outputs an 'L' level, and the low-potential side threshold value V1 is set when the hysteresis comparator circuit CMPh outputs an 'H' level.

When such a configuration example is used, the capacitor C1 is charged from the constant current source IScg when the output of the hysteresis comparator circuit CMPh is at the 'L' level, and the voltage level of the (+) input node of the hysteresis comparator circuit CMPh rises. When the voltage level reaches Vh, the output of the hysteresis comparator circuit CMPh is transitioned to the 'H' level. With its transition, the electric charge of the capacitor C1 is discharged via the constant current source ISdcg, and the voltage level of the (+) input level of the hysteresis comparator circuit CMPh is hence lowered. When the voltage level reaches V1, the output of the hysteresis comparator circuit CMPh is transitioned to the 'L' level again, and a similar operation is repeated. As a result, an oscillation signal having a predetermined cycle is generated from the output of the hysteresis comparator circuit CMPh, and a triangular wave signal is generated from the (+) input node of the comparator circuit CMPh. This oscillation signal becomes an output signal of the oscillator OSC of FIG. 23, and the triangular wave signal becomes an output signal of the triangular wave generator TWGEN of FIG. 23.

Seventh Embodiment

A seventh embodiment will explain a power supply device which performs an operation in a current discontinuous mode other than the current critical mode, using the power supply topology of the high-side inverse converter as with the first and second embodiments.

<<Overall Circuit Configuration of Power Supply Device [7]>>

Figure 26:
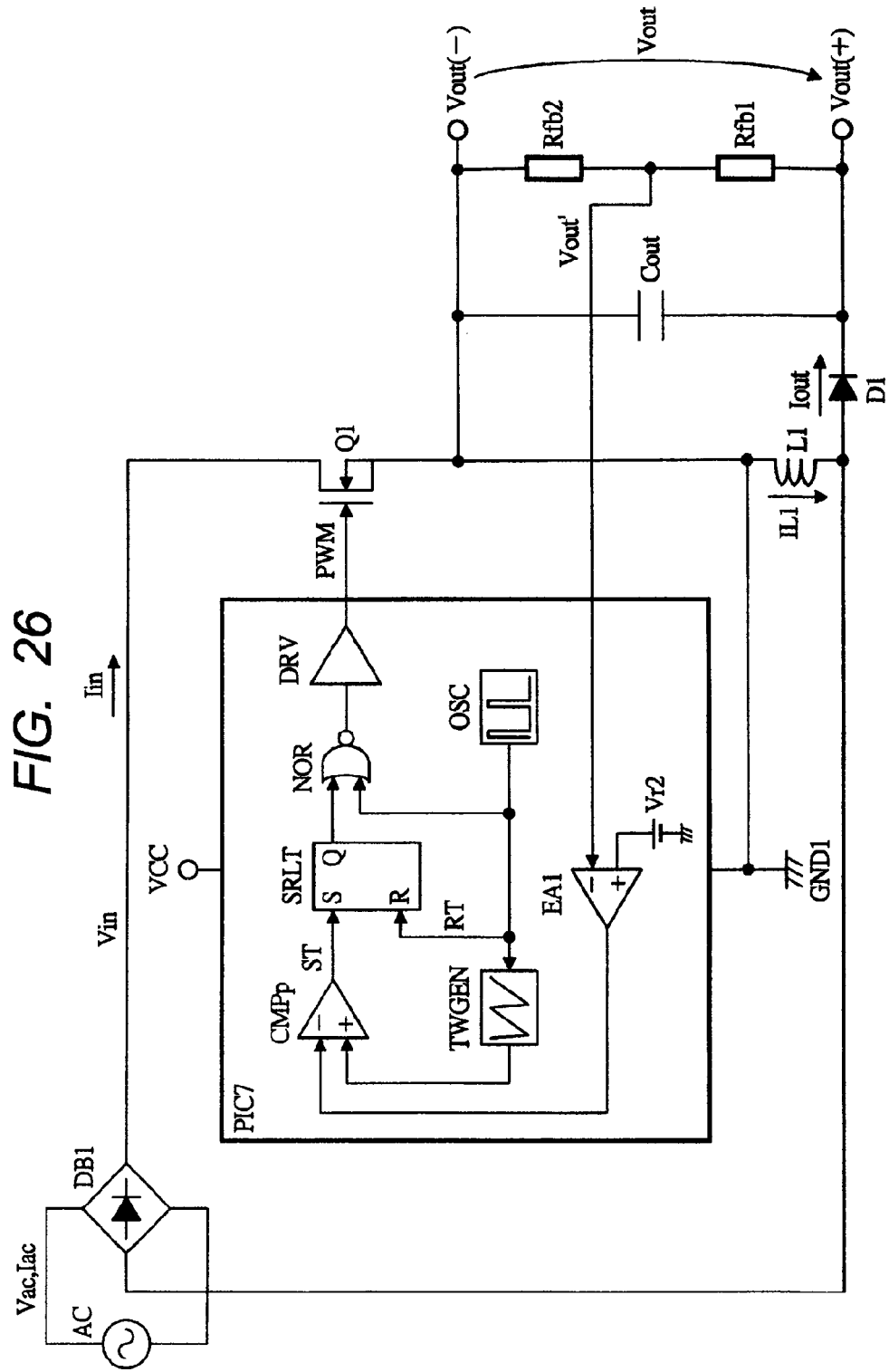
FIG. 26 is a schematic diagram illustrating one example of a circuit configuration of a power supply device according to a seventh embodiment of the present invention.

FIG. 26 is a schematic diagram illustrating one example of a circuit configuration of a power supply device according to a seventh embodiment of the present invention. A description will now be made while paying attention to the differences between the present power supply device and the power supply device of FIG. 11 described in the second embodiment. The power supply device shown in FIG. 26 is different from the power supply device shown in FIG. 11 in that the resistor Rcs for current detection and the resistors Rac1 and Rac2 for input voltage detection are omitted, and an internal circuit configuration of a PFC circuit PIC7 differs. The PFC circuit (semiconductor device) PIC7 operates in accordance with a ground power supply voltage GND1 and a power supply voltage VCC and outputs a duty control signal PWM in response to an output voltage detection signal Vout'. The PFC circuit PIC7 includes an error amplifier circuit EA1, a comparator circuit CMPp, a set/reset latch circuit SRLT, an NOR arithmetic circuit NOR, a driver circuit DRV, an oscillator OSC, and a triangular wave generator TWGEN.

The set/reset latch circuit SRLT outputs an 'H' level to one of two inputs of the NOR arithmetic circuit NOR when a set signal ST is outputted from comparator circuit CMPp, and outputs an 'L' level to one of the two inputs of the NOR arithmetic circuit NOR when a reset signal RT is inputted from the oscillator OSC. The output of the oscillator OSC is inputted to the other of the two inputs of the NOR arithmetic circuit NOR, and the output of the NOR arithmetic circuit NOR is outputted as the duty control signal PWM via the driver circuit DRV. The error amplifier circuit EA1 amplifies a difference between the output voltage detection signal Vout' and a comparison voltage Vr2 and outputs the same to one of two inputs of the comparator circuit CMPp. An output signal of the triangular wave generator TWGEN is inputted to the other of the two inputs of the comparator circuit CMPp. The oscillator OSC and the triangular wave generator TWGEN are achieved by, for example, the configuration example of FIG. 25 referred to above.

<<Overall Circuit Operation of Power Supply Device [7]>>

Figure 27:
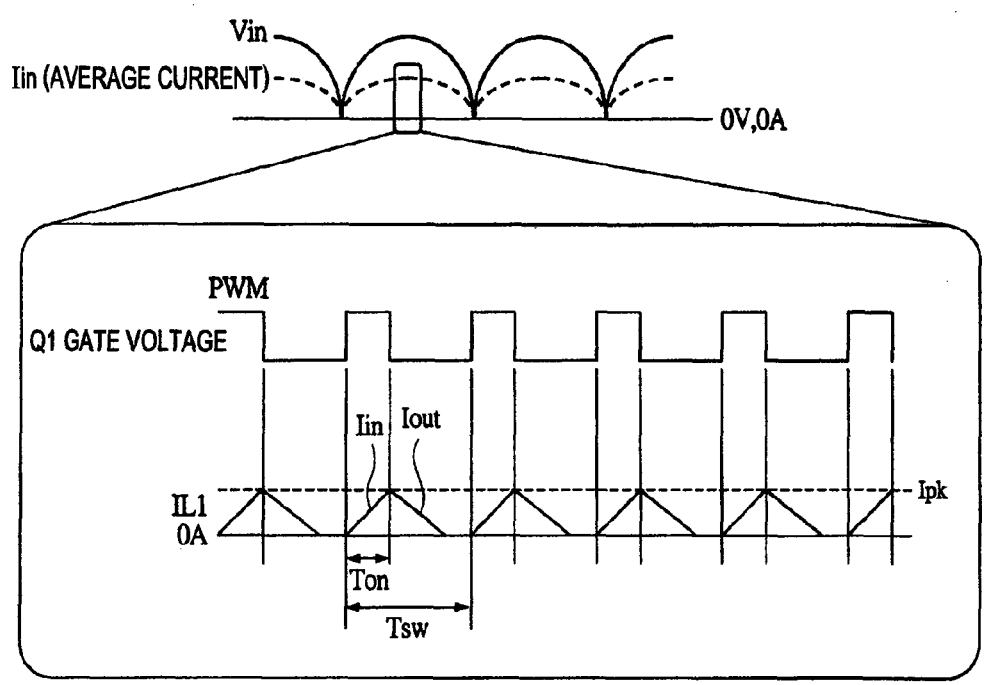
FIG. 27 is a waveform diagram showing a schematic example of operation of FIG. 26.
Figure 28:
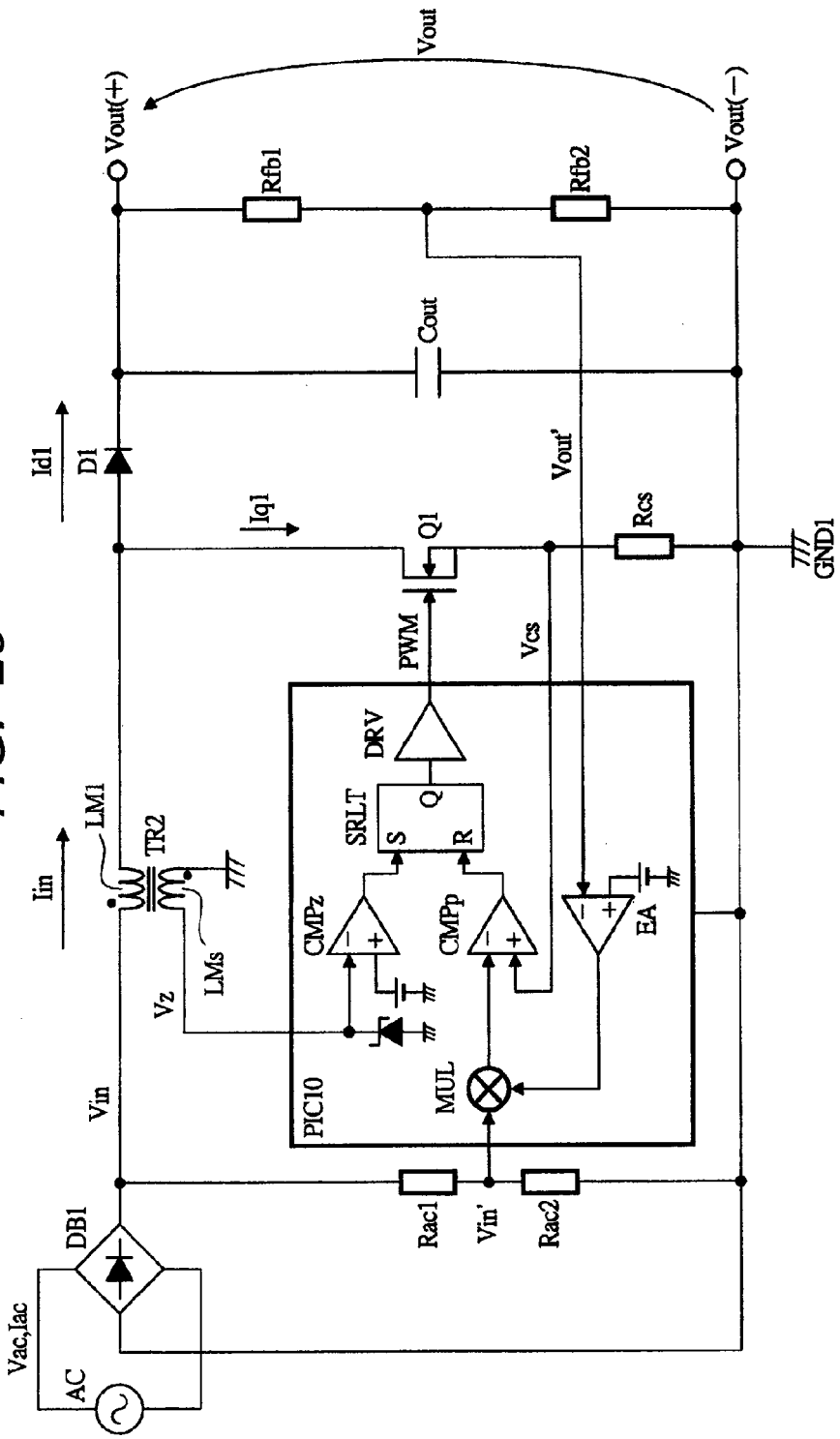
FIG. 28 is a schematic diagram illustrating a configuration example of an AC-DC converter discussed as the premise of the present invention.
Figure 29:
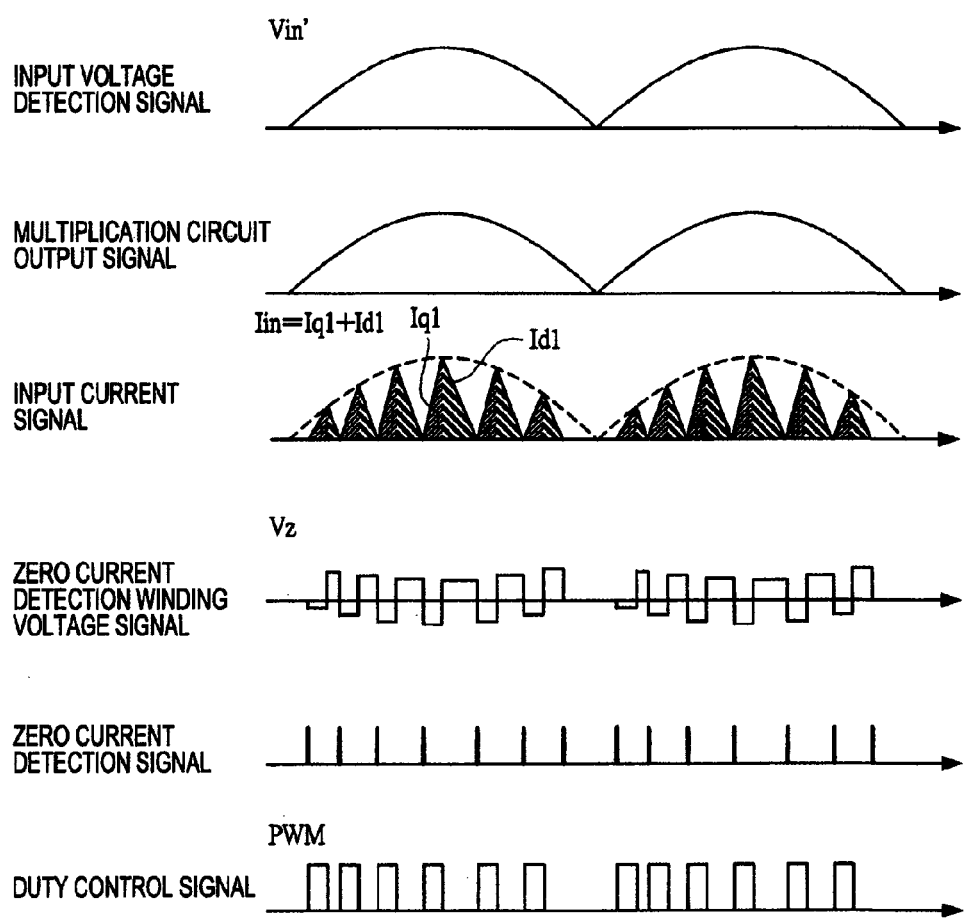
FIG. 29 is a waveform diagram showing an example of operation of FIG. 28.
Figure 30:
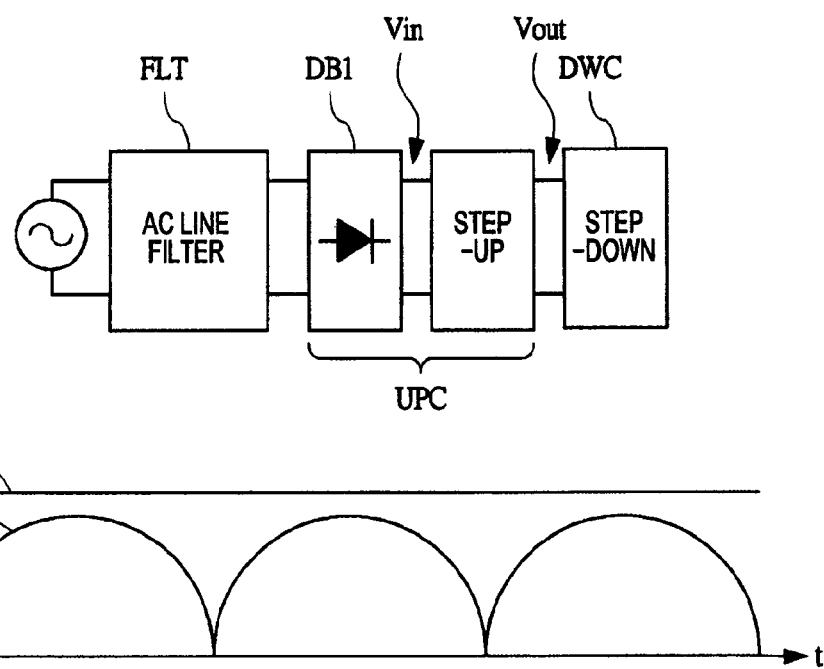
FIG. 30 is a block diagram showing a configuration example of an overall power supply system to which the AC-DC converter shown in FIG. 28 is applied.

FIG. 27 is a waveform diagram showing a schematic example of operation of FIG. 26. Firstly, when the oscillator OSC outputs a reset signal RT ('H' pulse), a duty control signal PWM is brought to an 'H' level (on level) due to the transition of the 'H' pulse to an 'L' level, so that a transistor Q1 is driven on. Thus, a growing input current Iin flows through an inductor L1 via a transistor Q1, so that power is accumulated in the inductor L1. Thereafter, when a set signal ST ('H' pulse) is outputted from the comparator circuit CMPp, the duty control signal PWM is brought to an 'L' level (on level), so that the transistor Q1 is driven off. In doing so, with the power accumulated in the inductor L1 as an electromotive force, an output current Iout flows through a path of a positive polarity output node Vout (+), a diode D1, and a negative polarity output node Vout (−). Thus, a load circuit (not shown) is driven by the output current Iout and an output capacitor Cout is charged thereby.

When the transistor Q1 is on, the error amplifier circuit EA1 outputs an error component of the output voltage Vout relative to the set voltage (Vr2). When the output voltage Vout is excessively high, the output voltage of the error amplifier circuit EA1 is lowered, so that a period (i.e., on duty of transistor Q1) from the output of a reset signal RT to the output of the set signal ST from the comparator circuit CMPp decreases. When the output voltage Vout is excessively low in reverse, the output voltage of the error amplifier circuit EA1 rises, so that the on duty of the transistor Q1 increases. Then, when the period corresponding to one cycle of the oscillator OSC has elapsed, the transistor Q1 is driven on in response to the transition of the 'H' pulse of the oscillator OSC to the 'L' level.

When such a control operation is used, for example, the peak value Ipk of the input current Iin flowing through the transistor Q1 when referring to FIG. 27 becomes Ipk=(Vin/K1)×Ton using the input voltage Vin from a rectifying circuit DB1, the inductance value (L1) of the inductor L1, and the on time (Ton) of the transistor Q1. The average value Iin_ave per one cycle (Tsw) of the duty control signal PWM is expressed in the following equation (1D) using the peak value Ipk.

$$Iin\_ave=(\tfrac{1}{2})\times(Ipk\cdot Ton)/Tsw=1/(2\cdot L1)\times(Ton^2/Tsw)\times Vin \quad (1D)$$

In the equation (1D), L1 and Tsw are fixed values, and Ton is a variable unaffected by Vin. For this reason, the input current Iin (ac current Iac that flows through AC power line) is placed in proportionality with Vin and becomes a sinusoidal shape.

Eighth Embodiment

An eighth embodiment will explain one example in which a step-down converter is configured by modifying the power supply topology of the high-side inverse converter described in the first embodiment.

<<Overall Circuit Configuration of Power Supply Device [8]>>

Figure 35:
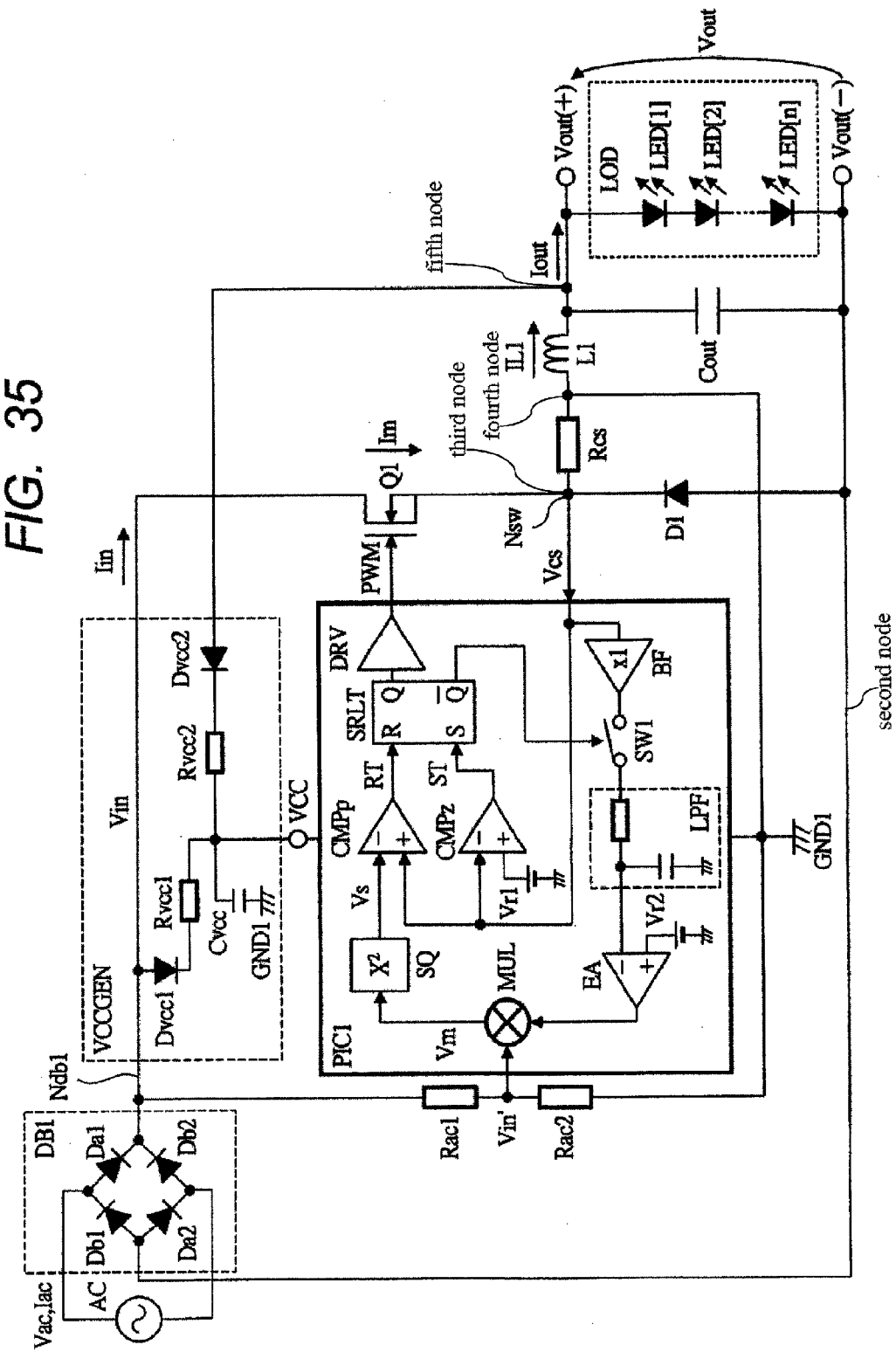
FIG. 35 is a schematic diagram illustrating one example of a circuit configuration of a power supply device according to an eighth embodiment of the present invention.

FIG. 35 is a schematic diagram showing one example of a circuit configuration of a power supply device according to an eighth embodiment of the present invention. When a comparison is made between FIG. 35 and FIG. 1, the power supply device of FIG. 35 differs from the power supply device of FIG. 1 in that the reference node side at the output of the rectifying circuit DB1 is coupled to the positive polarity output node Vout (+) in the power supply device of FIG. 1, whereas in the power supply device of FIG. 35, the reference node side of the rectifying circuit DB1 is coupled to the negative polarity output node Vout (−). That is, in FIG. 35, the rectifying circuit DB1 generates an input voltage Vin and an input current Iin at a node Ndb1 (a first node) on the basis of the positive polarity output node Vout (−) (a second node). Coupling relations other than the above are similar to FIG. 1. The diode D1 is coupled between a node Nsw (a third node) used as the source of a transistor Q1 and the negative polarity output node Vout (−) with the Vout (−) side as its anode. A resistor Rcs for current detection is coupled between the node Nsw (the third node) and one end (a fourth node) of an inductor L1. The other end (a fifth node) of the inductor L1 is coupled to the positive polarity output node Vout (+). A capacitor Cout is coupled between the negative polarity output node Vout (−) and the positive polarity output node Vout (+). Further, a load circuit LOD like light emitting diodes LEDs or the like is coupled in parallel to the capacitor Cout.

<<Overall Circuit Operation of Power Supply Device [8]>>

In the power supply device of FIG. 35, firstly, current flows through a path of Ndb1, Q1, Rcs, L1, Vout (+) and Vout (−) when the transistor Q1 is on. Hence, power is accumulated in the inductor L1 and an output current Iout is supplied to the load circuit LOD. On the other hand, when the transistor Q1 is off, current flows through a path of L1, Vout (+), Vout (−), D1 and Rcs with the power accumulated in the inductor L1 as an electromotive force, so that an output current Iout is supplied to the load circuit LOD. Even in such a configuration, the input current Iin (ac current Iac of commercial power source (AC) flows only during a period in which the transistor Q1 is on, in a manner similar to the power supply device of FIG. 1. Since, however, the power supply device is equipped with the PFC circuit PIC1 including the square circuit SQ described above, a current waveform (Iac) close to the sinusoidal wave is obtained.

<<Advantages of Power Supply Device [8]>>

Thus, when the power supply device of FIG. 35 is used, an advantage substantially similar to that of the power supply device of FIG. 1 is obtained, and the following advantages are further obtained in addition to it. Firstly, an element low in breakdown voltage between the source and drain of the transistor Q1 can be used as the transistor Q1, and a reduction in cost can hence be achieved. That is, while the source-drain voltage Vds at the time of turning off of the transistor Q1 becomes "Vin+Vout" (Vout: voltage between the positive and negative polarity output nodes Vout (+) and Vout (−)), whereas in the power supply device of FIG. 35, the source-drain voltage Vds at the time of turning off of the transistor Q1 can be brought substantially to the input voltage Vin. Accordingly, an element lower in breakdown voltage than FIG. 1 by Vout (e.g., Vin: full-wave rectified value of 85 to 264 Vrms and Vout: 60 V or 70 V or the like) can be used in FIG. 35.

Figures 36A, 36B:
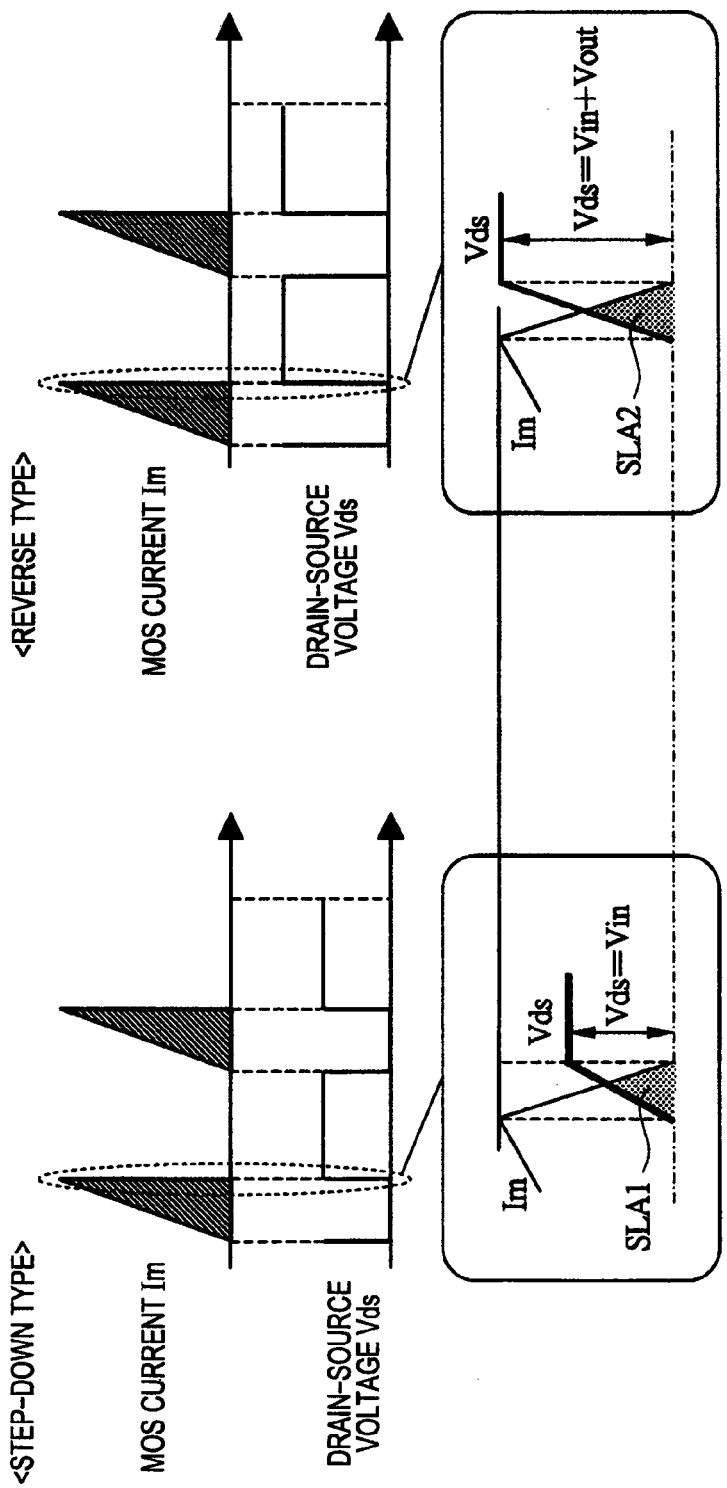

Secondly, an improvement in power conversion efficiency can be achieved. Since the power supply devices shown in FIGS. 1 and 35 are both operated in a current critical mode, they are both brought to zero current switching when the transistor Q1 is transitioned to on and hence enables a reduction in switching loss as compared with a so-called hard switching system. In the power supply devices shown in FIGS. 1 and 35, however, a difference occurs in the switching loss with the above-described difference in Vds when the transistor Q1 is transitioned to off. FIGS. 36($a$) and 36($b$) are respectively typical diagrams each showing one example of the conditions that switching losses occur, in which FIG. 36($a$) shows where the power supply device of FIG. 35 is used, and FIG. 36($b$) shows, as its comparative example, where the power supply device of FIG. 1 is used. As shown in FIGS. 36($a$) and 36($b$), when the transistor Q1 is transitioned to off, the falling waveform of a current Im of the transistor Q1, and the rising waveform of the drain-source voltage Vds of the transistor Q1 partly overlap each other. Therefore, a loss occurs in the overlapped portion (SLA1, SLA2).

When the power supply device of FIG. 35 is used at this time, the area of the overlapped portion (SLA1) can be set smaller than that of the overlapped portion (SLA2) in the power supply device of FIG. 1 because the value of the source-drain voltage Vds is small, thus enabling a reduction in the switching loss. Described in more detail, a switching loss Ps_off at the transition of the transistor Q1 to off is expressed in the following equation (10) assuming that Ip is taken as the peak value of the current Im. It is understood that reducing the value of the source-drain voltage Vds upon reducing the switching loss is useful. As a result of verification under Vin=100 Vrms, Vout=70 V and Pout (power consumption of load circuit LOD)=8 W by way of example, there could be obtained a result that the power conversion efficiency was 86.0% in the case of the power supply device of FIG. 1, whereas the power conversion efficiency was 90.3% in the case of the power supply device of FIG. 35.

$$Ps\_off = \int_0^{tf} i(t) \cdot V(t) dt \quad (10)$$
$$= \int_0^{tf} \left(Ip - \frac{Ip}{Tf}t\right) \frac{Vds}{Tf} t dt$$
$$= \frac{1}{6} Vds \cdot Ip \cdot tf$$

$$Ps\_off = \int_0^{tf} i(t) \cdot V(t) dt$$
$$= \int_0^{tf} \left(Ip - \frac{Ip}{Tf}t\right) \frac{Vds}{Tf} t dt$$
$$= \frac{1}{6} Vds \cdot Ip \cdot tf$$

Incidentally, although not limited in particular, in FIG. 35, a metal-coated chip resistor having a resistance value such as 1.2Ω, for example can be used as the resistor Rcs for zero current detection with the current critical mode in order to miniaturize an LED illuming device or the like. Its premise will be concretely explained. Firstly, if the load circuit LOD is of an LED of Vout=70 V, Pout=8 W and 100 Vrms, its current consumption Iout becomes Iout=8 W/70 V=about 114 mA. In this case, a peak current Ip of an input current Iin at the peak of the input voltage Vin acts in the current critical mode and results in 2√2 times the current consumption Iout. If efficiency is assumed to be 90% and a power factor is assumed to be 0.9, then the peak current Ip becomes Ip=0.114×2×√2/(0.9×0.9)=398 mA. Now, assuming that Ip=0.5 A or the like in consideration of a margin taken upon determining the resistance value of the resistor Rcs, and the upper limit value of the detection voltage Vcs developed at the resistor Rcs, which can be inputted to the PFC circuit PIC1, is 0.6 V, the resistance value of the resistor Rcs becomes Rcs=0.6 V/0.5 A=1.2Ω. Thus, when Rcs=1.2Ω or the like, power consumed or used up at the resistor Rcs is 0.114×0.114×1.2=15.6 mW, and a general resistor such as a ¼ W type can be used.

Ninth Embodiment

A ninth embodiment will explain one example in which the configuration of a PFC circuit is modified using the power supply topology of the step-down converter described in the eighth embodiment.

<<Overall Circuit Configuration of Power Supply Device [9]>>

Figure 37:
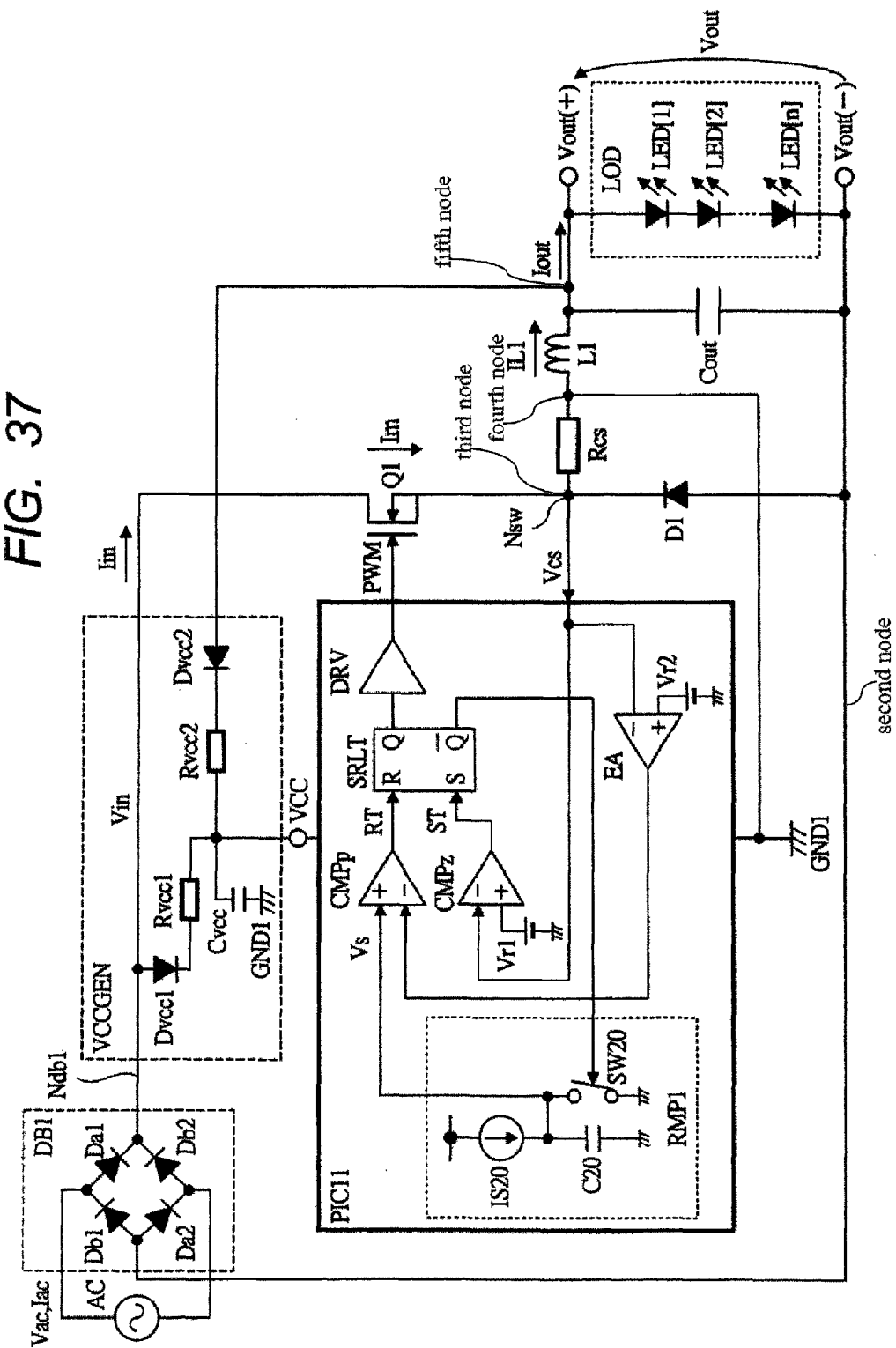
FIG. 37 is a schematic diagram illustrating one example of a circuit configuration of a power supply device according to a ninth embodiment of the present invention.

FIG. 37 is a schematic diagram showing one example of a circuit configuration of a power supply device according to a ninth embodiment of the present invention. The power supply device shown in FIG. 37 is different from the power supply device of FIG. 35 in terms of an internal configuration of a PFC circuit and is similar thereto in configuration at other than it. In FIG. 37, the PFC circuit PIC11 includes a ramp circuit RMP1, comparator circuits CMPp and CMPz, a set/reset latch circuit SRLT, a driver circuit DRV, and an error amplifier circuit EA. The PFC circuit PIC11 of FIG. 37 is different from the PFC circuit PIC1 of FIG. 1 and serves as a critical converter which is not equipped with a square circuit SQ and controls the on time using a detection voltage Vcs developed from a resistor Rcs for current detection and a charging voltage by the ramp circuit RMP1.

The set/reset latch circuit SRLT drives a duty control signal PWM to an 'L' level (off level) via the driver circuit DRV when a reset signal RT is outputted from the comparator circuit CMPp, and drives the duty control signal PWM to an 'H' level (on level) via the driver circuit DRV when a set signal ST is outputted from the comparator circuit CMPz. When the detection voltage Vcs developed by the resistor Rcs for current detection becomes lower than a predetermined comparison voltage Vr1, the comparator circuit CMPz outputs the corresponding set signal ST. When the voltage of the output signal Vs from the ramp circuit RMP1 exceeds an output voltage of the error amplifier circuit EA, the comparator circuit CMPp outputs the corresponding reset signal RT. The error amplifier circuit EA amplifies a difference between the detection voltage Vcs and a comparison voltage Vr2 with the detection voltage Vcs as a negative polarity (−) input. The ramp circuit RMP1 includes a current source IS20, a capacitor C20 and a switch circuit SW20. When the duty control signal PWM is at the 'L' level (inverse output (/Q) of SRLT is at an 'H' level), the ramp circuit RMP1 fixes the output signal Vs to an 'L' level via the switch circuit SW20. When the duty control signal PWM is transitioned to the 'H' level, the ramp circuit RMP1 charges a current of the current source IS20 into the capacitor C20 to gradually increase the voltage of the output signal Vs.

<<Overall Circuit Operation of Power Supply Device [9]>>

Figure 38:
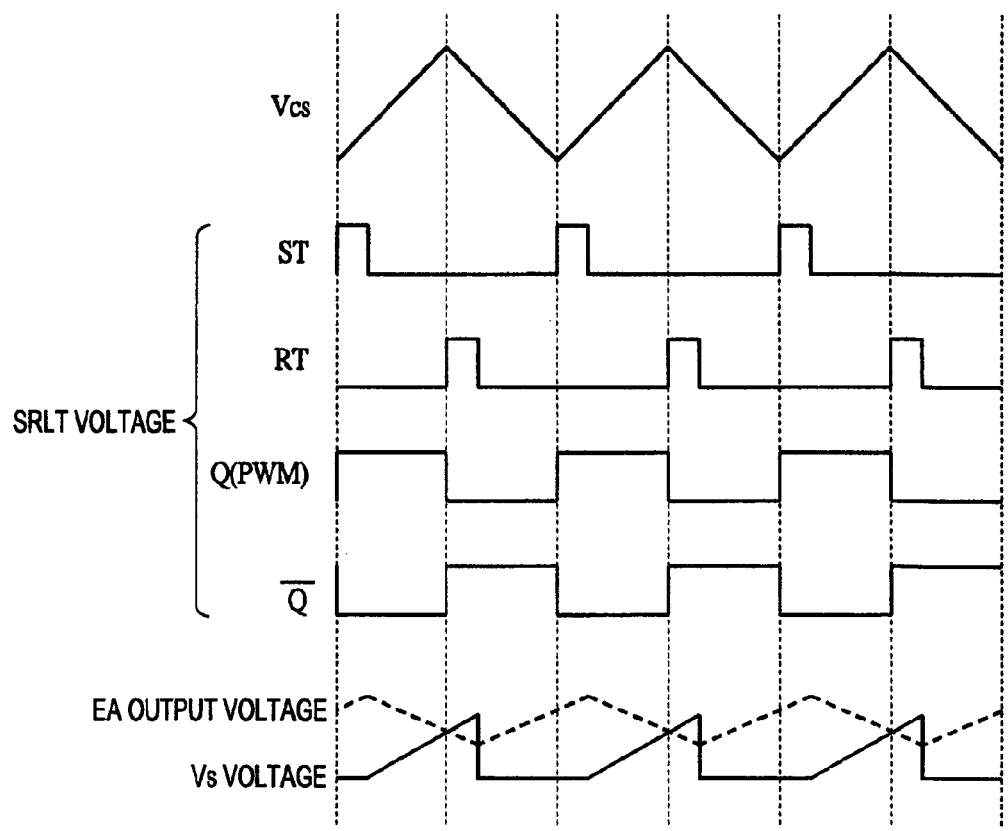
FIG. 38 is waveform diagram showing a schematic example of operation of the power supply device of FIG. 37.

FIG. 38 is a waveform diagram showing a schematic example of operation of the power supply device of FIG. 37. As shown in FIG. 38, when a set signal ST is first inputted to the set/reset latch circuit SRLT, a duty control signal PWM is transitioned to an 'H' level and thereby current flows into the inductor L1 side via a transistor Q1. With its operation, a detection voltage Vcs developed at the resistor Rcs gradually rises. When the duty control signal PWM is transitioned to the 'H' level, the switch circuit SW20 lying in the ramp circuit RMP1 is controlled to off, so that the voltage of an output signal Vs of the ramp circuit RMP1 also gradually rises. On the other hand, the output voltage of the error amplifier circuit EA is gradually lowered according to the rise in the Vcs. Here, when the voltage of the output signal Vs reaches the output voltage of the error amplifier circuit EA, a reset signal RT is outputted and correspondingly, the duty control signal PWM is transitioned to an 'L' level according to it. When the duty control signal PWM is transitioned to the 'L' level, a load circuit LOD is driven by an electromotive force of the inductor L1, so that the detection voltage Vcs is gradually lowered and the output voltage of the error amplifier circuit EA gradually rises in reverse. When the duty control signal PWM is transitioned to the 'L' level, the switch circuit SW20 lying inside the ramp circuit RMP1 is controlled to on, so that the output signal Vs is discharged to 0 V. Thereafter, when the detection voltage Vcs is lowered substantially to 0 V (when current IL1 flowing through the inductor L1 reaches zero), a set signal ST is inputted to the set/reset latch circuit SRLT and similar operations are repeated subsequently.

<<Advantages of Power Supply Device [9]>>

Figure 39:
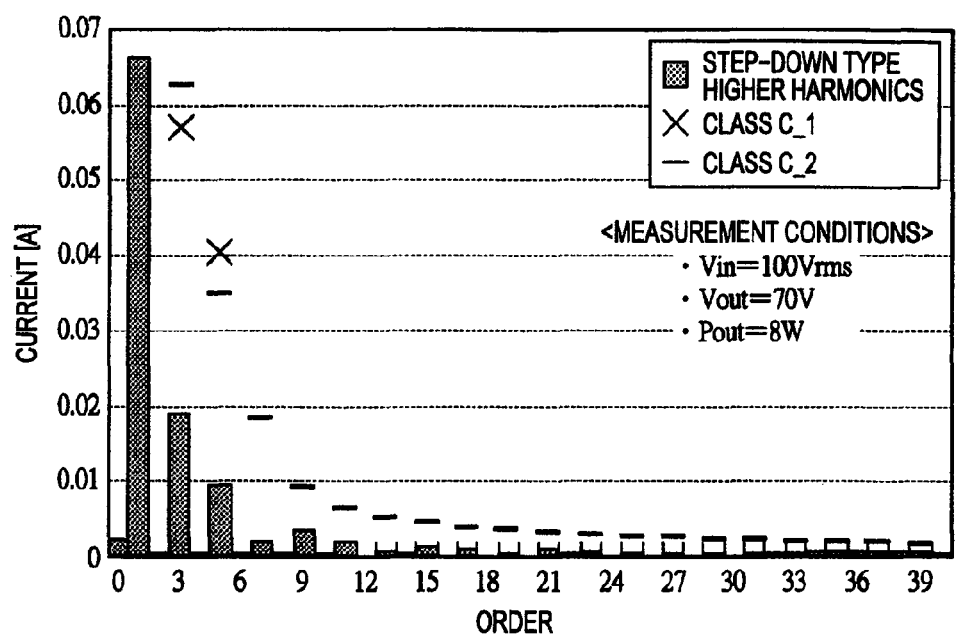
FIG. 39 is a diagram showing a result of verification of higher harmonics contained in an input current that flows in the power supply device of FIG. 37.

Thus, when the power supply device of FIG. 37 is used, advantages substantially similar to FIG. 35 are obtained even though the power supply device of FIG. 37 is lowered than that of FIG. 35 in power factor. Further, a size reduction in the power supply device and its cost reduction can be achieved as compared with the case of FIG. 35. That is, it is possible to eliminate the resistors Rac1 and Rac2 for detection of the input voltage Vin in FIG. 35. It is however feared that with the reduction in the power factor, the present power supply device is not capable of satisfying a higher harmonic standard of illuminating equipment, for example. According to the verification by the present inventors or the like, however, there could be obtained a result that the standard could be sufficiently satisfied as shown in FIG. 39. FIG. 39 is a diagram showing a result of verification of higher harmonics contained in an input current Iin (ac current Iac flowing through an AC power line) that flows in the power supply device of FIG. 37. Here, the verification is performed assuming that the input voltage Vin is 100 Vrms, the output voltage Vout is 70 V and the power consumption Pout of the load circuit LOD is 8 W. Specification values of classes C each indicative of the higher harmonic standard of the lighting equipment are also shown in FIG. 39 along with it. As is understood from here, the standard can be sufficiently satisfied even when the power supply device of FIG. 37 is used.

While the invention made above by the present inventors has been described specifically based on the preferred embodiments, the present invention is not limited to the embodiments referred to above. It is needless to say that various changes can be made thereto within the scope not departing from the gist thereof.

What is claimed is:

1. An LED illuminating device comprising:
   a first output node and a second output node coupled with a light emitting diode;
   a rectifying circuit which rectifies AC power and supplies the rectified AC power to a rectified output node;
   an N-channel type MOSFET having a gate terminal, a drain terminal and a source terminal, the drain terminal being coupled with the rectified output node;
   a current detection resistor coupled with the source terminal and a ground node, the ground node being coupled with a ground voltage;
   an inductor coupled with the ground node and the first output node;
   a diode whose anode and cathode are coupled with the second output node and the source terminal of the N-channel type MOSFET, respectively;
   an output capacitor coupled with the first output node and the second output node; and
   a control circuit coupled with the gate terminal and the source terminal of the N-channel type MOSFET,
   wherein a detection voltage of the source terminal is input to the control circuit,
   wherein the control circuit provides a PWM signal to the gate terminal to control the N-channel type MOSFET, and
   wherein the control circuit includes:
      a driver circuit having an output coupled to the gate of the MOSFET and an input;
      a set/reset latch circuit having a first output coupled to the input of the driver circuit, a second output, a set terminal and a reset terminal;
      a first comparator circuit having an output coupled to the reset terminal, a first input and a second input;
      a second comparator circuit having an output coupled to the set terminal, a first input coupled to receive a first reference voltage and a second input coupled to the first node;
      an error amplifier circuit having an output coupled to the second input of the first comparator circuit, a first input coupled to receive a second reference voltage and a second input coupled to the first node, and
      a ramp circuit having:
         a current source;
         a capacitance coupled to the current source to provide charge thereto; and
         a switch circuit coupled to a connection node of the current source and the capacitance to discharge the capacitance, the connection node of the current source and the capacitance being coupled to the first input of the first comparator circuit, and the switch circuit being coupled to the second output of the set/reset latch circuit.

2. The LED illuminating device according to claim 1, wherein the PWM signal is outputted in response to the detection voltage.

3. The LED illuminating device according to claim 2, wherein the detection voltage is used for detecting an input current flowing through the N-channel type MOSFET.

4. The LED illuminating device according to claim 1, wherein the second output node is coupled with the rectifying circuit.

5. The LED illuminating device according to claim 1, further comprising:
   a resistance dividing circuit for dividing a voltage between the rectified output node and the second output node to supply voltage to the control circuit.

* * * * *